(12) United States Patent
Michaels et al.

(10) Patent No.: US 11,435,899 B1
(45) Date of Patent: *Sep. 6, 2022

(54) DYNAMIC VIEW USER INTERFACE SYSTEM AND METHOD

(71) Applicants: Zachary Michaels, San Luis Obispo, CA (US); Charlotte Maumus, San Luis Obispo, CA (US)

(72) Inventors: Zachary Michaels, San Luis Obispo, CA (US); Charlotte Maumus, San Luis Obispo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/222,808

(22) Filed: Apr. 5, 2021

Related U.S. Application Data

(63) Continuation-in-part of application No. 16/892,187, filed on Jun. 3, 2020, now Pat. No. 10,969,876.

(60) Provisional application No. 62/856,596, filed on Jun. 3, 2019.

(51) Int. Cl.
*G06F 3/04886* (2022.01)
*G06F 3/04847* (2022.01)
*G06F 3/0485* (2022.01)

(52) U.S. Cl.
CPC ........ *G06F 3/04886* (2013.01); *G06F 3/0485* (2013.01); *G06F 3/04847* (2013.01)

(58) Field of Classification Search
None
See application file for complete search history.

(56) References Cited

U.S. PATENT DOCUMENTS

| | | | |
|---|---|---|---|
| 2012/0144345 A1* | 6/2012 | Munter | G06F 3/04883 715/863 |
| 2013/0132856 A1* | 5/2013 | Binyamin | G06F 3/017 715/740 |
| 2018/0091727 A1* | 3/2018 | Pell | H04N 7/152 |

* cited by examiner

*Primary Examiner* — Parul H Gupta
(74) *Attorney, Agent, or Firm* — Staniford Tomita LLP

(57) ABSTRACT

A mobile computing device has a touch screen which has a display and a user interface UI that has a control system for manipulating the displayed data. The UI can be used for scrolling, zooming, and selecting specific data on the visual display. The basic operation of the UI includes a touch circle being formed around a control point where the user touches the touch screen. The user can swipe on the touch screen with radial and arcuate gestures which can be interpreted by the UI for zooming, selecting, and inputting data.

20 Claims, 46 Drawing Sheets

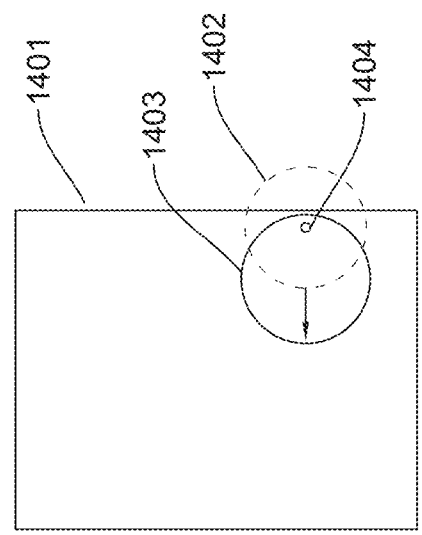
FIG. 5
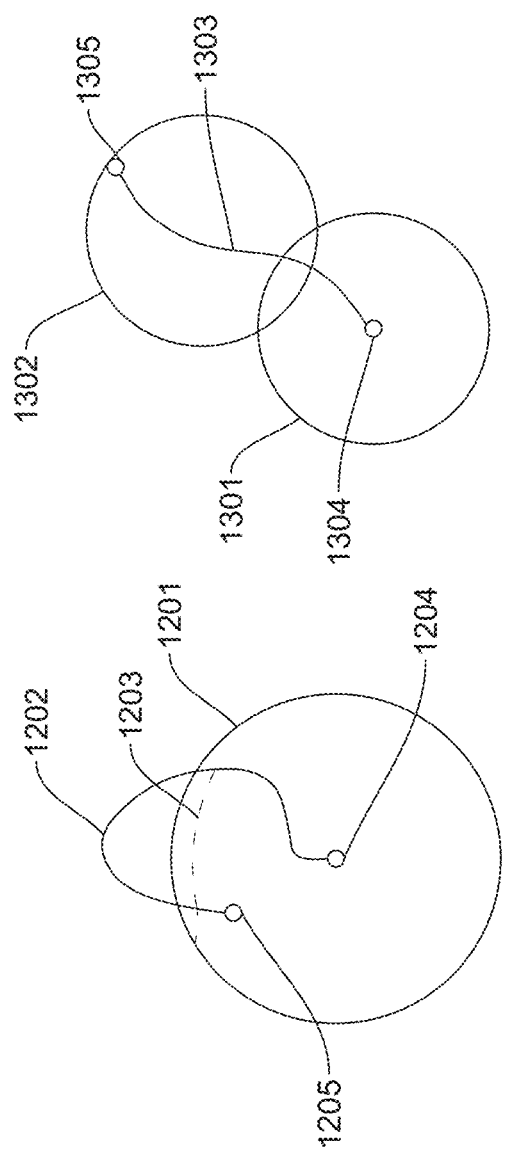
FIG. 4
FIG. 3

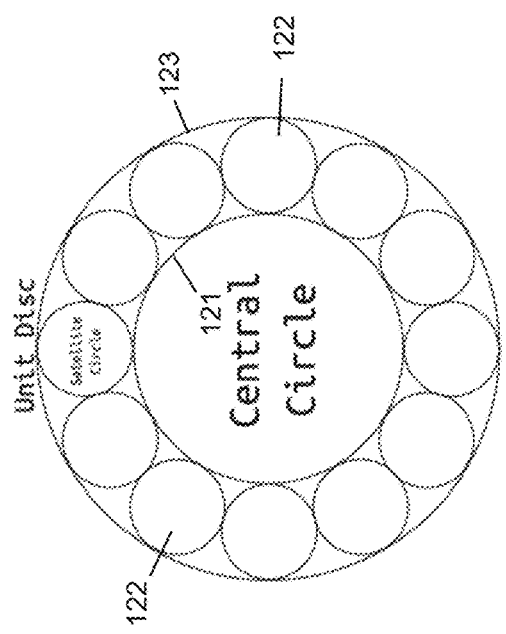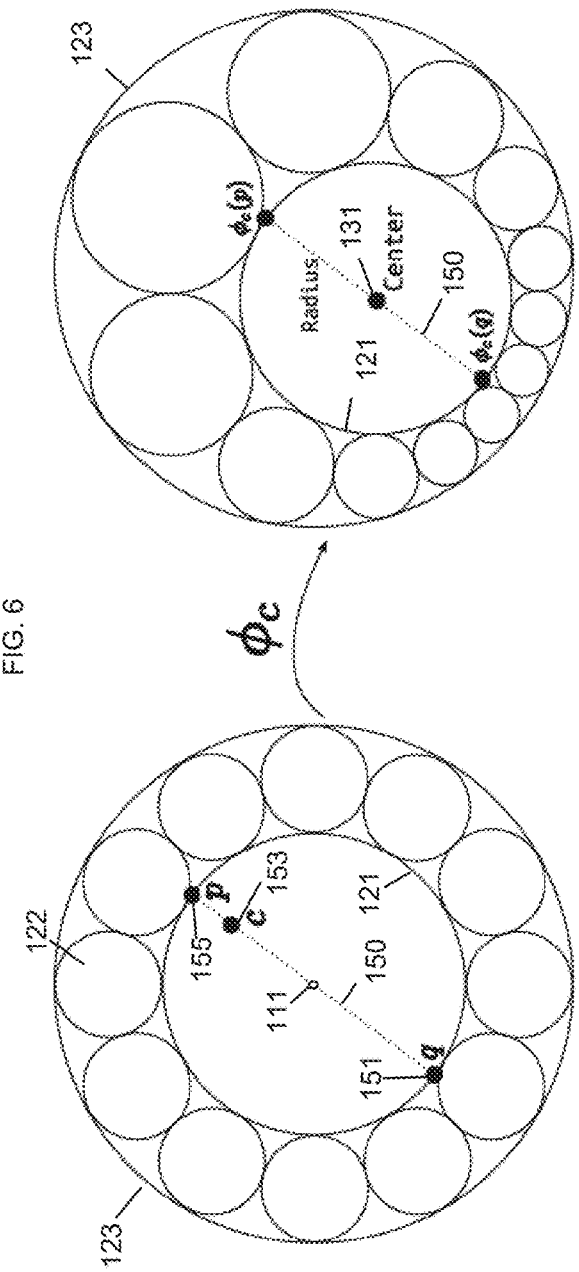

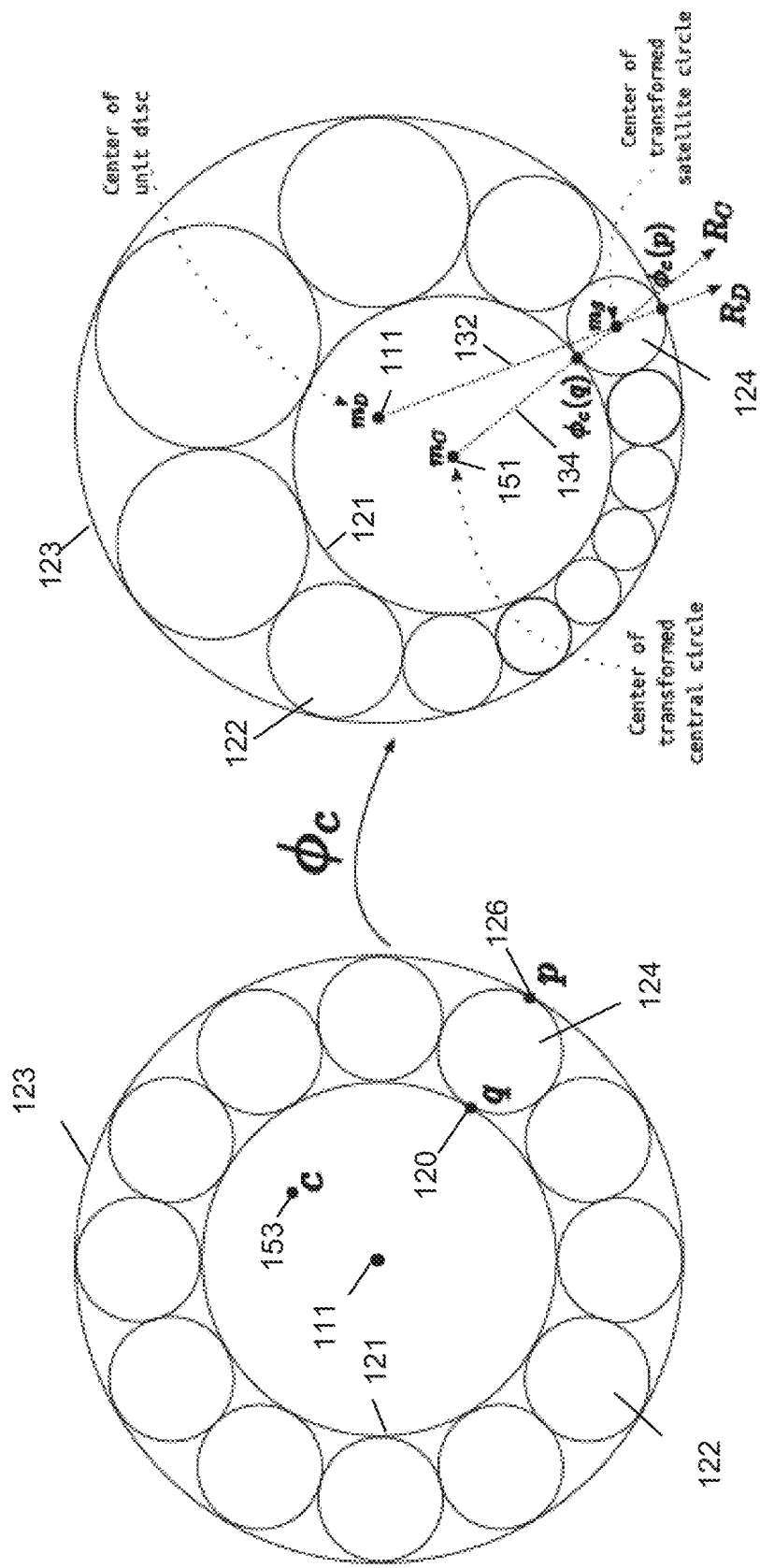

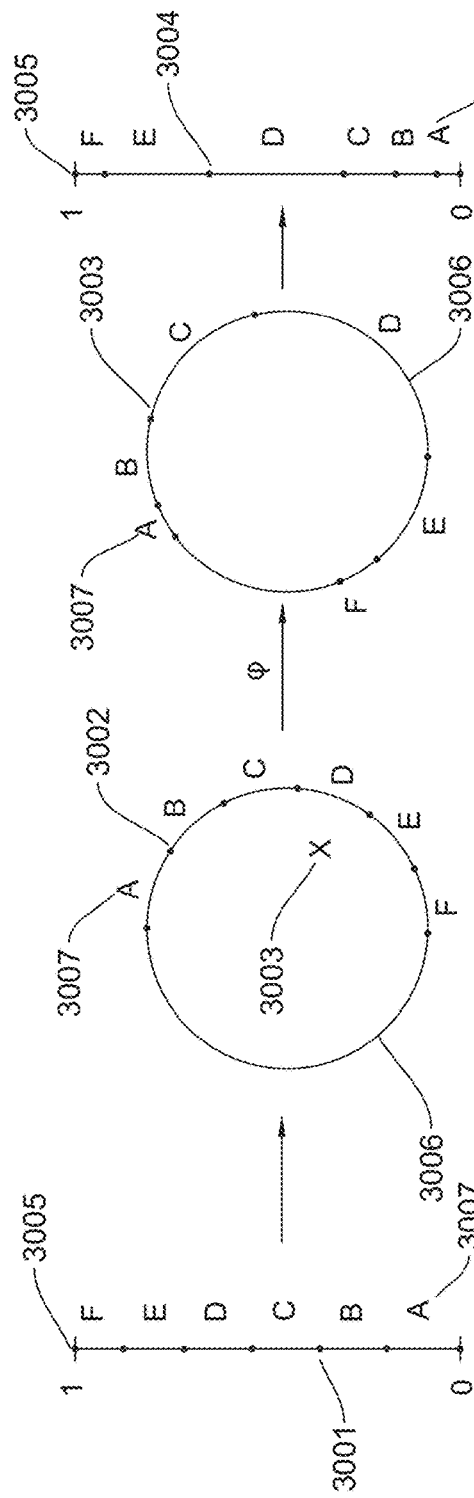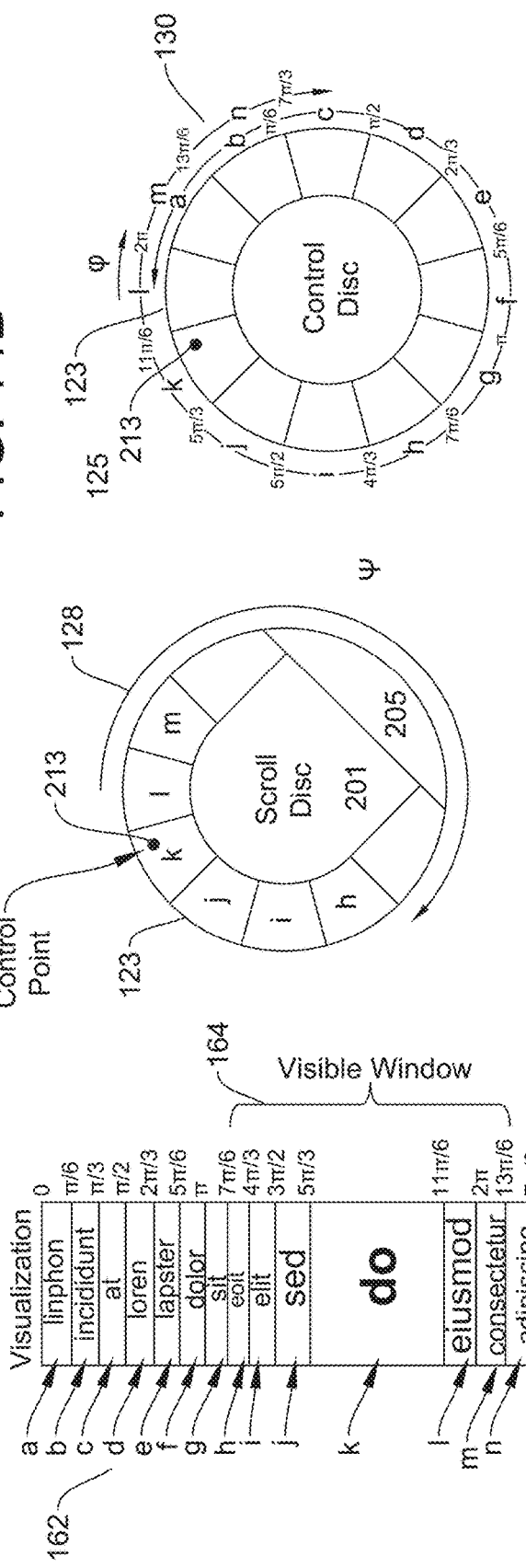
FIG. 14A  FIG. 14B  FIG. 15  FIG. 16  FIG. 17

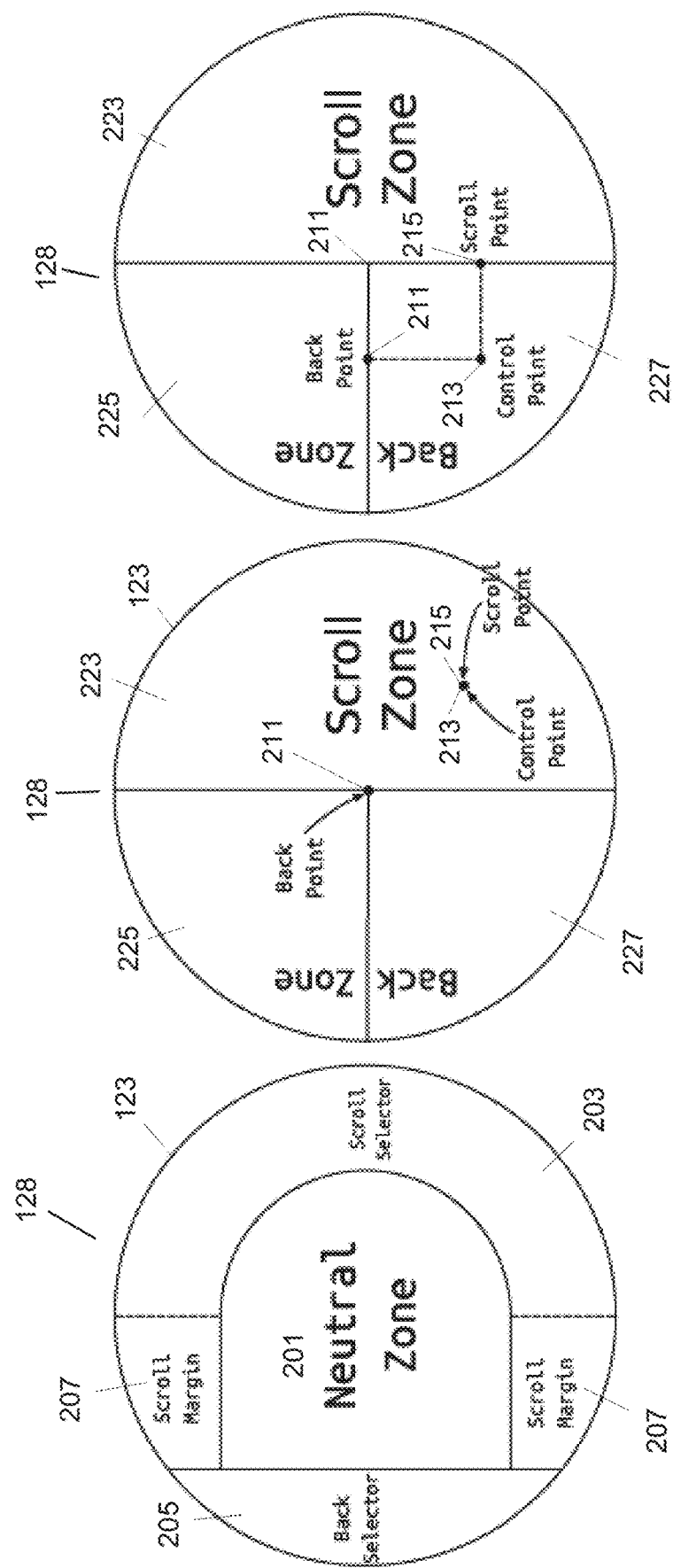

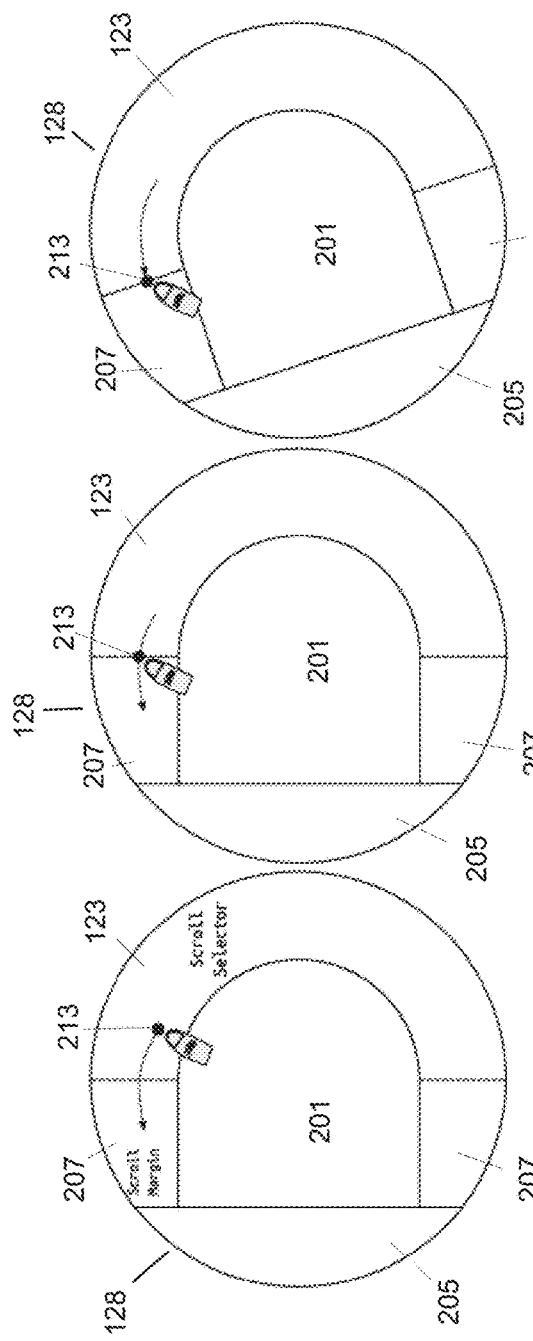
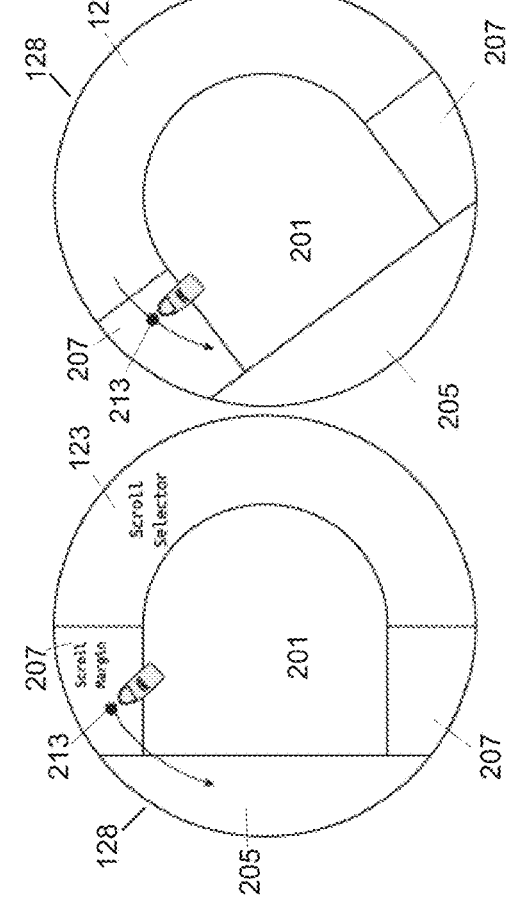
FIG. 21  FIG. 22  FIG. 23
FIG. 24  FIG. 25  FIG. 26

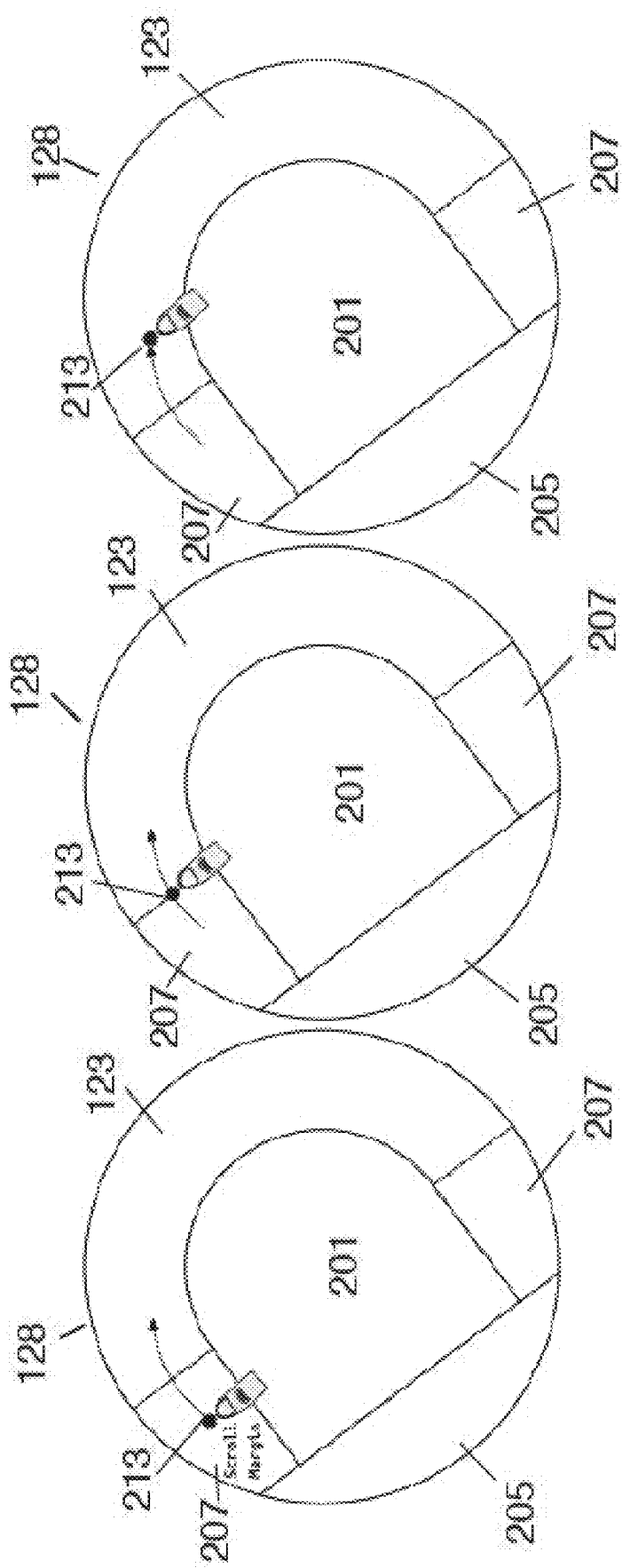

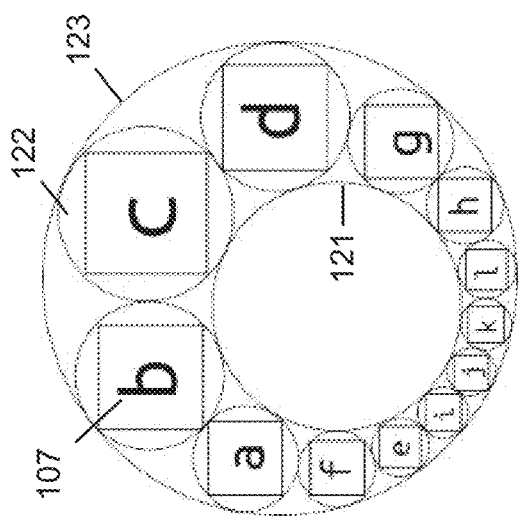
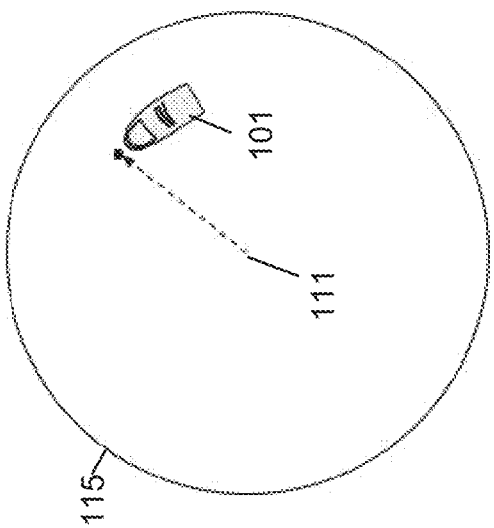
FIG. 35
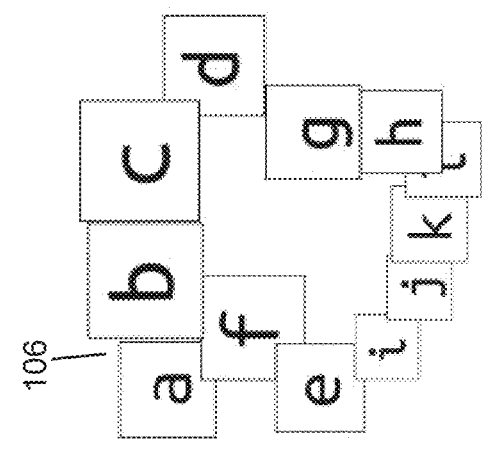
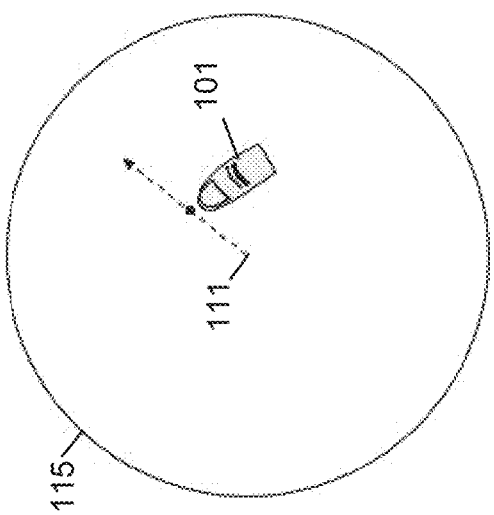
FIG. 34
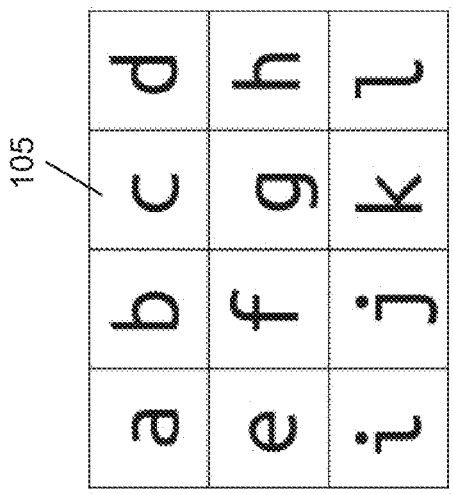
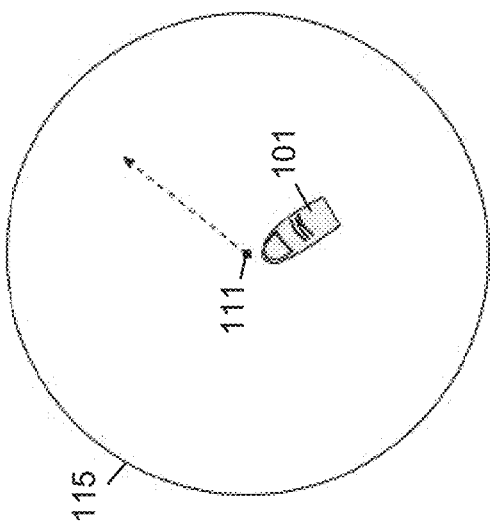
FIG. 33

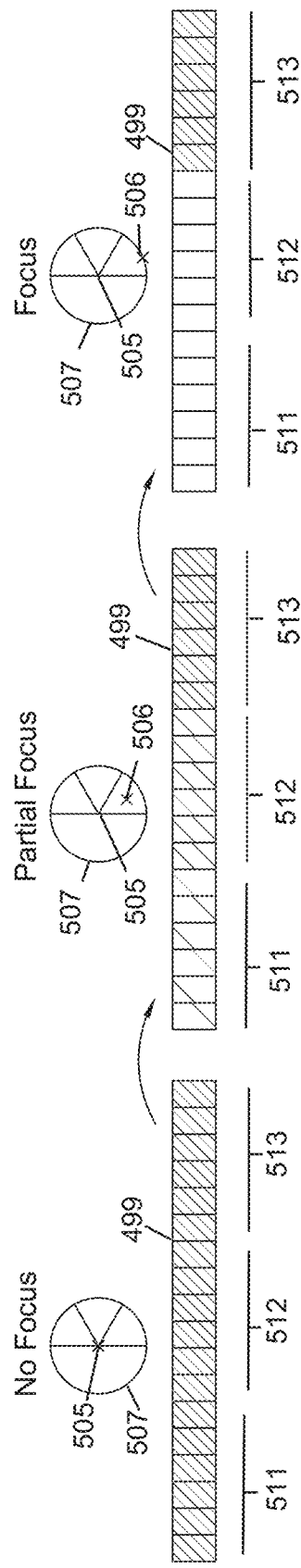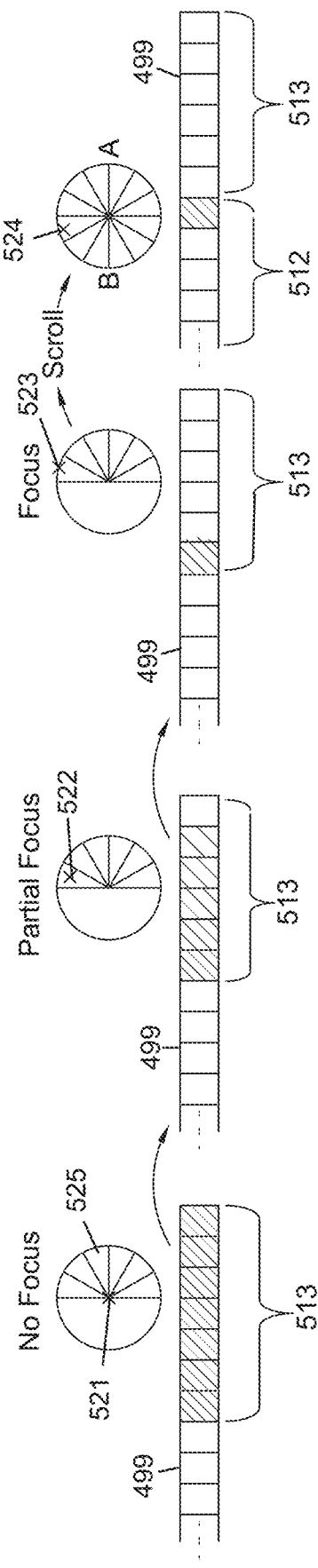

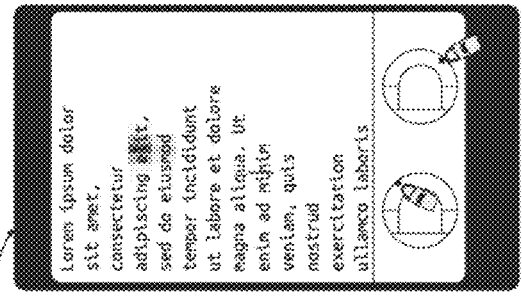
FIG. 57C
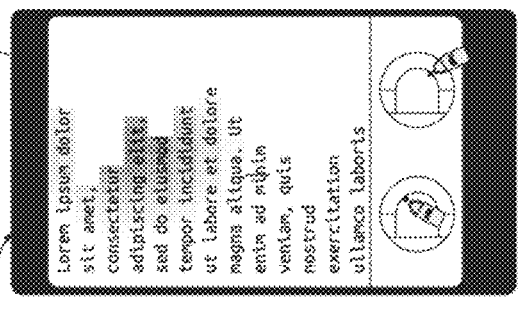
FIG. 57B  Release Both Fingers
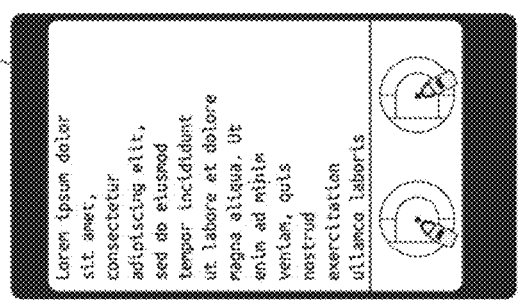
FIG. 57A
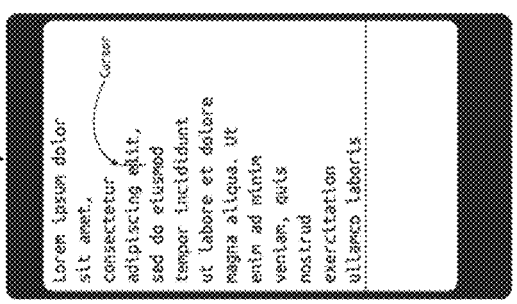
FIG. 57D

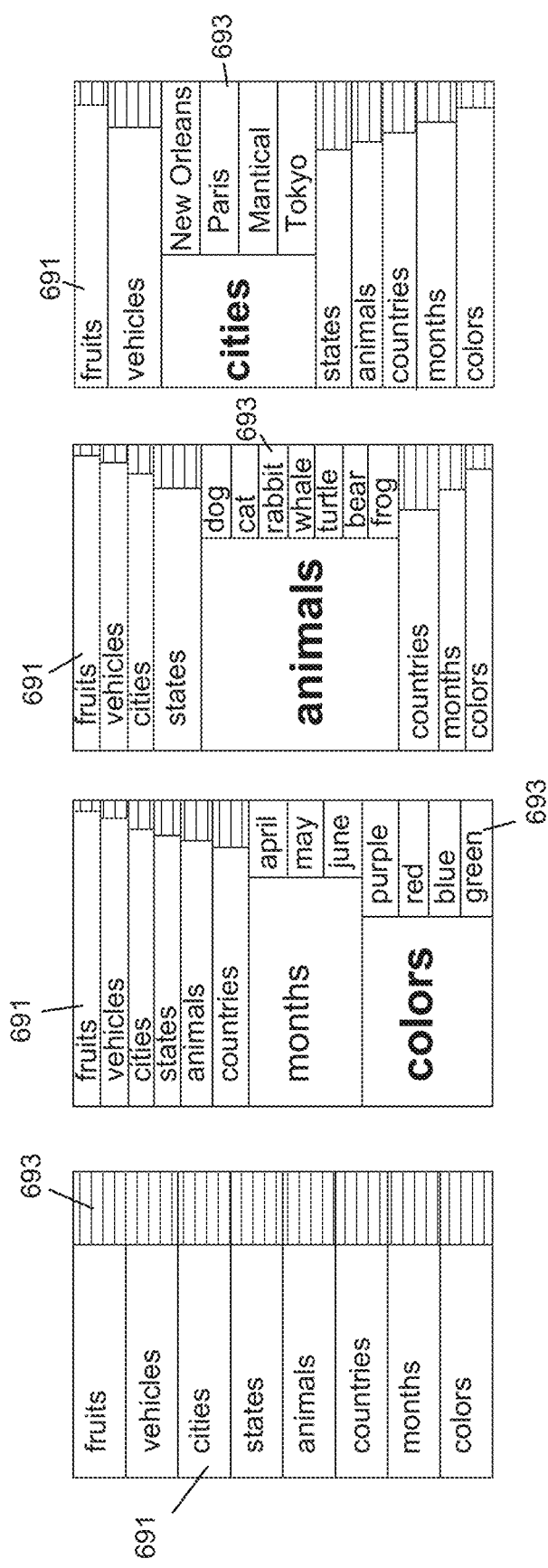
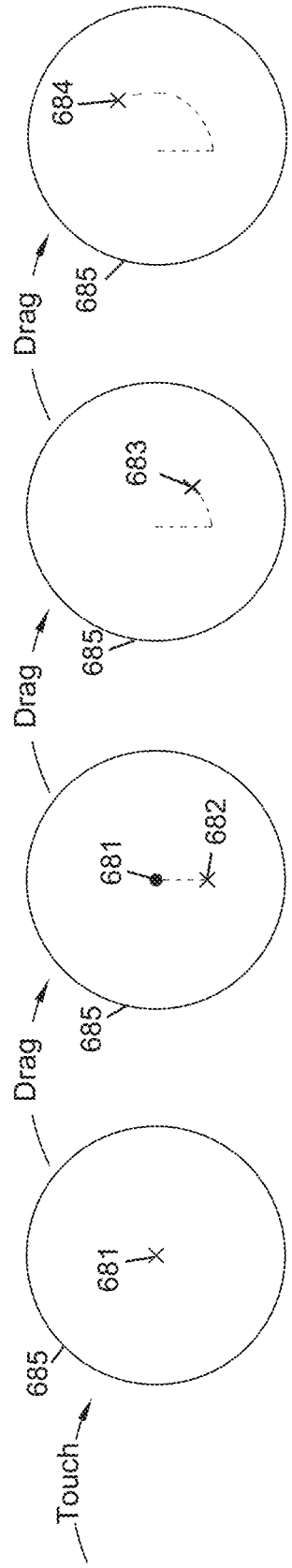
FIG. 68A   FIG. 68B   FIG. 68C   FIG. 68D

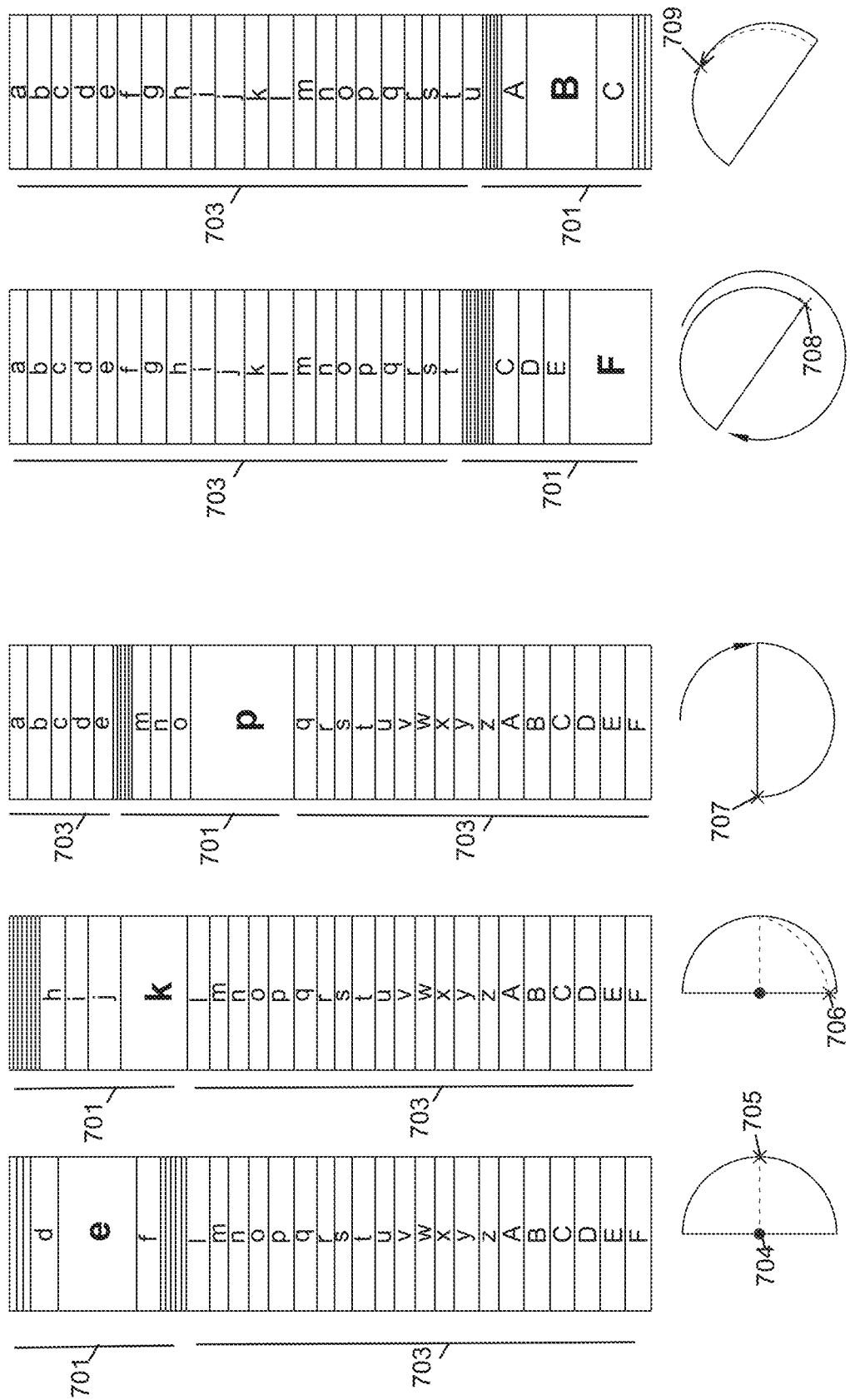

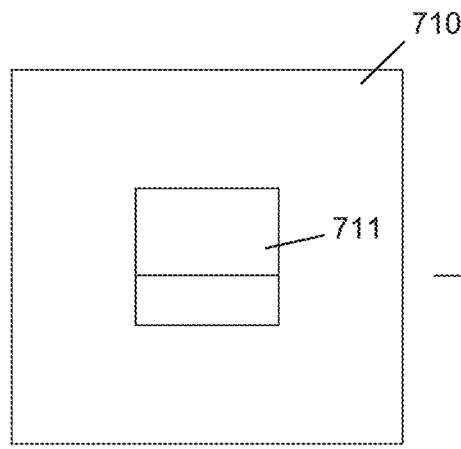
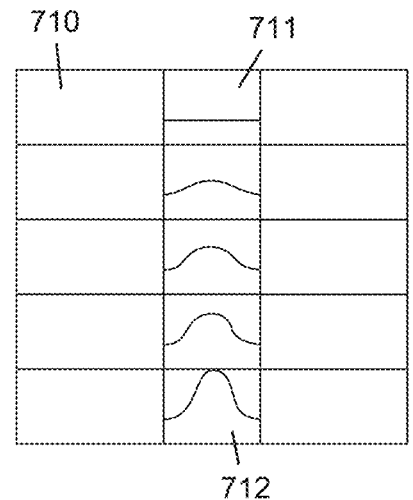
FIG. 71A                FIG. 71B
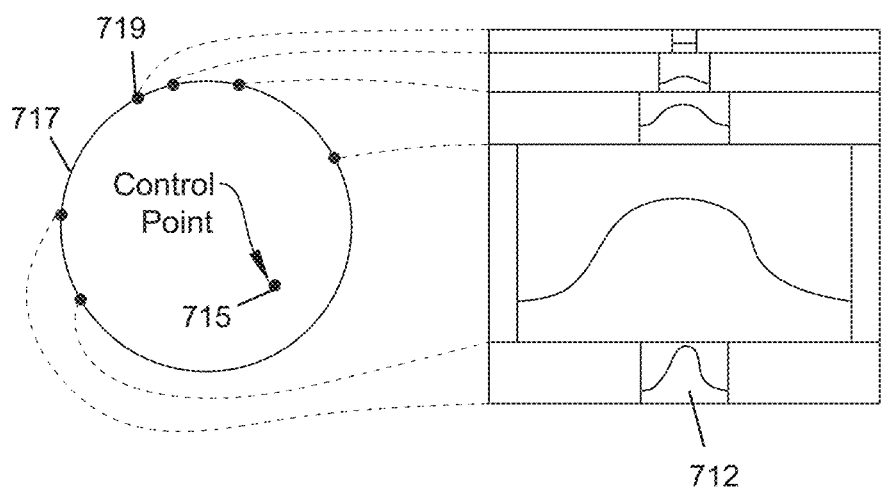
FIG. 71C

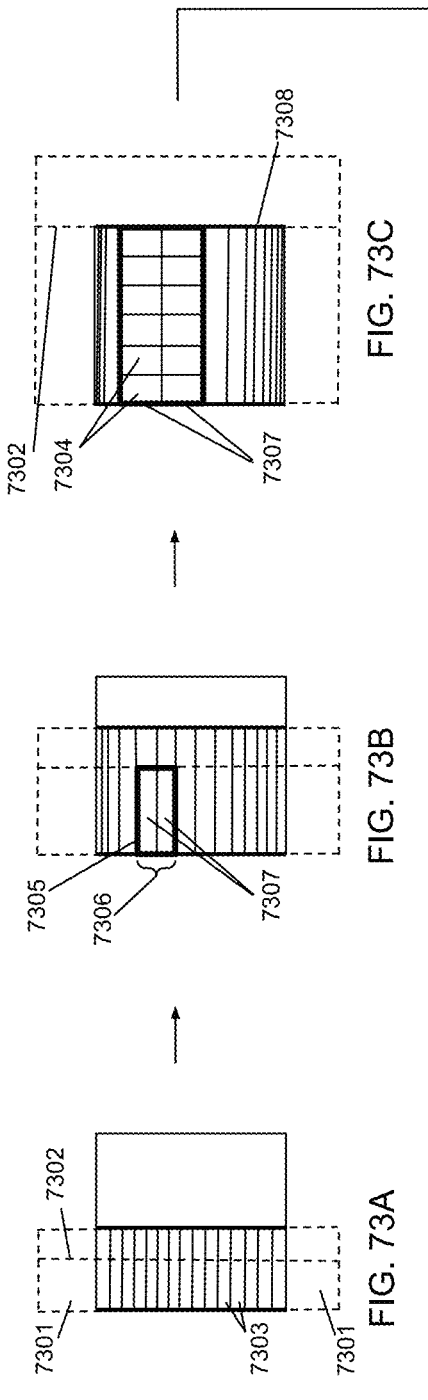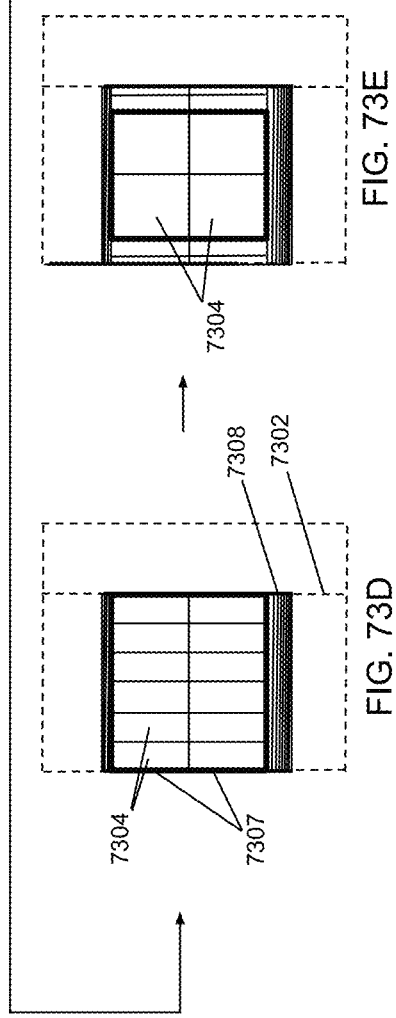

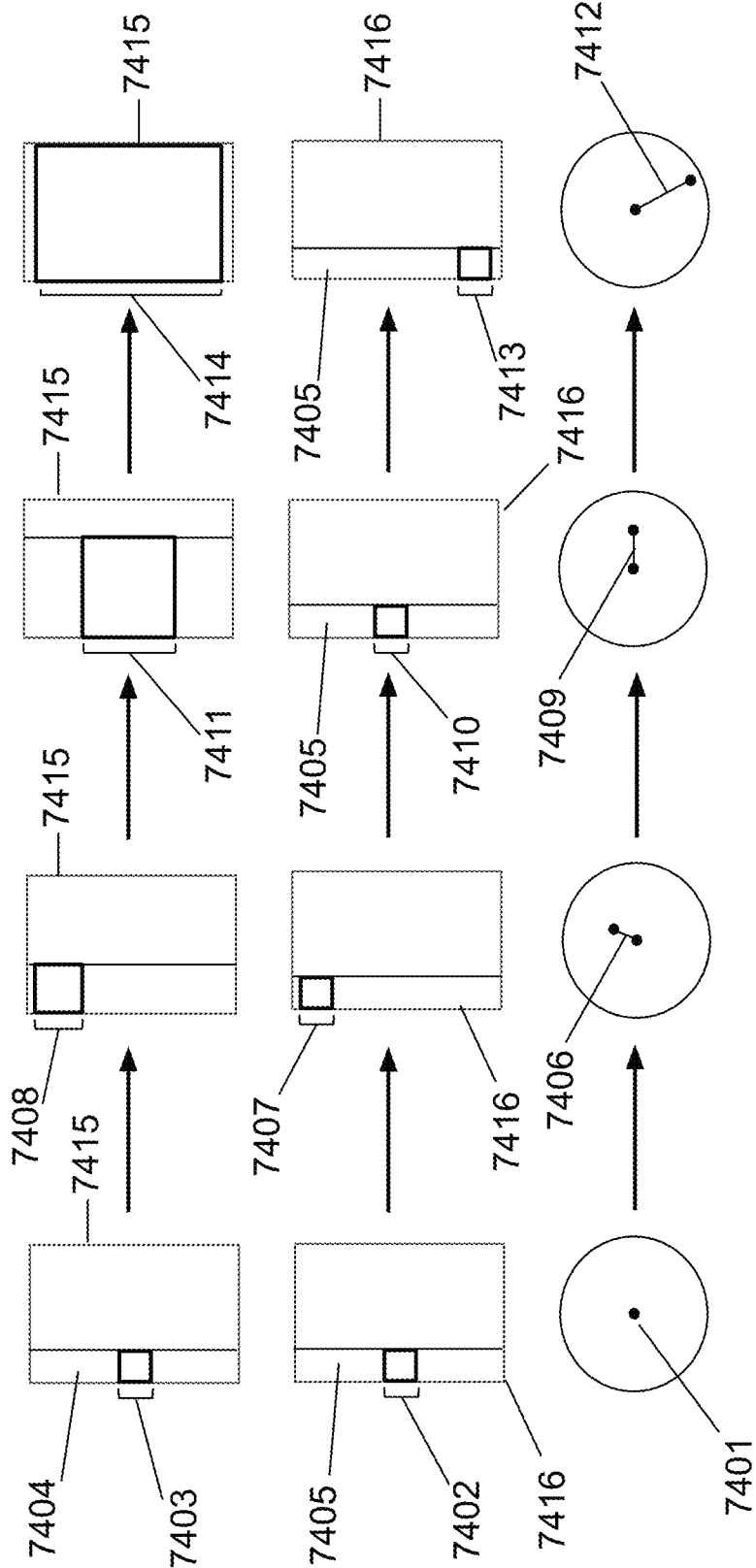

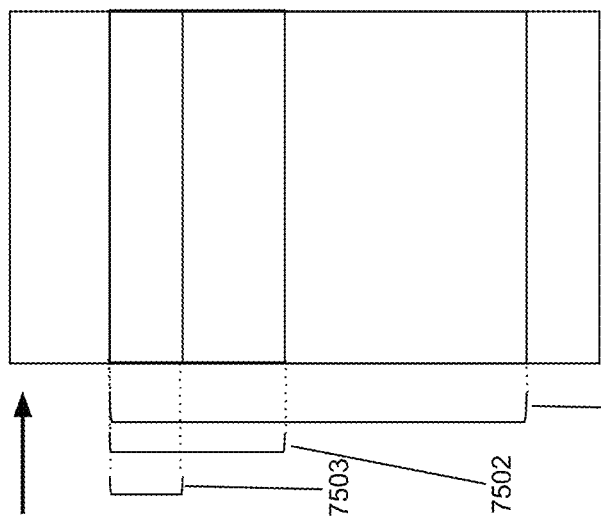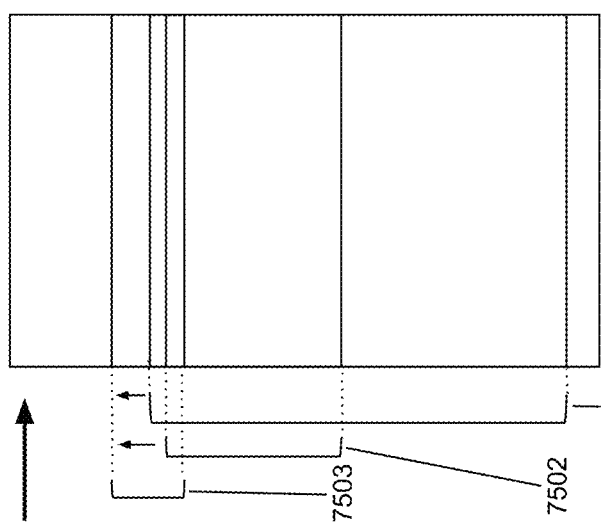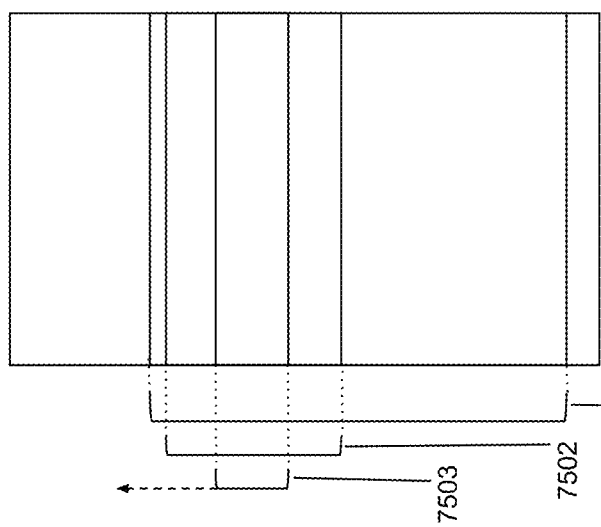

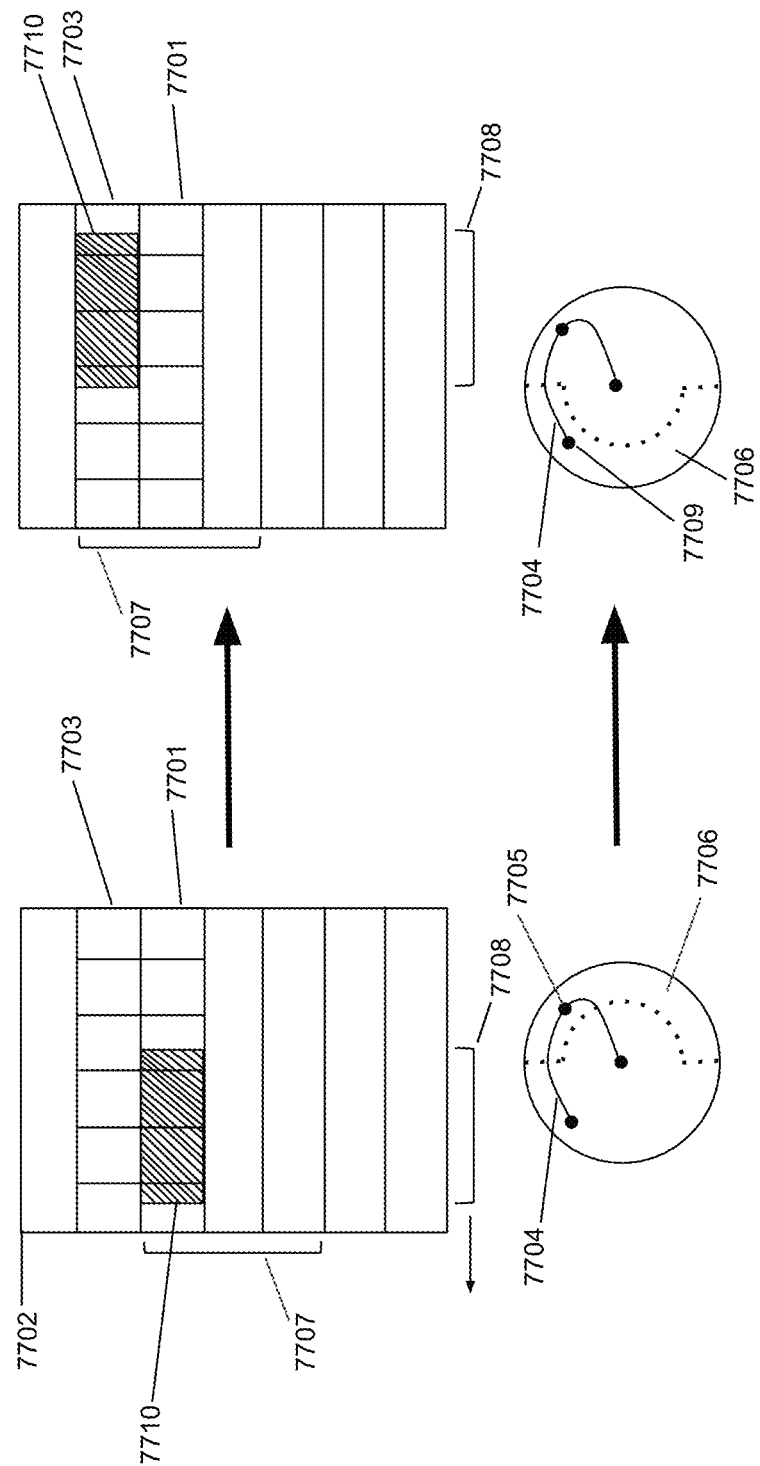

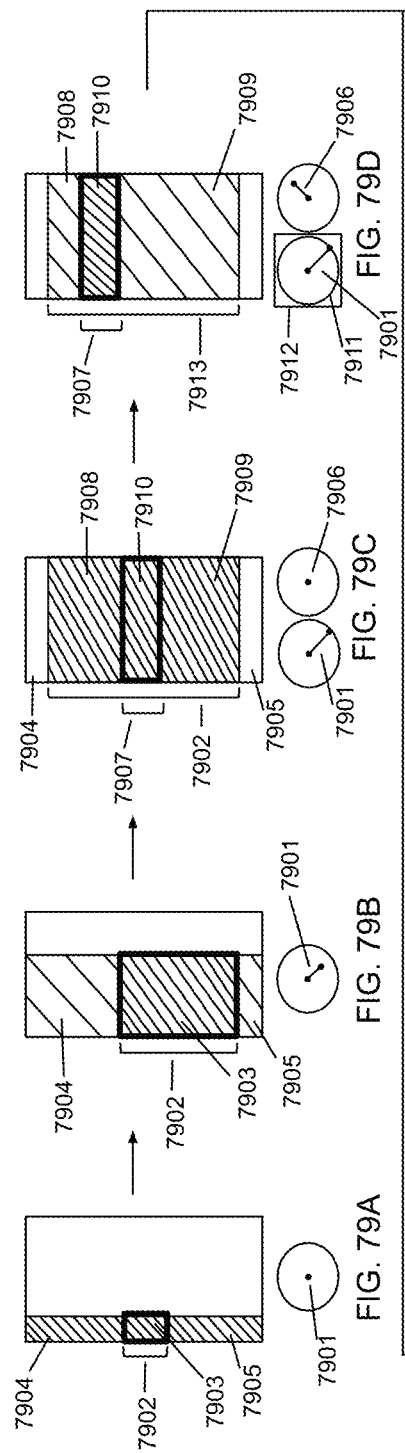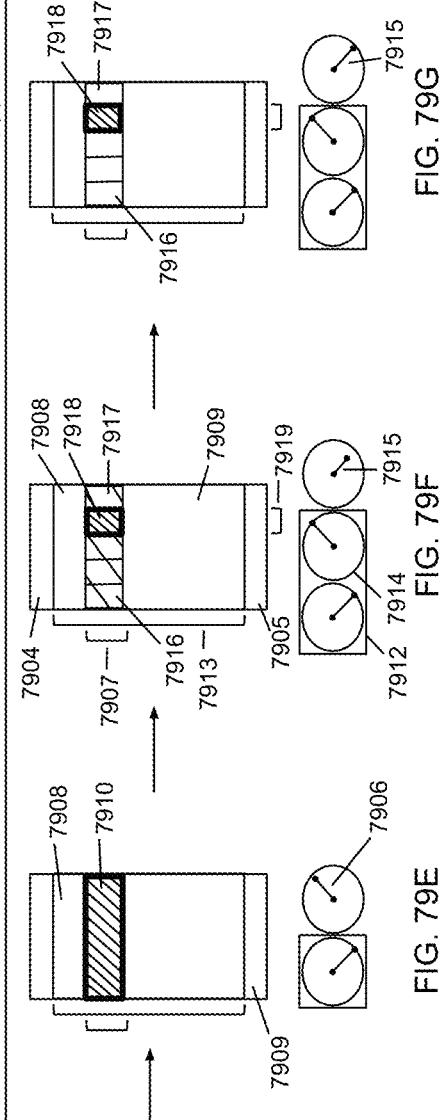

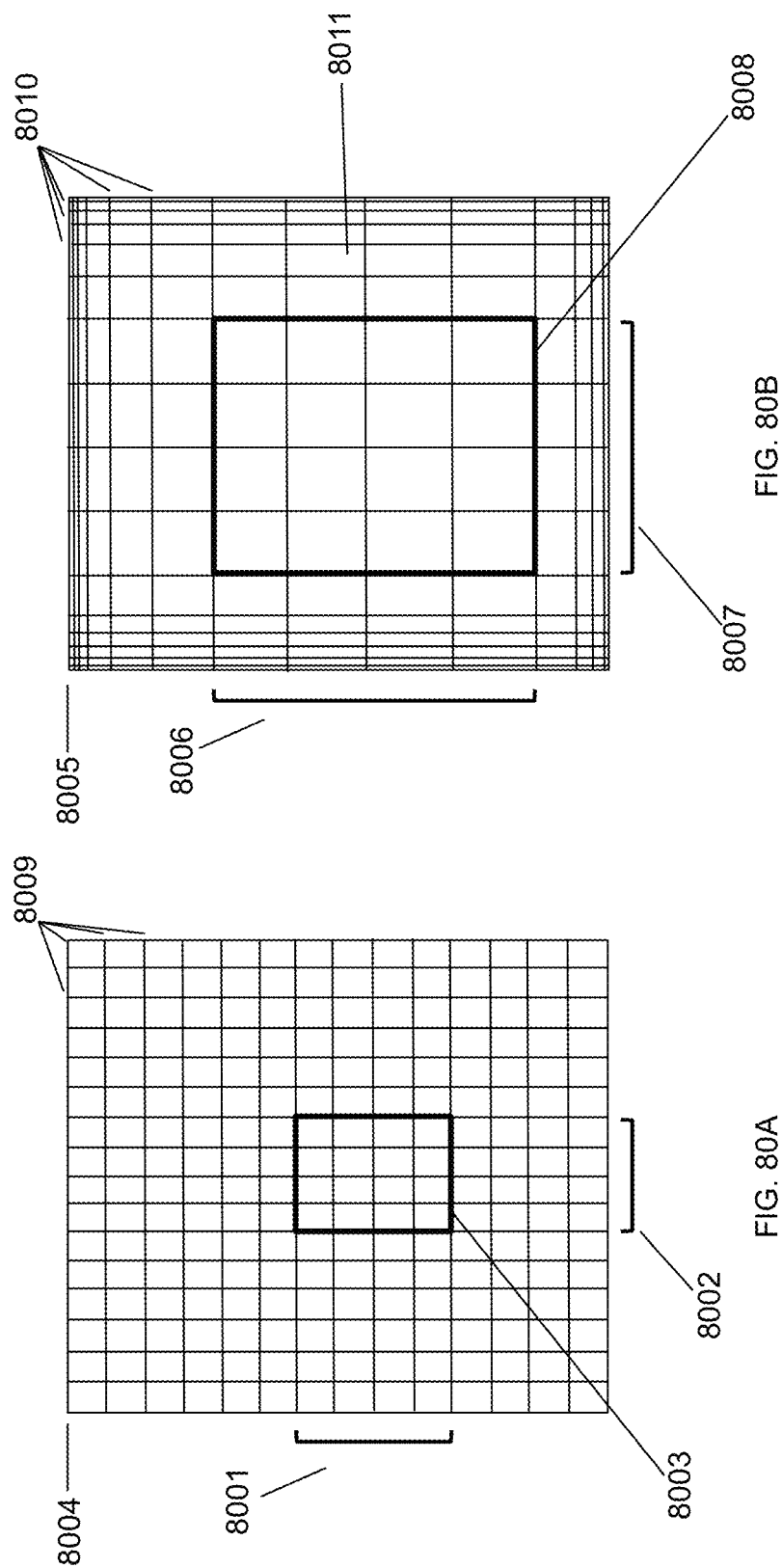

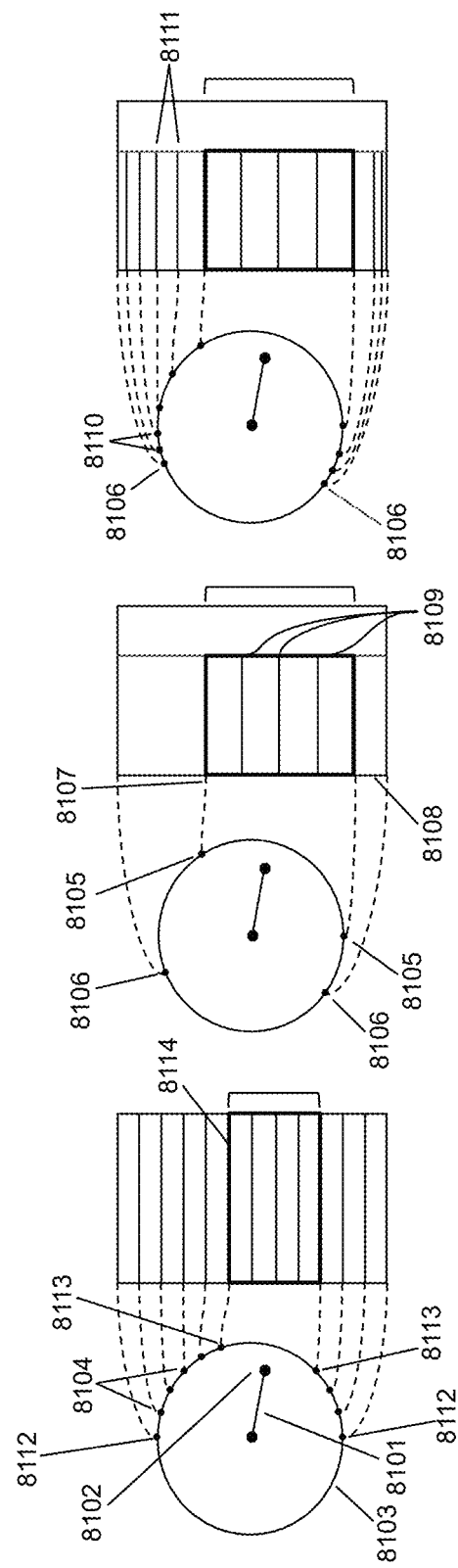

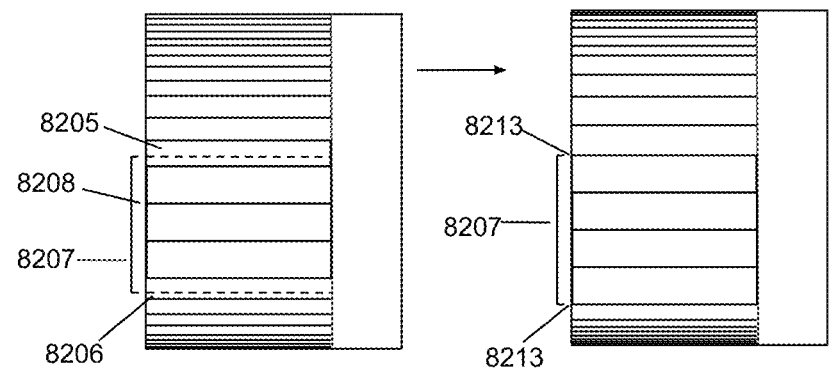
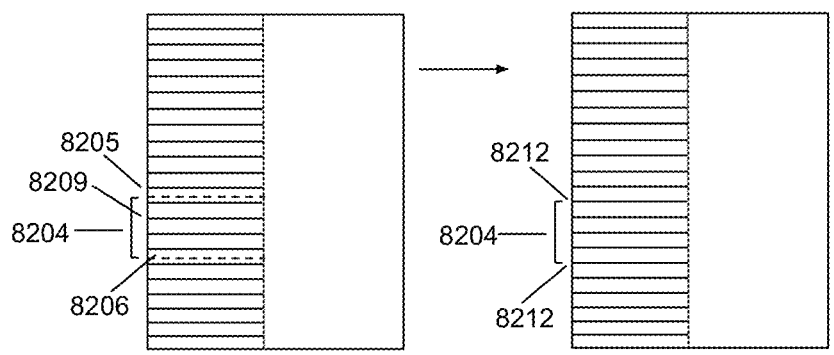
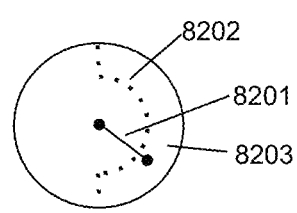
FIG. 82A
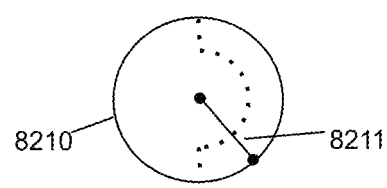
FIG. 82B

DYNAMIC VIEW USER INTERFACE SYSTEM AND METHOD

CROSS REFERENCE TO RELATED APPLICATIONS

This application is a continuation in part (GIP) of U.S. patent application Ser. No. 16/892,187, "Dynamic View User Interface System And. Method" filed on Jun. 3, 2020, now U.S. Pat. No. 10,969,876, which claims priority to U.S. Provisional Patent Application No. 62/856,596, "Dynamic View User Interface System And Method" filed on Jun. 3, 2019. U.S. patent application Ser. Nos. 16/892,187 and 62/856,596 are hereby incorporated by reference in their entireties.

BACKGROUND

Touchscreen and touchpad user interfaces (UIs) are used on various types of computing devices such as mobile smartphones, tablet computers, smart watches, and some desktop computers. Today, the majority of common touchscreen interactions fall back to the touchscreen analog of point-and-click, which means that user input is directly coupled to the size of the screen. For example, dragging and dropping an object across the screen requires larger and larger movements as screen size increases and becomes too intricate to perform reliably with a finger as the screen size decreases. The rising popularity of touchscreen interfaces has led to a small handful of special-purpose gestures to become commonly used (such as two-finger scroll, swipes, two-finger taps, pinch to zoom, etc.), but more comprehensive non-point-and-click gestural interfaces have failed to capture consumer attention at least in part due to the lack of a sufficiently general interface that provides interactive visual feedback.

Manipulating a large amount of information can be a problem on a small visual display. As UIs for software running on computing devices become more complex, the number of UI options can also increase. And another problem area is consistency of interaction. Traditional point-and-click style UIs often rely on the user to discover and memorize the locations and symbols for widgets, buttons, menus, etc. across applications. These can vary drastically, which requires a significant amount of manual design and testing. This inherent inconsistency can also inhibit or prevent user muscle memory. A UI that offers a consistent interaction across applications and layouts could save user, developer, and designer time.

What is needed is a UI system and method which allows more information to be shown on a small display screen so that a user can quickly enlarge areas of focus and intelligently enlarge UI options so that users can easily and intuitively make accurate UT selections, even when a large amount of information is present.

SUMMARY OF THE INVENTION

Touchscreen UIs on mobile computing devices can have improved efficiency and accuracy when making UI selections can be made through input gestures. The computing device can have a processor coupled to the UI that can detect a first input point of a gesture and the processor can form a touch circle around the first input point. The user can then swipe across the touchscreen as part of the gesture input and the user interface can detect a most recent input point in the gesture. The processor can then determine an input vector based on the first input point and the most recent input point of the gesture. (Note that a representation of UI controls such as touch circles could be optionally displayed on the visual display of the computing device in some embodiments, but such display is not necessary for the UI system to operate.)

The computing device can store a listing of data blocks and display a visible portion of the listing of data blocks that is displayed on the visual display while a non-visible portion of the listing of data blocks can exist on the list but not be visible on the visual display. The visible portion of the listing of data blocks can be controlled by UI gestures that are input by the user. In some embodiments, the processor can associate the visible portion of the listing with different angular regions of the touch circle of the user interface where each angular region is associated with one or more data blocks in the visible portion of the listing. The processor can interpret the input UI gesture and alter a visual zoom level that is based on a length of the input vector. The visual display can display the visible portion of the listing in a dynamic visualization based upon the assigned zoom level and the focus on the data block(s) associated with the angular region of the input vector. This feature can allow a user to easily zoom and scroll through large quantities of data blocks. The dynamic visualization converts a normal listing of data blocks from an initial layout to a focused display where at least one of the data blocks is enlarged in the visible portion of the listing of data and at least one of the data blocks is compressed or shrunk in the visible portion of the listing of data. In some embodiments, in the initial layout the data blocks can be uniformly rectangular and arranged in a grid, but in others they may appear in a more stylized layout (e.g., the layouts that can be observed in print publications or on web pages). The contents of the data blocks in the focused display can be larger in height and/or width than the contents of the data blocks that are outside the focused display. Similarly, the data blocks in the focused display can be larger in height and/or width than the data blocks outside the focused display. In some embodiments, the data blocks can be rectangular, but in other embodiments the data blocks can be any other shape such as circles, triangles, stars, etc. The size of these non-rectangular data blocks and their contents that are in the focused display can be larger than the size of the non-rectangular data blocks and their contents that are outside the focused display. In some embodiments the data blocks contain text. The dynamic visualization can indicate the increased focus by animating the visible portion of the listing of data based upon changes in the input vector. In some embodiments, the dynamic visualization indicates focus by altering a color or opacity of at least one of the data blocks in the visible portion of the listing of data based upon the assigned focus on at least one of the data blocks associated with the angular region of the input vector.

The user interactions with the UI can be used to control the operations of the computing device. For example, the processor can determine a control point based on the input vector and then parameterize a Möbius transformation using the control point. The processor can then use the Möbius transformation to drive a dynamic visualization that alters the visible portion of the listing of data blocks that is displayed on the visual display. The dynamic visualization can associate the data blocks in the visible portion of the listing in various ways. For example, in some embodiments the dynamic visualization can associate the data blocks in circular spaces or spherical spaces. In some embodiments, the dynamic visualization can associate the data blocks in the visible portion of the listing with pairs of points for the angular regions on a circumference boundary of the unit disc.

The UI can detect a final input point in a gesture. The processor can detect a final input vector based on the first input point of the gesture and a final input point of the gesture. The processor can then associate an action for each of the data blocks in the listing. The processor can then determine a selected data block or listing/group of data blocks based on the angular component of the final input vector. If the length of the final input vector is greater than a predetermined length to select the selected data block or listing/group the processor can perform the action associated with the selected data block or listing/group. The computing device can store in the memory, a history of the selected data block(s) and associated actions. If the computing device detects a back selection through the UI the processor can undo the action associated with the selected data block(s) and remove the action associated with the selected data block(s) from the memory.

In some embodiments, the UI can be used to select data blocks from an initial listing group with a first gesture and then select from a sublisting of data blocks with a subsequent gesture. The listing of data blocks can be displayed and the UI can be used to input a gesture. The computing device can interpret the completed gesture as the selection of a data block in the listing. Each of the data blocks can have a sublisting of data blocks. When the data block is selected, the UI can display the sublisting data blocks that were associated with the data block and stored in memory. The computing device can then detect a subsequent gesture and determine a subsequent input vector based on the subsequent gesture. A portion of the sublisting of data blocks can be displayed and a non-visible portion of the sublisting of data blocks may not be displayed. The user can use a scroll gesture to scroll through the sublisting to locate the desired sublisting data block. The computing device can associate each of the visible data blocks in the sublisting with different angular regions of the user interface and the processor can assign a sublisting focus and/or a sublisting zoom level that is based on a length of the input vector to each data block in the sublisting. The computing device can then display the visible portion of the sublisting in the dynamic visualization based upon the sublisting zoom level and/or the sublisting focus for each sublisting data block. The subsequent gesture can be used to select one of the data blocks from the sublisting, wherein the selected data block is associated with the angular region in which the last input vector of the subsequent gesture is contained.

In some embodiments, the computing device can detect concurrent gestures that are used to manipulate sublistings of data blocks. The single dynamic visualization can include a first dynamic visualization and nested individual dynamic visualizations, with the first dynamic visualization based on a first gesture, and the nested dynamic visualizations based on one or more gestures that are concurrent with the first gesture. Note that in some embodiments a single concurrent gesture may manipulate multiple sublistings simultaneously.

In some embodiments, the computing device can display a nondynamic visualization of the visible portion of the listing data blocks before the first input point of the gesture is detected by the user interface. The computing device can then transition from a nondynamic visualization to the dynamic visualization after the first input point of the gesture is detected by the user interface. Once the processor determines that a gesture has been completed, the computing device can return to displaying a nondynamic visualization of the listing data blocks.

In some embodiments, the listing has a visible portion that is displayed by the computing device and a non-visible portion that is accessible but not displayed. The UI can be used to scroll the listing so that the data blocks in the non-visible portion can be moved to the visible portion. If the computing device detects that the focus of the gesture has moved past a last data block in the visible portion of the listing of data blocks, the processor can revise the visible portion of the listing that includes subsequent data blocks and display the subsequent data blocks in the revised visible portion of the listing. Conversely, if the processor determines that the focus of the gesture has moved backwards past a first data block in the visible portion of the listing of data blocks the computing device can revise the visible portion of the listing that includes prior data blocks which are before the first data block. The computing device can then display the prior data blocks in the revised visible portion of the listing.

While the computing device can primarily provide visual UI display functionality, in some embodiments the UI can incorporate tactile or audio feedback. For example, in an embodiment, the computing device can include a vibration device coupled to the user interface. The processor can determine a control point based on the input vector and a selected data block from the listing based on the radial and angular components of the input vector. In response to detected gestures, the UI can respond with a vibration feedback. For example, the user interface can be vibrated with the vibration device to indicate that the selected data block has become active. In other embodiments, the computing device can include an audio device and in response to detected gestures, the UI can respond with audio feedback. For example, the computing device can emit an audio signal to indicate that the selected data block has become active.

In some embodiments, the UI functionality of the computing device can be configured by the user. The computing device can store a maximum drag distance from the start of a detected gesture. If the computing device detects a drag distance beyond the stored maximum drag distance, the UI scrolling can be limited. The computing device can also store a maximum number of listings that can be associated with an angular range on the UI input device. The computing device can limit the amount of angular motion that is applied to an input vector so that when the input vector is longer than the maximum drag distance, angular motion of the input vector through the angular range results in maximal focus traversing through the maximum number of listings.

In some embodiments, successive gestures can be used to refine a boundary of focus that contains a group of data blocks in the visible portion of the listing. The group of data blocks contained within the boundary of focus can be considered to be focused. Before any gestures begin, the edges of the visible portion of the listing can be the initial boundary of focus. Then successive gestures can interactively select an interval that bounds the focus on two opposite sides in a single dimension, narrowing the existing bounds in that dimension (also referred to as the zoom dimension). A history of gestures can allow the user to undo previous selections. The gestures may be concurrent, wherein a first gesture that starts chronologically before a second gesture is usually considered to precede the second gesture in a listing of concurrent gestures. In some embodiments a first gesture may precede a second gesture in the listing of concurrent gestures, but the first gesture does not result in a selection, so a third, chronologically subsequent, gesture may be placed before the second gesture in the listing of concurrent gestures. In this case the third gesture can be described as filling a gap in the listing of concurrent gestures that is left by the first gesture after it terminates. The gestures can continue to narrow the boundary of focus until it contains a single data block, and at this point an action stored in the memory can be executed by the processor. Some gestures can alter the dynamic visualization on the display so that the focused group of data blocks is zoomed in the associated zoom dimension and the visible data blocks outside the boundary of focus are compressed. Some gestures can alter the dynamic visualization on the display so that a color or an opacity of the focused group of data blocks appears visually distinct from the color or the opacity of the data blocks outside the boundary of focus. The degree of zoom and/or alteration in color and/or alteration in opacity can be based on the length of the associated input vector.

In some embodiments, all processing of data displayed on the display of the computing device can be processed by one or more central processing units (CPUs). In other embodiments, one or more graphics processing units (GPUs) can be used to process the data output to the display of the computing device. The GPU may perform the role of processor, possibly in conjunction with one or more other processors, with the processor(s) performing work in parallel where appropriate. The CPU and GPU can be referred to jointly or individually as processors.

BRIEF DESCRIPTION OF THE DRAWINGS

FIG. 3 illustrates an example of truncating a finger swipe on a touch circle of a UI.

FIG. 4 illustrates an example of moving a touch circle in response to a finger swipe on a UI.

FIG. 5 illustrates an example of moving a touch circle in response to an initial control point being too close to an edge of a touchscreen.

FIG. 6 illustrates an example of a unit disc having a central circle and satellite circles.

FIGS. 7A, 7B, 8A, and 8B illustrate a transformation PHI φ of a unit disc.

FIGS. 14A and 14B illustrate a boundary pair transformation.

FIG. 15 illustrates an example of a vertical listing of data which is partially visible on a computing device.

FIG. 16 illustrates an embodiment of a scroll disc UI.

FIG. 17 illustrates an embodiment of a control disc UI.

FIGS. 18-20 illustrate an embodiment of a scroll disc UI.

FIGS. 21-29 illustrate embodiments of user interactions with a scroll disc UI.

FIGS. 33-35 illustrate an example of a graphical transition mechanic.

FIGS. 50A-50C illustrate an embodiment of a UI intermediate group focusing.

FIGS. 51A-51D illustrate an embodiment of a UI intermediate group focusing.

FIGS. 57A-57D illustrate an embodiment of a UI for two finger vertical and horizontal focusing.

FIGS. 58A-58C illustrate an embodiment of a UI for single finger vertical and horizontal focusing.

FIGS. 68A-68D illustrate an embodiment of a UI for moving from a list to sublistings and listing data.

FIGS. 70A-70E illustrate an embodiment of a UI for scrolling through listing data and zooming on selected data.

FIGS. 71A-71C illustrate an embodiment of a UI for scrolling through graphical data and zooming on select graphical data.

FIGS. 73A-73E illustrate an embodiment wherein the user enlarges a focused region of a listing of data blocks on a display.

FIGS. 74A-74D illustrate an embodiment of a data block listing dynamically displayed on a display of a computing device and driven by a clockwise spiral gesture on a UI.

FIGS. 75A-75C illustrate an embodiment responding to a violation of focus on a UI.

FIGS. 77A-77B illustrate an embodiment of nested scrolling on a UI and a display of a computing device.

FIGS. 79A-79G illustrate a sequence of steps for selecting a character from a text document on a UI and a display of a computing device.

FIGS. 80A-80B illustrate determining revised data block boundaries using a Möbius transformation on a display.

FIGS. 81A-81C illustrate determining revised data block boundaries using a Möbius transformation on a UI and a display.

FIGS. 82A-82B illustrate an embodiment of snapping a selection on a UI and a display of a computing device.

DETAILED DESCRIPTION

Figure 2:
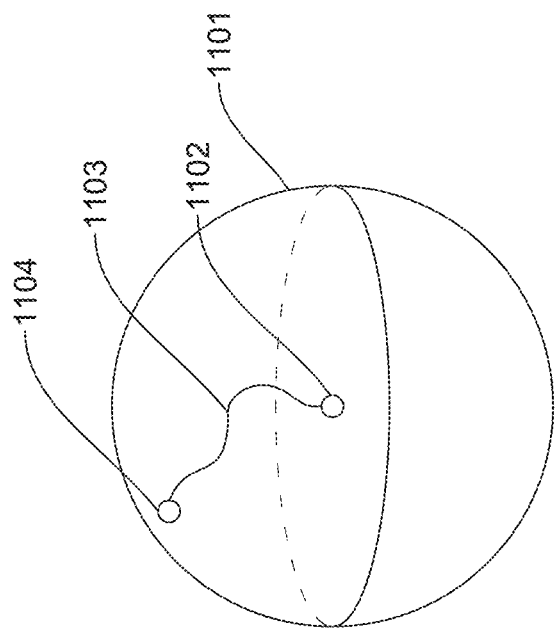
FIG. 2 illustrates a touch sphere that is part of a UI of a computing device.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CD-ROM, DVD-ROM, tape, erasable programmable read-only memory (EPROM or flash memory), or any magnetic, electromagnetic, infrared, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the present invention. In this specification, these implementations, or any other form that the invention may take, may be referred to as techniques. In general, the order of the steps of disclosed processes may be altered within the scope of the invention.

The currently dominant touchscreen mobile UIs on mobile computing devices are the result of trying to create a UI that is familiar to desktop users rather than a. UI that is best-suited for mobile touchscreen devices. What is needed is a user interface (UI) for a computing device having a touchscreen input that can utilize both non-traditional and non-point-and-click touch controls. The inventive UI can improve efficiency and accuracy when making UI selections and also encourages user finger muscle memory.

While the UI can be implemented on larger screens, the technology's development was inspired by wanting to perform complex tasks on a small screen such as a screen for a smartphone. The inventive UI does not require any exotic or special hardware and works with existing input mechanisms such as touch devices, trackpads, and mice, and it could also be implemented using three-dimensional input such as 3D mice and 3D finger motions/gestures or embedded in simulated three-dimensional environments such as Virtual Reality (VR) and Augmented Reality (AR).

A fundamental characteristic of the inventive UI is a "dynamic visualization", which can combine: an n-dimensional control point manipulated by the user in the context of a gesture, a visualization based on the control point, a collection of elements to select from, and angular/radial rules for object selection when the user terminates a gesture. In some embodiments, multiple dynamic visualizations are combined, which allows the user to control a single master visualization using multiple inputs (e.g., two or more fingers).

The inventive system can start with a "static view" and convert this into a dynamic view. The static view is an arbitrary layout in an n-dimensional space. Note that even though it is referred to here as a static view, it can include animations, video, etc. that are not directly associated with user input. The static view can be transformed into a dynamic view using an interpolation method. Some embodiments use a static view which is transformed into a dynamic view when a gesture begins and then transformed back into a static view when a gesture ends. This allows for optimal static viewing as well as dynamic view interaction by the user's fingers.

In some embodiments, angular motion of a user's finger swipe gestures on a UI input touchscreen may be used to scroll through elements of the collection, making some elements visible and hiding others. During the finger swipe gestures, angular motion may be used to scroll through elements of the collection, making some elements visible and hiding others. Scrolling can display a visible portion of the listed data on the display while other non-visible portions of the listed data can be hidden above and below, or left and right of the displayed portion of the listed data. This allows some embodiments of the invention to limit the number of collection elements displayed at a time. Some embodiments can subdivide the listed data into a tree of sublistings in order to limit the number of choices that can be made by a single gesture.

Some visualizations of data displayed may require fine-grained radial resolution, so those embodiments of the invention may apply a radial correction to give the areas of interest more radial resolution. More specifically, the can interpret a radial swipe input gesture as a zoom function and the amount of zoom can be proportional to the radial distance from an initial contact touch control point to the radial zoom position. By swiping radially, the zoom of data on a display of the computing device can be increased in a dynamic visualization. If an error has been made, the user can then swipe in an arcuate manner clockwise or counter clockwise to change the area of interest while maintaining the zoomed display.

Embodiments of the present invention could be implemented on any platform using any number of 2D or 3D inputs, including desktop computers, laptop computers, touchscreen computer Input/Output (IO) devices, smart watches, wearable computing devices, virtual reality (VR) computing devices, mobile and other types of computing devices. The UI of the inventive system can be used for various computing inputs including but not limited to: keyboards, nested menus, cursor navigation, text region selection, web pages with interactive elements, image viewers, contact database navigation, file browser controls, completion menus, context menus, video game heads up displays (HUD), window management, typing, text editing, software code editing, etc. Note that because the UI decouples user input from its visual representation spatially, the input and output need not reside on the same device. For example, hand gestures could be captured by a camera, or a touch device could be used to control a much larger screen, display wall, etc.

Touch Circles and Touch Spheres Inputs

The mechanics of the invention are computed based on a UI input gesture performed by a finger touch, drag, and release on a touchscreen, a mouse, pointing stick, or joystick click, drag, and release, etc. A useful construct for discussing such gestures is a "touch circle". A touch, swipe and release of a finger on a UI touchscreen can be one type of gesture. The touchscreen can detect the points of contact, swipes, and releases and the processor of the computing device can interpret the finger gestures detected by the UI. The input gesture can begin with a touch at an initial control point on the UI and the processor can respond by creating a touch circle that can be an imaginary circle placed around the initial touch control point. The radius of the touch circle can be a predefined constant that could be an application setting. Touch circles can be used as a basis for creating control points that are normalized based on the associated touch circle's radius, so that input points can be transformed so that points inside the touch circle land inside the unit disc. This allows for a representation of touch points that is independent of the touch circle radius and effectively establishes a radial scale for gestures.

Figure 1:
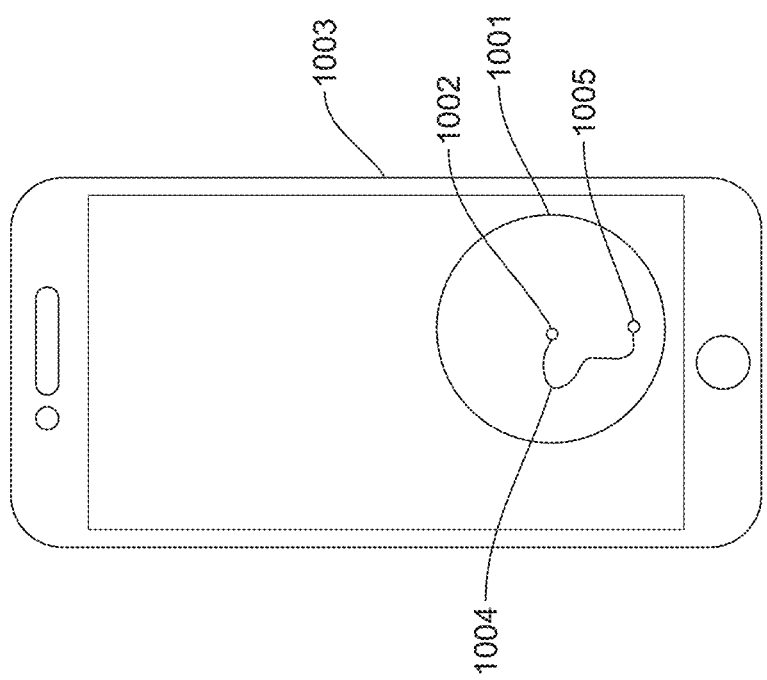
FIG. 1 illustrates a touch circle that is part of a UI of a computing device.

FIG. 1 illustrates an embodiment of a touch circle 1001 overlayed on the display of a mobile computing device 1003. The user can touch a first control point 1002 and a touch circle 1001 can be thought of as forming around the first control point 1002. The user can then swipe from the first control point 1002 along a non-linear path 1004 to the second control point 1005 where the user may release the touch contact with the touchscreen UI. The computing device 1003 can also display information on the touchscreen UI and the described interactions can be interpreted by the computing device to manipulate the information displayed. Some manipulations of information can be scrolling and zooming which will be described in more detail. Note that the location of the touch circle is determined by the initial touch point and that there is effectively no limitation on where the user needs to touch the screen. A graphical representation of the touch circle itself may be displayed but is not fundamentally necessary.

In other embodiments, the UI can utilize touch spheres rather than touch circles. Touch spheres are the analogous construct in three dimensions. Touch spheres could, for example, be manipulated using a 3D mouse or by detecting the length and orientation of a vector between two fingers or a finger and thumb in three-dimensional space.

FIG. 2 is an embodiment of a touch sphere which is analogous to the touch circle embodiment illustrated in FIG. 1. In this spherical touch point embodiment, a touch sphere 1101 is illustrated on the display of the computing device. The user can initiate the touch sphere 1101 at a first control point 1102 and move a control point outward along a path 1103 to a control point 1104 on the outer spherical surface of the touch sphere 1101. The UI can manipulate the information displayed by scrolling, zooming, and/or selecting data blocks which will be described in more detail.

When other input UI devices are being used such as pointing sticks and joysticks, these sensors can have a stick that is moved by a user. The tilt of the stick must first be translated into cumulative motion in the normal fashion in order to obtain a location inside a touch circle. The direction of the joystick can determine a movement direction of a cursor and an angle to the joystick can be proportional to velocity of the cursor. The joystick may also have buttons which can be used to initiate a touch. Thus, a user can press a button to place a control point and then the joystick can be manipulated to swipe to another control point. The user can repress or release the button to perform the touch release to complete the gesture input.

In some embodiments, movement outside the touch circle or touch sphere potentially with some margin can be treated as though the movement outside the circle or sphere were truncated at the boundary of the circle or sphere, and in other embodiments every time a control point lands outside the boundary, the center of the circle or sphere is moved such that the new control point is on the boundary in the same direction as before.

Other embodiments may have special rules for touch circles or spheres when the user's finger or cursor is at the edge of a physical input area (e.g., the edge of a touchpad). For example, a center could be established such that it is possible for the user to still have full range of motion for the touch circle, or an animation could be used to move the touch circle's center inward while the finger or cursor remains close to the boundary of the physical input area.

FIG. 3 is an example of truncating the touch point when a finger swipe 1202 moves outside the touch circle 1201. In this example, the user has touched the control point 1204 and then swipes in a path 1202 that extends outside the touch circle 1201 and then re-enters the touch circle 1201 before stopping at control point 1205. Rather than attempting to interpret the movement outside the touch circle 1201, the UI can create a truncated path 1203 that runs along the inner edge of the touch circle 1201 from the exit intersection of the touch circle 1201 and the swipe path 1202 to the entry intersection of the touch circle 1201 and the swipe path 1202. This truncation path 1203 guarantees that the control points 1204, 1205 will remain inside the unit disc touch circle 1201. This UI feature can also be applied to touch spheres.

FIG. 4 illustrates another embodiment of a UI system for ensuring that touch points translate to control points that remain inside the unit disc. In this embodiment, the user has initially touched the touchscreen at control point 1304. The user then swipes along the swipe path 1303 which contacts the touch circle 1301. Rather than allowing the swipe path 1303 to exit the touch circle 1301, the UI can move the touch circle 1302 with the user's swipe path 1303 until the second control point 1305 is reached. This UI feature can also be applied to touch spheres.

FIG. 5 illustrates an edge case where a user touches close to the edge of the screen 1401 of a computing device. Normally, the UI will create a touch circle 1402 with the first control point 1404 at the center of the touch circle 1402. However, if the first control point 1404 is too close to the edge of the display, there is insufficient room to swipe right on the screen 1401 and the functionality of the UI will be compromised. In order to prevent this type of UI malfunction, the UI can respond to a first control point 1404 being too close to the edge of the display by moving the touch circle 1403 away from the edge of the display 1401. In this example, the UI can place or move in an animated manner the touch circle to the left of the edge to provide space to use the whole touch circle 1403. The UI will move the touch circle to the right if the first control point is too close to the left edge of the screen, move the touch circle to the left if the first control point is too close to the right edge of the screen, move the touch circle down if the first control point is too close to the top edge of the screen, and move the touch circle up if the first control point is too close to the bottom edge of the screen. Similarly, combinations of movements can occur if the first control point is too close to a corner of the display screen 1401 by moving the touch circle down and left if the first control point is too close to the upper right corner, moving the touch circle down and right if the first control point is too close to the upper left corner, moving the touch circle up and left if the first control point is too close to the lower right corner, or moving the touch circle up and right if the first control point is too close to the lower left corner. This UI feature can also be applied to touch spheres.

Selection and Actions

Special UI control rules may be necessary for determining when a user has made a selection through the UI controls. The UI rules can be stored in memory and used by the processor to interpret UI inputs as gestures. Specific actions or gestures can be associated with UI user selections, so that making a user selection changes the state of the UI control application in a way that may be configurable by software on the client's computing device. Once a selection has been made, a control point may be stored to represent each user selection that is made, so that a visualization can be frozen for display and/or reversed by a back visualization which can be a graphical animation displayed on the visual display. The back visualization can parameterize a dynamic visualization by reducing the length of the stored control point based on a length of an input vector moving in a back direction, so that as the input vector grows longer in the back direction, the length of the control point used to parameterize the dynamic visualization approaches zero, and as the input vector grows shorter in the back direction, the length of the control point used to parameterize the dynamic visualization becomes maximal. The stored control point may be the control point at the time of selection, or the stored control point may be some canonical control point representing that selection (e.g., a control point of length one that is angularly centered in a disc sector associated with the selection). If a canonical control is used, an implementation may trigger an animation from the current control point to the canonical one. The canonical control point may also be referred to as a snapped input vector.

In an embodiment, the touch circle can be associated with a "scroll disc." FIG. 18 illustrates an embodiment of a "scroll disc" 128 used for scrolling control. The user can touch the touchscreen at an initial control point and the touch circle will form. From the initial center control point the user then swipes to a release control point where the user can release the touch control point. If a release happens inside the neutral zone 201, the control point moves or animates back to the center. If a release happens inside the back selector 205, the back action is triggered and the UI can go back to the prior selection. If the control point enters the scroll selector 123, the user can scroll through data and the back selector 205 becomes inactive for the rest of the gesture until the release. If a user releases while in the scroll margin 207 then a selection is made. In some embodiments, user selections may fail if they are within some angular margin of error of selection bounds. The user can perform the intended gesture again to perform the desired selection.

In some embodiments, a special back selection control action is possible through a gesture input to the UI. When a back selection is made, an associated back action is triggered. For example, the most recent selection could be reversed and the visual display may revert to a prior selection or screen display so that selection errors can be corrected by repeating the gesture inputs described above.

Because there may not be an outer radial bound on the region in which a gesture termination will successfully trigger a selection, selection accuracy improves with the drag length of the gesture. This is considered to be an improvement over systems where selections are based upon a closed area or volume (e.g., clicking or tapping a button on the UI).

The length of the gesture required to make any selection is bounded by and proportional to the size of the touch circle or touch sphere, so the length gesture required to perform any UI interaction can be minimized. This is considered to be an improvement over systems where operations are based on visual layout (e.g., tapping buttons or selecting from menus via point-and-click places no bound on the amount of motion required).

Gesture Stack

Multi gesture lookahead can be supported by the UI system for maintaining a stack of touches and associated control points. This allows for interleaving user input gestures and their visualizations in a similar fashion to interleaved motions while typing on a physical keyboard. In other words, more than one gesture can be simultaneously input into a UI by the user and interpreted and processed by the computing device at the same time. Each gesture can affect its own displayed visualization and hence the overall scene of data manipulation on the visual display. The current and upcoming visualizations can be thought of as a decision tree. If a second gesture begins while an earlier first gesture is still happening, the second gesture can be mapped to the entire next level of the decision tree for its duration. This means that the second gesture effects can potentially be seen on many nested visualizations in parallel on the display. The first gesture is thought of as the primary gesture, and if the first gesture makes a selection successfully, any gesture mapped to the next level of the tree becomes the primary gesture after the first gesture selection is completed. New gestures can be mapped to the first level of the tree that does not have an associated gesture. In some embodiments, non-primary (secondary) gestures cannot select, and in others, non-primary gestures can make selections that are frozen and finish processing if the first gesture selection is successful and the next tree level becomes primary.

Disc and Ball Automorphisms

In some embodiments, the UI visualizations can be achieved using an automorphism on the 2D unit disc or the 3D unit ball or sphere parameterized by, respectively, a 2D or 3D control point. A disc automorphism is a continuous mapping from the interior of the 2D unit disc to itself, and similarly, a ball automorphism is a continuous mapping from the interior of the 3D unit ball to itself. One useful disc automorphism PHI φ can be defined as a Möbius transformation:

$$\phi_c(z) = \frac{c-z}{z\bar{c}-1}$$

Where: c is the control point and both c and z are complex numbers.

PHI φ can have many interesting properties, including but not limited to mapping the boundary of the unit disc to itself, and 2D display mapping circles to circles. Similar transformations can be used to define an automorphism on the 3D unit sphere.

Input Mechanics

An input mechanic can be defined by a set of rules for transforming user input into data that, in combination with a set of listings and their associated data, can be used to drive visualizations shown on the display of the computing device. These visualizations may not require any extra coupling with user input. For example, a touchscreen visualization may not need to be displayed in a location and size centered on or adjacent to the position of the user's finger(s) on a touchscreen of the computing device. In particular, a visualization may make use of a "primary mechanic" (described below), possibly in some combination with a "back mechanic", a "grouping mechanic", a "scroll mechanic", or a "transition mechanic". Only the primary mechanic is necessary to form an input mechanic that can drive a visualization, and the other mechanics may be mixed and matched as necessary by the UI system.

Primary Mechanics

A primary mechanic on the inventive UI system is a technique for deriving control points from some region of a touch circle (or the whole touch circle) and using the control points to drive a visualization displayed on the display of the computing device based on a group of user input selections. Usually some interesting aspects of the visualization are tied to the location of the control point, such as the degree that selections are zoomed, their degree of focus/highlighting, etc. For some primary mechanics, the output is the data necessary for a visualization to position and scale a visual representation for each selection. In an embodiment, a visualization of data on the display may temporarily discard or conceal the visual representations for some selections determined to be of negligible interest to the user. In other embodiments, the visual output shown on the display can be an intensity or degree of focus that can be applied to each user selection. Still other embodiments can allow the UI visual output to position, scale, and focus information together.

Primary mechanics can be classified based on both the dimensionality of the control points they operate on and the dimensionality of the visualization input data they produce for each selection. The control UI input and visualization display can be described as 1D, 2D, and 3D. For example, a 3D-2D (3D input-2D display output) primary mechanic might use a 3D control point to produce three points that define a circle in a 2D plane on a visual display.

A very general 2D-2D mechanic uses a 2D input like a finger on a touchscreen to derive a control point for mapping input circles inside the unit disc to output circles inside the unit disc which can then be mapped to a 2D display. The output circles can be found by choosing three input points on each input circle, applying the mapping PHI φ to the input points, resulting in three output points, and using the resulting three output points to solve for the unique output circle that contains the new points. While this is a general solution for zooming and shrinking circles according to PHI φ, it can be subject to floating point error, which may be mitigated in some circumstances by choosing input points intelligently or by using more than three input points.

Many 2D-2D mechanics can be implemented in terms of disc sectors. One way to define a sector is to choose an ordered pair of points on the boundary of the unit disc. The disc sector is bounded by the line segments connecting the points with the center of the unit disc and the boundary arc between the two points. Thus, by applying a disc automorphism to pairs of boundary points, a mapping on disc sectors can be achieved. Note that while disc automorphisms are particularly convenient for this purpose, other boundary point mappings can yield similar results.

2D-1D mechanics take 2D control points and use them to manipulate points in a 1D interval. For simplicity, this interval can be chosen as [0, 1], but any other interval could easily be used. Any function mapping the interval to itself that can be parameterized using a 2D control point can be used to drive a visualization. One application is for zooming parts of the interval whilst simultaneously shrinking others.

Note that although the output of a 2D-1D mechanic is one-dimensional, such a mechanic can be used to display data in more dimensions. For example, a vertical menu as in FIG. 15 may be specified based on one-dimensional information describing the boundaries of the menu entries.

2D-0D mechanics use 2D control points to assign a value in the interval [0, 1] to each selection. This can be implemented by using a 2D-1D mechanic and assigning boundary points to each selection. The final value is based on the distance between the transformed boundary points. One embodiment uses this value to determine the opacity of a highlight color for a selection.

3D-3D mechanics use 3D control points in the 3D displayed unit ball which can be a unit sphere along with its interior to manipulate radial conical sections of the 3D unit ball emanating from the origin. The radial conical sections of the 3D unit ball can be analogous to sectors for 2D-2D mechanics. These cones can be given an orientation to distinguish their interior from exterior. Each of these cones can be associated with a sphere tangent to both the boundary of the cone and the boundary of the 3D unit disc. Each cone is also equivalent to a sphere that is tangent to the cone at the same circle at which the cone intersects the 3D unit ball. Planes through the origin represent degenerate radial cones, and they can be associated with a sphere tangent to the 3D unit ball and the plane.

In an embodiment, 3D-2D mechanics can be created by operating on the circles at which radial cones intersect the 3D unit ball.

In an embodiment, 3D-0D mechanics can be created by computing the area/volume of the circles/spheres manipulated by the previous mechanics.

Boundary Pair 2D-1D Mechanic Example

With reference to FIGS. 14A and 14B, the points 3001 on the unit interval 3005 are mapped angularly onto the points 3002 on the boundary of the unit disc 3006. The listings 3007 are associated with pairs of boundary points 3002. The disc automorphism PHI φ is used to map boundary points 3002 to boundary points 3003, which can then be transformed angularly back onto the unit interval 3005 to points 3004 on the unit interval 3005. In some embodiments, the distance between pairs of adjacent points 3004 can be used to alter the visualization of listings 3007. For example, the points 3004 can be used to determine the opacity of a highlighting layer so that the listings 3007 associated with points 3004 that are further apart appear with a greater degree of highlighting. In some embodiments, the points 3004 can be used to determine the upper and lower edges of menu listings as in FIGS. 52-53.

Satellite Circle 2D-2D Mechanic Example

An embodiment of a "satellite circle" is illustrated in FIG. 6. The "satellite circle" 122 can be defined as a circle tangent to both the radial sides of a sector of the unit disc 123 and the boundary of the unit disc 123. Because a satellite circle 122 can be defined in terms of a disc sector, a mapping of disc sectors translates to a mapping of satellite circles 122.

FIGS. 6-8 illustrate a visualization based on a satellite circle primary mechanic. With reference to FIG. 6, the circular transformations of the satellite circles 122 can have a specific geometric relationship to the transformation of the central circle 121. FIG. 6 illustrates a group of twelve satellite circles 122 that are equal in size and placed between an outer unit disc 123 and a central circle 121 that can be graphically transformed through the UI. In particular, because the disc automorphism PHI φ is a continuous mapping of circles to circles, the result of the transformation is guaranteed to have a configuration similar to that depicted in FIGS. 7A, 7B, 8A, and 8B. As the control point 153 is moved outward, the satellite circles 122 closer to the direction of the control point 153 become larger, and the circles 122 furthest from the direction of the control point 153 become smaller.

This transformation of circles can be achieved by taking three points on any circle inside the unit disc 123 and then transforming those points using the disc automorphism PHI φ. The resulting points lie on the transformed circle, which can be solved for by finding the unique circle containing those three points. This is a brute-force solution that can be used for any of the circles in FIG. 7A and performed completely in parallel, but it can have issues with floating point error. More accurate results can be achieved for this specific configuration by using two separate parallelizable techniques: one that solves for central circles 121, and one that solves for satellite circles 122.

FIGS. 7A and 7B illustrate a process for solving for the image of the central circle 121 under the transformation PHI φ. The inventive system applies the transformation PHI φ to the points 151 and 155 that are collinear with both the control point 153 and the center 111 of the central circle 121. Due to symmetry of the transformation, the images $\varphi_c$ (p) and $\varphi_c$ (q) of these two points under the mapping PHI φ are still collinear with the center of the transformed central circle 121, so they can be used to solve for the center of the circle by averaging their locations.

The circular transformations of the satellite circles 122 can have a specific geometric relationship to the central circle 121. The circle transformation can be achieved by taking three points on any circle inside the unit disc 123 and then transforming the satellite circles 122 using the Möbius disc automorphism, and solving for the resulting circle. This solution can be performed completely in parallel, but in general it can have issues with floating point error. The inventive transformation process can use two separate (parallelizable) techniques: one that solves for central circles 121, and one that solves for satellite circles 122.

In an embodiment, a processor of the computing device running UI software can solve for the central circle as shown in FIGS. 7A and 7B. With reference to FIGS. 7A-7B, the center 111 is associated with the beginning of a user gesture, and the control point c 153 is associated with the current position of the gesture. A processor can apply the transformation PHI φ to the points 151 and 155 that are collinear with both the control point 153 and the center 111 of the circle 121. With reference to FIG. 7B, due to symmetry of the transformation PHI φ, the images of the two points 151, 155 under the mapping PHI φ still lie on the same line 150 as the transformed central circle 121, so a processor can use them to solve for the center of the transformed circle 131 by averaging their locations. A zero-length control point where the location of the control point 153 is the same as the center point 111 is a special case where the central circle doesn't move.

FIGS. 8A and 8B illustrate a process for solving for the image of a satellite circle 122 under the transformation PHI φ. The inventive system can illustrate the movement of the central circle 121 by solving for a satellite circle 122. The inventive system can solve for the locations of the satellite circles 122 based upon a geometric relationship between the satellite circles 122 and the central circle 121. FIG. 8A illustrates the satellite circles 122 displayed touching the unit circle 123 and central circle 121. The transformed satellite circles 122 remain tangent at the same points. Radial lines extending from the center of the unit circle 123 through the centers each of the satellite circles 122 also contacts the unit circle 123 at the touch points with the satellite circles 122. More specifically, the unit circle center 111, the centers of the satellite circles 122, and the contact points of the satellite circles 122 with the unit circle 123 are all collinear. With reference to FIG. 8B, the user can swipe up and right and the central circle 121 moves to the lower left, the centers of each of the satellite circles 122 and the contact points of the satellite circles 122 with the central circle 121 are also each collinear.

To solve for a satellite circle S 124, the unique properties of the transformation $\varphi_c$ can be exploited. For example, point p 126 is a point where the unit circle D 123 and satellite circle S 124 touch and point q 120 is a point where the central circle C 121 and satellite circle S 124 touch. The unit circle center 111 is aligned with point p 126 and point q 120 as well as the center of the satellite circle 124. As the central circle 121 moves to the lower left, the center point $m_c$ 151 of the central circle 121 also moves to the lower left as shown in FIG. 8B. The point $\varphi_c$ (p) can still be at the intersection of $\varphi_c$ (D)=D and $\varphi_c$ (S), and $\varphi_c$ (q) can be at the intersection of $\varphi_c$ (C) and $\varphi_c$ (S). In other words, the transformed circles should still be tangent at the same points. $R_D$ can be a line from the center of the unit disc 123 to the point $\varphi_c$ (p) and $R_C$ can be a line from the center 151 of the central circle 121 to the point $\varphi_c$ (q). The center of satellite circle S 124 can lie at the intersection of the lines $R_D$ 132 and $R_C$ 134.

Figure 9:
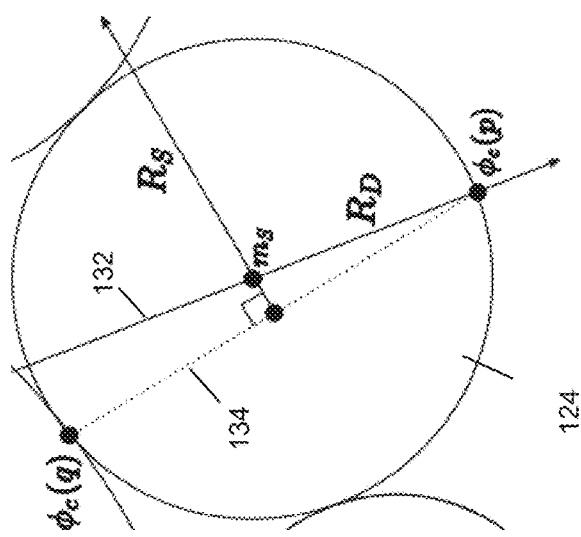
FIG. 9 illustrates a detailed view of a satellite circle.

With reference to FIG. 9, in general, it may be problematic to solve for the center $m_S$ of the satellite circle $\varphi_c$ (S) 124 by intersecting lines $R_D$ 132 and $R_C$ 134 because these lines may either be the same line where the starting point is control point 0 or these lines can intersect at a very shallow angle. Instead, $R_S$ 132 can be a line originating at $(\varphi_c(p)+\varphi_c(q))/2$ in a direction that can be perpendicular to $\varphi_c(p)-\varphi_c(q)$. The center $m_S$ of the circle $\varphi_c(S)$ 124 can be found by intersecting the lines $R_D$ 132 and $R_S$ 134. Given $m_S$, the radius of the circle $\varphi_c(S)$ 124 can be found by computing the distance to one of the points $\varphi_c(p)$ or $\varphi_c(q)$.

Radial Sensitivity Adjustment

When a larger number of satellite circles are simultaneously shown on the computing device display, it becomes more difficult to precisely zoom in on a specific satellite circle without additional control point preprocessing. The inventive system can have a "Radial Sensitivity Adjustment" which eliminates this zoom resolution issue by ensuring a consistent radial zoom that is independent of the number of satellite circles simultaneously being displayed. The Radial Sensitivity Adjustment is achieved by creating a band along the outer control circle for which zoom is defined in terms of satellite radius. In practice, when dealing with satellite circles, the maximum control point length should be less than one. In cases where the satellite circles are tangent, the distance from the center to the tangent point is a possible maximum control point length.

Figure 10:
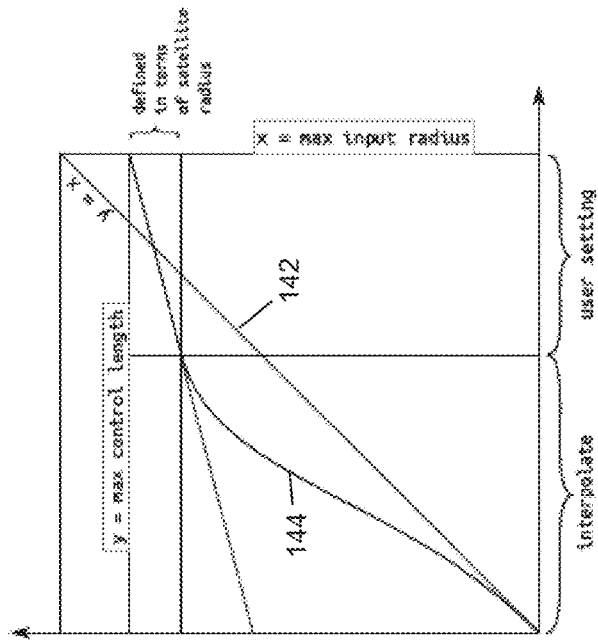
FIG. 10 illustrates a radial sensitivity graph.

FIG. 10 is a graph illustrating an embodiment of a relationship for adjusting the length of a control point based on a normalized physical input radius. The 45 degree line 142 represents a linear relationship between the user UI input radius X and the control length Y. The horizontal X movement can represent the physical radial distance from the finger on the touchscreen (or other UI input) to the initial touch point. The vertical Y movement can represent the new length assigned to the control point. In the graph the lines 142 and 144 pass through the horizontal line whose distance from the max control length can be defined in terms of satellite circle radius. The line 142 terminates at the horizontal line that represents the unit disc outer diameter tangent to the outer portions of the satellite circles.

When there are a large number of satellite circles, it can be difficult to control the satellite circle visualization because the unzoomed satellite circles are very small, and the amount of zoom on a single satellite circle for a given input radius is proportional to the number of satellite circles. A radial sensitivity adjustment can ensure that a consistent zoom is achieved independent of the number of satellite circles. In an embodiment, a processor can be configured to provide a non-linear relationship between the user UI input radius X and the control length Y such as the curved line 144. In an embodiment, the user can configure the UI to alter the relationship between the user UI input radius X and the control length Y so that as the UI input radius X is greater than 50% of the max input radius, the relationship between the user UI input radius X and the control length Y can result in more UI control sensitivity which can be configured by the user to match the user's sensitivity preference. Once the user has configured the sensitivity, the system can use the input radius interpolate between the line y=x and a line with a more gradual slope depicted in FIG. 10 merging with the line 144, yielding a higher sensitivity in the radial area of the input space where more UI controls are being performed.

Figure 11:
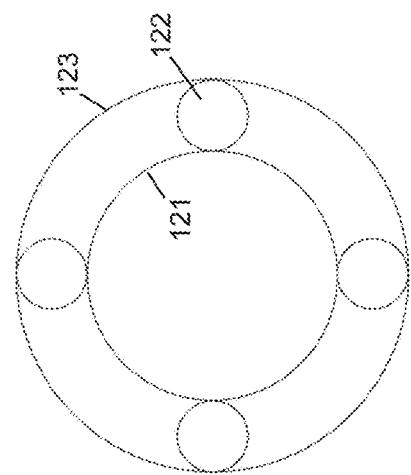
FIG. 11 illustrates an example of a unit disc having a central circle and four satellite circles on a display.

Sometimes a UI display may only require a few satellite circles, so for visual consistency or aesthetic symmetry, it can be necessary to cap the maximum satellite circle radius. With reference to FIG. 11, it can be useful to not have enough satellite circles to completely fill the annular space between the unit disc and the central circle. In the illustrated example there are only four satellite circles 122 which must each fit between the central circle 121 and the unit circle 123. The processor can display the satellite circles 122 in an evenly distributed manner in the annular space between the central circle 121 and the unit circle 123. This results in satellite circles 122 being displayed in a manner where the satellite circles 122 do not touch one another. The reduced number of satellite circles 122 can be manipulated using the same disc automorphism described in embodiments having more satellite circles 122.

Boundary Pairs Examples

Figures 12, 13:
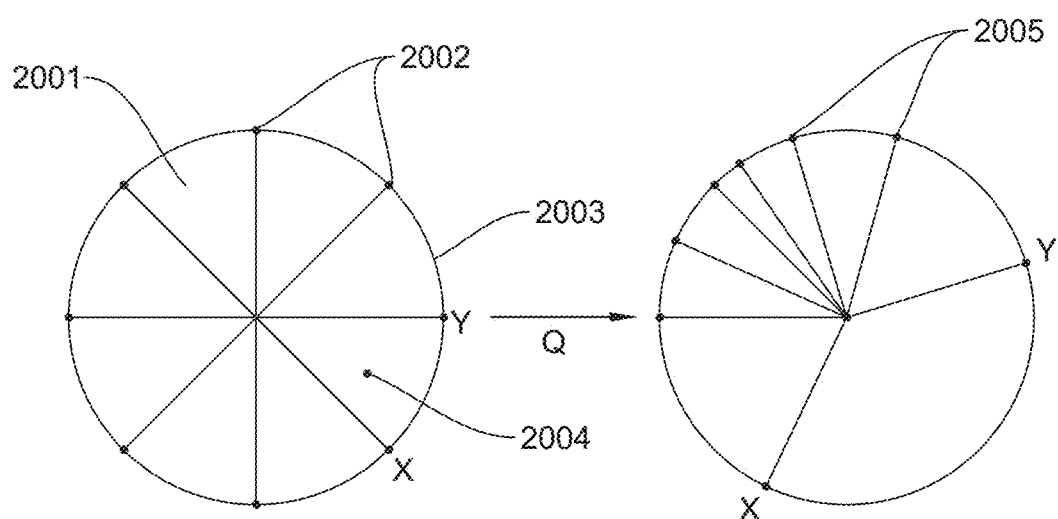
FIGS. 12 and 13 illustrate an example of a boundary pair mechanic for a unit disc having eight disc sectors.

In some embodiments, the UI system can perform boundary pair mechanics. With reference to FIGS. 12 and 13, a boundary pair mechanic can be thought of as operating on disc sectors 2001 which can be pie slice shaped pieces arranged in the unit disc 2003. In FIG. 12 the unit disc 2003 has eight disc sectors 2001 which are uniform in size and shape and each of the sectors can have spaced boundary points 2002 on the boundary of the unit disc 2003. In this example, the user has initiated a gesture resulting in a control point at the center of the unit disc 2003 and gestured outward resulting in control point 2004 between boundary pair points X and Y. With reference to FIG. 13, this radial gesture can result in the movement of boundary points 2005 on the circumference of the unit disc 2003. The UI system interprets this gesture as expressing interest in the sector determined by the boundary pair points X and Y which results in this disc sector 2001 expanding while the other disc sectors 2001 are compressed. Boundary pair mechanics apply a disc automorphism to pairs of points 2002 on the boundary of the unit disc 2003, resulting in a new pair of points 2005 on the unit disc boundary for each pair 2002 to which the transformation is applied.

With reference to FIGS. 14A and 14B an embodiment of a transformation PHI $\varphi$ of a data listing is illustrated. In the illustrated embodiment the data listing shown on the visual display can be uniform. The selections 3007 on the vertical listing are A, B, C, D, E, and F which can each be associated with pairs of points 3001 inside the unit interval 3005 between 0 and 1. The unit interval 3005 can be mapped angularly onto the boundary of the unit disc 3006, and the same mapping can be used to associate the selections 3007 A, B, C, D, E, and F with arcs bounded by the points 3002 on the unit disc 3006. The user can manipulate the control point 3003 via a gesture whose beginning can be associated with the center of the unit disc 3006.

The UI can apply the disc automorphism PHI $\varphi$ to the unit disc 3003, which yields the transformed points 3003. The portion of the boundary containing the transformed points 3003 can be mapped back to the unit interval 3005 such that the angular distances between each relevant pair of points 3003 is proportional to the distance between the associated pair of points 3004. The final result points 3004 can be used to drive a visualization such as a menu zoom. In some embodiments, the distance between result points 3004 can be used to drive a visualization such as the intensity of the highlight color for menu selections.

Angular Selection Mapping

See FIGS. 15-17 for an example of an "angular selection mapping." In some embodiments, any visualization that operates with a scroll mechanic such as the scroll disc 123 shown in FIG. 16 can create an angular selection mapping control disc 125 shown in FIG. 17. This mapping associates bounding angles with each selection. Adjacent selections could share bounding angles. These angles are not required to lie between 0 and $2\pi$. Only selections with at least one bounding angle in the current selection window are intended to be visible. In this example, only the areas associated with h to m are displayed.

As in other embodiments, the control point is used to manipulate a visual display output. An example of a visual display is illustrated in FIG. 15. In this example, there is a vertical arranged data list 162 with each row of the data list being labeled "a" through "n". A visible window 164 identifies the listings that are displayed on the visual display. The other listings are not displayed which can be virtually above or below the visible window. In this example, the listing data h through m are in the visible window 164 and displayed on the display of the computing device.

Rather than displaying each row of data in the same text size, the rows of data that are in the visible window 164 can be displayed in different text sizes on the display so that the listing of interest which can be the center displayed listing has the largest display area or fully enlarged display status. The adjacent listings can also be displayed in an enlarged format that is smaller than the fully enlarged size. The peripheral listings at the upper and lower portions of the display can have decreasingly smaller text size formats based upon the distances from the center fully enlarged listing.

In FIG. 15, the center listing "k" is fully enlarged text "do" at the center listing of the visible window. The first adjacent listings are "j" above and "l" below which correspond to the partially enlarged text "sed" and "eiusmod" that can be displayed in an enlarged text but a text size that is smaller than the center listing. The next outer listings that are still within the visible window are "i" above and "m" below which correspond to the text "elit" and "consectetur" that are in a smaller text size. The final row in the visible window 164 is "h" at the top of the displayed visible window which can be in the smallest text size.

FIG. 16 illustrates a scroll disc 128 that corresponds to the visualization in FIG. 15. The corresponding scroll disc 128 that is illustrated has a scroll selector which is divided into six areas that correspond to the listings h, i, j, k, l, and m. In the illustrated example, the control point 213 is in the k area of the scroll selector which corresponds with "do" being fully enlarged in the visible window shown in FIG. 15. The user can swipe in a clockwise or counterclockwise direction and the control point 213 can move through different scroll zones. With reference to FIG. 17 a control disc 130 is illustrated, which can be controlled to alter the listing shown in the visible window (shown in FIG. 15). The user can manipulate the control disc 130 by swiping in a counterclockwise rotational movement to move the data list 162 up or in a clockwise rotational movement to move the data list 162 down. As the data list moves, the six rows of text data in the visible window will scroll and the fully enlarged text can shift up or down changing the text which is fully enlarged and partially enlarged in the visible window. Thus, as the user swipes, the listings will also change the data listings in the visible window.

The distribution of the data listing can correspond to the circumference of the control disc 130. In the illustrated example, the listing can include 14 rows of text data and the control disc 130 can be divided into 12 equal angular segments. If the entire control disc 130 is 360 degrees or a then each of the 12 angular segments is $\pi/6$. Table 1 below lists the marked letters, angular position, and visible status in FIGS. 15-17.

TABLE 1

| Letter Designation | Between the Angles | Text | Visible Window |
|---|---|---|---|
| a | $0 - \pi/6$ | linphon | No |
| b | $\pi/6 - \pi/3$, 30 degrees | incididunt | No |
| c | $\pi/3 - \pi/2$, 60 degrees | at | No |
| d | $\pi/2 - 2\pi/3$, 90 degrees | loren | No |
| e | $2\pi/3 - \pi/6$, 120 degrees | lapster | No |
| f | $5\pi/6 - \pi$, 150 degrees | dolor | No |
| g | $\pi - 7\pi/6$, 180 degrees | sit | No |
| h | $7\pi/6 - 4\pi/3$, 210 degrees | eoit | Yes |
| i | $4\pi/3 - 3\pi/2$, 240 degrees | elit | Yes |
| j | $3\pi/2 - 5\pi/3$, 270 degrees | sed | Yes |
| k | $5\pi/3 - 11\pi/6$, 300 degrees | do | Yes |
| l | $11\pi/6 - 2\pi$, 330 degrees | eiusmod | Yes |
| m | $2\pi - 13\pi/6$, 360 degrees | consectetur | Yes |
| n | $13\pi/6 - 7\pi/3$, 390 degrees | adipiscing | No |

The scroll point can be mapped to the control disc 130 by finding the $\psi$-rotated scroll point's location in the $\varphi$-rotated control disc. The rotation $\varphi$ corresponds to a Rotational Sensitivity Adjustment which is described later. The visible window can be found by matching the angles subtended by the scroll selector with the angles corresponding with selections on the $\varphi$-rotated control disc. In order to manipulate the visible window, a boundary pair mechanic can be applied to the pairs of boundary points bounding the selections in the scroll disc 123. The visible window can be frozen when a circular scrolling gesture continues such that the visible window would otherwise move beyond the beginning or the end of the list of selections.

Scroll Mechanic

The inventive system and method can provide additional different UI mechanics for making user selections. In an embodiment, the present invention can be applied to a more familiar rectangular data layout displayed on the computing device display. The data can be arranged in a table with vertical or horizontal data cells on the visual display. The UI system can also provide a means for scrolling through content that can be temporarily visible on the display where the user can display some data and then scroll to display data that is concealed and not displayed. A scroll mechanic is a technique for determining a contiguous range of active selections from a larger group of selections. This allows for placing an upper bound on the number of elements that the primary mechanic is applied to, and in some embodiments inactive selections will not be displayed at all.

FIG. 18 illustrates an embodiment of a "scroll disc" 128 used as the input controls for the UI system for scrolling control. The scroll disc 128 can have different designated scroll control regions. Alternative embodiments might use some combination of rotations or reflections of the same configuration. In this example, the circular region 123 can be associated with a touch circle on a touchpad, but any other 2D input device could be similarly associated. The center of the unit disc 123 can be a "neutral zone" 201. A half annular space on the right side of the unit disc 123 to the right of the neutral zone 201 can be a scroll selector area 203. An area to the left side of the unit disc 123 to the left of the neutral zone 201 can be a "back selector" area 205. The user can touch and swipe to manipulate a control point on the circular unit disc 123 to control the UI.

With reference to FIG. 19, a user has dragged the touchpad resulting in the control point 213. Since the control point 213 is in the scroll zone 223, the control point 213 is also a scroll point 215. The back point 211 is a user input that causes the processor to cause the display to reverse prior visualization in the displayed information visualizations, and the scroll point 223 is a user touch point used as the control input to scroll visualizations. When the control point 213 is in the scroll zone 223, the back point 211 is at the origin center of the scroll disc 123. An upper back zone 225 and a lower back zone 227 are to the left of the back point 211 and the vertical center line of the unit circle 123.

From the control point 213, the user can perform scrolling through a listing of data where some of the listing data is clearly displayed and at least some of the listing of data is not displayed. When the control point 213 is in the scroll zone 223, the user can swipe upward in a counterclockwise direction to cause the display to scroll the displayed data in one direction or swipe downward in a clockwise direction to cause the display to scroll the displayed data in an opposite second direction. For example, swiping upward in a counterclockwise direction causes the listed data to scroll upward and swiping downward in a clockwise direction can cause the listed data to scroll downward.

With reference to FIG. 20, the user has dragged to the lower left of the position at which they touched the touchpad, and a processor has assigned a control point 213 in the lower left back zone 227. The "back point" 211 is the projection of the control point 213 onto the horizontal axis, and the scroll point is the projection of the control point onto the vertical axis. The back point 211 is used to control the back visualization. The back point 211 can be a value between zero and one, which can be thought of as a point along the negative x axis to the left of the origin 211.

Both the control disc and the scroll disc can have an associated disc rotation. The control rotation can be represented by φ and the scroll rotation can be represented by ψ. When the control point is inside the scroll selector, the control disc's rotation can be controlled according to rotational sensitivity adjustment the rotational sensitivity adjustment (RSA) which will be described with reference to FIGS. 36-38 below.

FIGS. 21-23 illustrate an example of a user interaction with an embodiment of a scroll disc 128. In FIG. 21 the user has touched the touchpad and dragged outward, resulting in the control point 213 in the scroll selector area 123. The user then drags the control point left toward the upper scroll margin 207. If the control point 213 moves from the scroll selector area 123 onto the boundary of the scroll margin 207, the interior regions of the scroll disc 128 including back selector 205, scroll margin 207, neutral zone 201, and scroll selector 203 can rotate so that the control point 213 stays on the boundary. In some embodiments, rotation of the scroll disc can inactivate the back selector for the duration of the gesture. With reference to FIG. 22, the user's finger has swiped left and the control point 213 is moved onto the vertical line dividing the scroll margin 207 from the scroll selector 123. With reference to FIG. 23, as the user continues to swipe the control point 213 to the left, the interior zone areas have rotated counterclockwise within the scroll disc with the control point 213 on the center dividing line between the scroll margin 207 and scroll selector 123.

FIGS. 24-26 illustrate another example of a user interaction with an embodiment of a scroll disc 128. With reference to FIG. 24, the user has dragged the control point 213 into the scroll margin 207 from below, bypassing the boundary between the scroll margin 207 and the scroll selector 123. The user drags the control point counterclockwise away from the scroll selector area 123. In FIG. 25, the control point 213 remains in the scroll margin 207 while the finger and control point 213 continue to rotate counterclockwise. All of the interior regions of the scroll disc 128 including back selector 205, scroll margin 207, neutral zone 201, and scroll selector 203 can also rotate counterclockwise, but at a faster rate than the control point, allowing the boundary between the scroll margin 207 and the scroll selector 123 to partially catch up to the control point. The back selector 205 may become deactivated due to the rotation. In FIG. 26, the control point 213 has continued on a counterclockwise path, and the line between the scroll margin 207 and the scroll selector 123 has caught up to the control point 213.

With reference to FIGS. 27-29, the user drags the control point 213 clockwise while the scroll disc 128 and the interior regions including the back selector 205, scroll margin 207, neutral zone 201, and scroll selector 203 remain stationary. With reference to FIG. 27, the scroll disc 128 has been rotated counterclockwise and the user is in the middle of a clockwise drag, with the control point 213 in the scroll margin 207. With reference to FIG. 28, the user continues to drag the control point 213 clockwise from the scroll margin 207 into the scroll selector 123. With reference to FIG. 29, the user has continued to drag the control point 213 clockwise into the scroll selector 123.

Jumping Scroll Mechanic Example

Figure 30B:
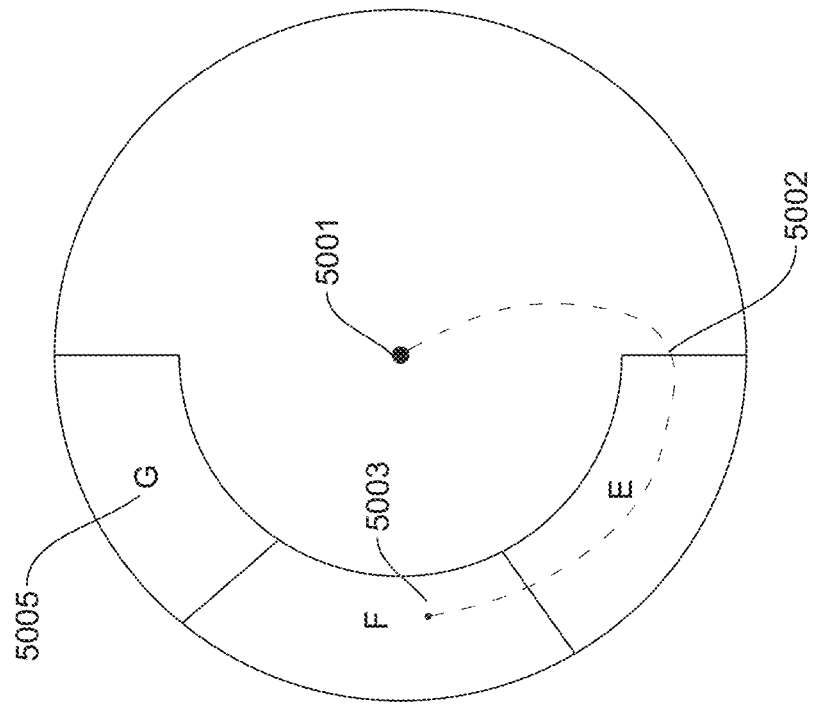
FIGS. 30A and 30B illustrate an embodiment of a user selection with a scroll disc UI.
Figure 30A:
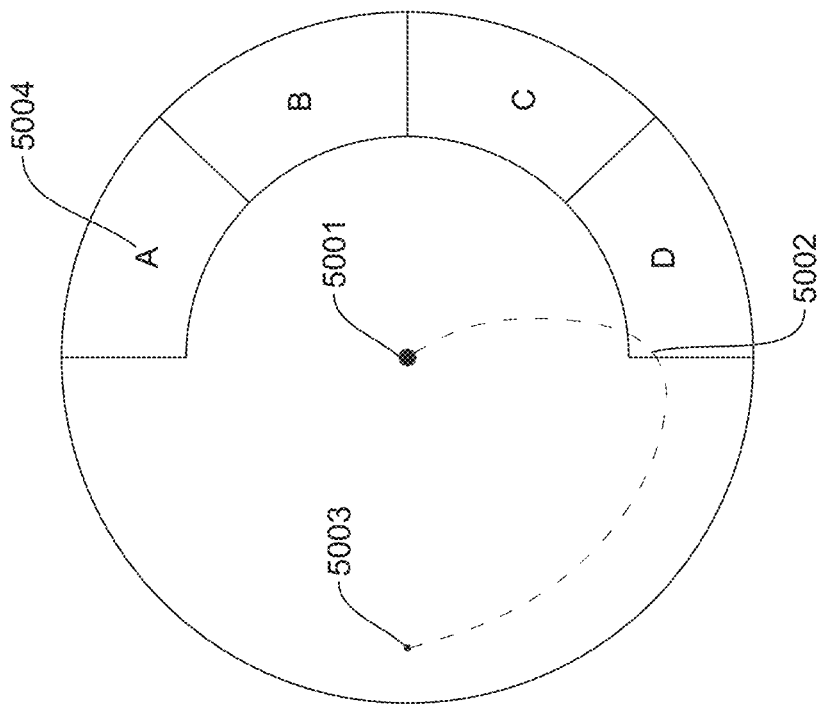

In this embodiment, the active window for the scroll mechanic jumps as the control point crosses a scroll boundary. This is useful in embodiments such as color zoom discussed below. This example uses a touchscreen, but any two-dimensional input device could function similarly. With reference to FIG. 30A, the user starts by touching a touchscreen at an initial point associated with the control point 5001 and the UI computes a touch circle around the center control point 5001, with the selections A, B, C, and D 5004 being active meaning the control point drives their visualizations on the display of the computing device. The user can swipe on the UI touchscreen downward into the selection "D" and then swipes clockwise to control point 5003. When the gesture crosses the scroll boundary 5002, the active window jumps, and the selections E, F, and G 5005 become active as shown in FIG. 30B. In this example, the user has stopped and released on selection F and the UI can interpret this gesture as the user selecting the selection F.

Continuous Scroll Mechanic Example

Figures 31A, 31B:
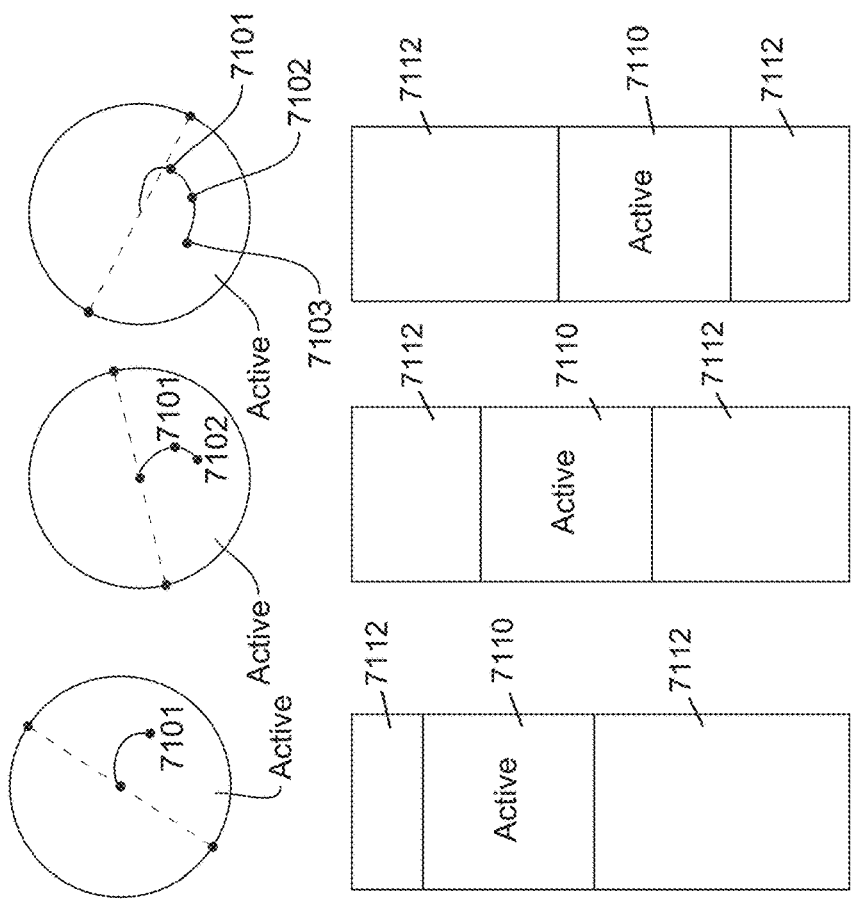
FIGS. 31A and 31B illustrate an embodiment of scrolling through a list with a scroll disc UI.

The inventive UI system can be used for scrolling through a list where only a portion of the list can be displayed on the display of the computing device. In FIG. 31A, a listing of data includes an active portion 7010 that is displayed and an inactive portion 7012 that is not displayed. The user has touched the touchpad, resulting in an initial control point 7000 and touch circle 7005 has formed around the initial control point 7000. The user then swipes in a downward counterclockwise path to control point 7001. In this example, the listing has nineteen lines of data. The top seven lines of data are the active portion 7010 and the bottom twelve lines of data are the inactive portion 7012.

In FIG. 31B the user has continued to swipe in a clockwise arc from control point 7001 to control point 7002. And the UI can respond to the swipe from 7001 to 7002 by scrolling the active portion 7010 of the listing of data down.

Centered Scroll Mechanic Example

Figures 32A, 32B, 32C:
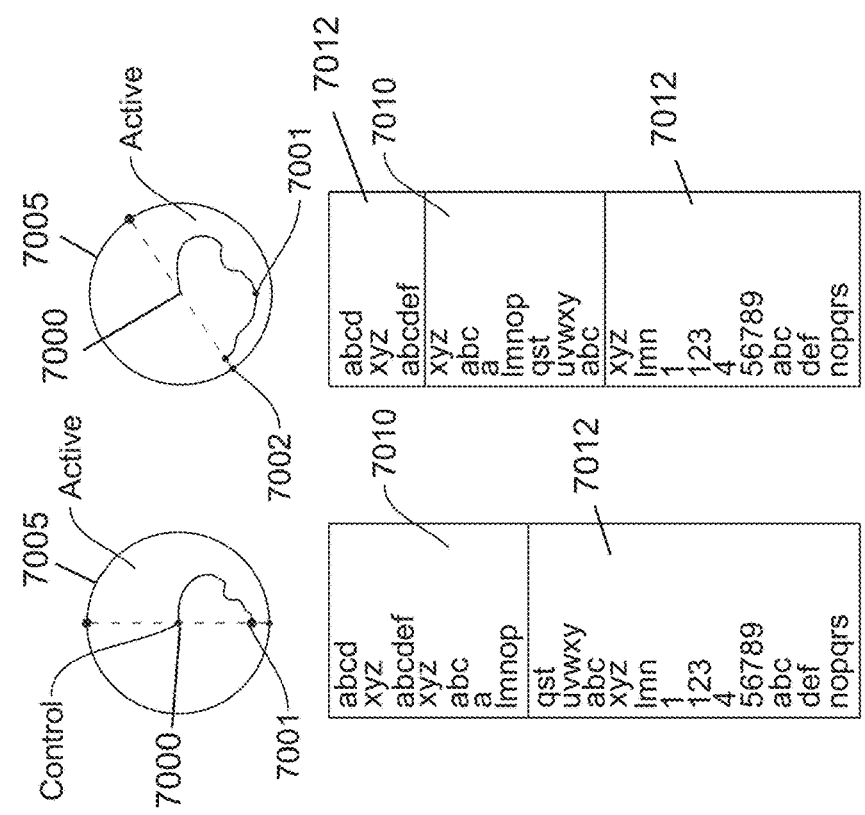
FIGS. 32A, 32B, and 32C illustrate an embodiment of scrolling through a list with a scroll disc UI.

With reference to FIGS. 32A-32C, an embodiment keeps the visible active window 7110 centered angularly around a control point. The UI detects the beginning of a user gesture and computes a touch circle. The detected gesture continues to the point 7101, which is used by a processor to compute the two points that lie on the boundary of the touch circle and form a right angle with the point 7101 at the center of the touch circle. The angles of the two computed points further determine an active window 7110 in the list of selections 7112. The active window can be displayed using a visualization driven by the point 7101. In FIG. 32B, the detected gesture continues to the point 7102, allowing a processor to detect a new pair of points on the boundary of the touch circle, and thus a new active window 7110 in the list of selections 7112. In FIG. 32C, the detected gesture continues to the point 7103, allowing a processor to detect a new pair of points on the boundary of the touch circle, and thus a new active window 7110 in the list of selections 7112.

Grouping Mechanics

In an embodiment, the UI system can perform grouping mechanics as a way of subdividing a larger list of concrete selections so as to reduce the number of selections from which the user must choose at any one time. A predefined "chunk size" may be used as a guide for the maximum number of selections that can be chosen from at one time. Based on this chunk size, a grouping mechanic introduces a tree of intermediate subgroups, with the concrete selections as leaves of the tree. Grouping mechanics can be combined with scroll mechanics to allow users to traverse between sibling subgroups without going through the parent subgroup. See the color zoom section below for an example.

In some embodiments, the following rules can be used to partition a given list of selections of length L, into a tree of nested sublists using a given chunk size c. A target height h, for the tree can be found by taking the ceiling of the logarithm of L base c. Compute a target child subgroup size, x=L/round (L^(1/h)). The current subgroup should contain L/x children (either subgroups or leaves). Define the boundary selection index, p, as n−L mod x. If a child has a selection index less than p, it is a subgroup containing x elements (or it is a leaf if x is 1). Otherwise, the child has a selection index greater than or equal to p, and it is a subgroup containing x+1 elements. This same operation can be applied recursively to each subgroup to form the tree of sublists. The sublists can be UI selections as described in other embodiments, so that a user can manipulate visualizations of the sublists on a display using gestures with radial and/or angular components. By utilizing a selection mechanic the user can move deeper into the tree away from the tree's root; by utilizing a scroll mechanic, the user can move laterally within the tree; and by utilizing a back mechanic the user can move upward in the tree toward its root.

In some embodiments, grouping is achieved without maintaining a tree-like structure. These techniques will be described further in the "Floating Focus" section.

Static/Dynamic Transition Mechanic

A transition mechanic is a way of using a control point to transition from using a static layout when the user is not interacting to using a dynamic one as the user interacts. This can be achieved by interpolating based on the length of the control point. Given a maximum length m (possibly an application setting), the length of the line segment joining the origin and the control point divided by m is used to compute an interpolation factor k. The interpolation factor k is used to interpolate between a static location and the corresponding dynamic location computed by a primary mechanic. Thus, when the length of the control point is zero, the layout remains static, and as the control point moves away from the origin, the effects of the dynamic transformation become dominant. Other embodiments can trigger an animation from static to dynamic when the beginning of a user gesture is detected by the processor, and trigger the reverse animation when the end of a gesture is detected. A more complicated embodiment uses animations that can be accelerated based on the length of the control point. When the UI detects the beginning of a user gesture it can start an animation from a static visualization to a dynamic visualization, and the previous interpolation technique can also be used to compute an interpolation. Whichever results in the dynamic location being more dominant wins, so a user moving quickly does not need to wait for animations to complete.

Transition Mechanic Example

FIGS. 33-35 illustrate an example of a transition mechanic. This example embodies a UI touchpad controller that adds a transition mechanic to a basic satellite circle primary mechanic. In FIG. 33 the letters 105 are positioned in a static layout that is visible even when no touch input is present. A finger 101 has made an initial touch, which the processor interprets as control point 111 with no visible effect on the displayed letters 105. With reference to FIG. 34, as the finger 101 touch moves away from the initial control point 111, the satellite circle primary mechanic becomes more dominant, until in FIG. 35 the satellite circle primary mechanic is completely dominant. In FIG. 35 the letters 107 are shown in satellite circles 122 between the central circle 121 and the disc 123.

While the letters 105 in FIG. 33 are illustrated in a table with rows and columns, in other embodiments, the two-dimensional array can be any other organization of content in a two-dimensional configuration such as arrangements of information in any geometric shape or a custom layout. In the illustrated embodiment, the UI uses a "satellite circle primary mechanic" which allows combining radial and circular swipe movements to help a user select a specific letter which speeds up and/or improves the user's data selection process by interactively zooming over the letter options in the satellite circles 122. In this example, there is one central circle 121 that represents a context or label, and there are multiple satellite circles 122 representing individual and distinct user choices or selections which surround the central circle 121. The visualization can place any sort of content data inside these satellite circles. It is also possible to nest this visualization inside satellite circles 122 to represent multiple levels of data selections.

With reference to FIG. 33, when the user isn't interacting with or touching the touchpad, the letters "a" through "l" can be displayed in a more traditional non-circular two-dimensional array display layout 105 on the visual display. The user can touch the touchpad portion of the UI and the initial touch point 111 can define a center of a circle 115. When there is the initial contact of the finger 101 with the touchpad UI, the letters are displayed in a non-circular two-dimensional array display layout 105.

With reference to FIG. 34, the finger 101 moves from the initial touch point 111 in an outward direction towards an upper right portion of the circle 115 on the touchpad. The non-circular layout of the letters shown in FIG. 33 transforms into the rotary circular layout as a result of user interaction. In this example, the finger 101 swipes outward and the displayed letters "a" through "l" are shown in a transitional configuration 106 as the display transforms from a two-dimensional array into a circular arrangement of letters. In FIG. 34, the letters 106 are in a partially transformed state with the adjacent letters not in alphabetical order. If the user's finger 101 is removed from the touchpad, the displayed letters "a" through "l" will return to the non-circular two-dimensional array display shown in FIG. 33.

With reference to FIG. 35, the user's finger 101 has moved in a straight line to a position close to the circle 115. In response to the user's finger 101 movement on the touchscreen UI, the letters "a" through "l" are each placed in an individual satellite circle 122 and the satellite circles 122 are adjacently arranged in a circular pattern between an outer unit disc 123 and a central circle 121. The position of the central circle 121 within the unit disc 123 can depend upon the position of the swipe movement. In this example, since the finger has moved outward from the initial touch point 111 on the touchscreen UI and the system responds to this finger position by moving the central circle 121 towards the lower left within the unit disc 123 in the opposite direction of the upper right swipe movement. The central circle 121 is not concentric with the unit disc 123 and the circles 122 have a diameter based upon the position within the unit disc 123. In FIG. 35, the finger 101 moved towards the letter "c" and the letter "c" is the largest displayed letter. The displayed letters "a" through "l" have different smaller sizes which are smaller in size than the letter c and are located adjacent to each other between the central circle 121 and the unit disc 123. The letter "j" is the smallest letter because it is opposite the letter c in the circular letter configuration.

The described UI can be used to enlarge and select a specific satellite circle. In FIG. 35, the user has used the UI to manipulate the displayed information and the satellite circle 122 containing the letter c is enlarged. The user can then use the UI to select the letter c. The UI can respond by inputting the letter c or if a listing of options which can be labeled as a through l. If the user selects c, the system can select the listing associated with the letter c. The UI input system can then reset and the user can use the UI to enlarge and select another satellite circle which can be a letter. In this manner, the UI can be used to continue to input text, numbers, or any other data that can be associated with the satellite circles.

From the finger position shown in FIG. 35, the user can then swipe in a circular direction in clockwise or counter-clockwise directions around the circle 115. If the user swipes in a circular motion around the unit disc 123, the largest satellite circles 122 and corresponding largest letter will shift sequentially with the location of the touch point. For example, if the touch point moves in a clockwise swipe, the largest letter will switch sequentially in the sequence: c, d, g, h, l, k, j, i, e, f, a, b. Conversely, if the user touch point swipes counterclockwise, the largest satellite circles 122 and corresponding largest letter will switch sequentially from c, b, a, f, e, i, j, k, l, h, g, d. The size variations of the satellite circles 122 and letters can be based upon the relative positions of the central circle 121 and the unit disc 123. As discussed, if the user moves the finger 101 to the initial touch point 111, the central circle 121 can be concentric to the unit disc 123 which results in each of the satellite circles 122 and corresponding letters being equal in size. One embodiment attempts to minimize the total angular distance between the locations of selections in the non-circular layout shown in FIG. 33 and their locations in the rotary layout FIG. 35.

Back Mechanic

A back mechanic is a way of transforming a control point in the unit disc or ball into a 1D "back point" lying in the interval [0, 1]. A back mechanic requires storing a history of prior control points representing successful selections. Although these control points may be the same as those present at the time of selection, a more canonical representation may be chosen at selection time (and the associated visualization updated accordingly). The back point can be detected as described in FIG. 19 and FIG. 20 and then applied to decrease the length of a most recently stored control point, affecting its visualization assuming one is visible. As discussed above with reference to FIGS. 18-20, the back mechanic can be implemented by touching to set a control point in the neutral zone and then swiping to the left across the scroll zone/back zone boundary. Other embodiments might detect back gestures as moving generally to the right or up or down. The UI can respond to a detected back selection reconfiguring for further display and UI input based on stored historical data.

Rotational Sensitivity Adjustment

Some primary mechanics that depend on a 2D control point may give users extra angular resolution for making selections by making an angular adjustment. Rotational Sensitivity Adjustment (RSA) ensures a minimum level of angular accuracy UI control. This means that as a user manipulates a control point angularly, selections move into and out of focus at a manageable rate, even when there are a large number of them.

Figure 38:
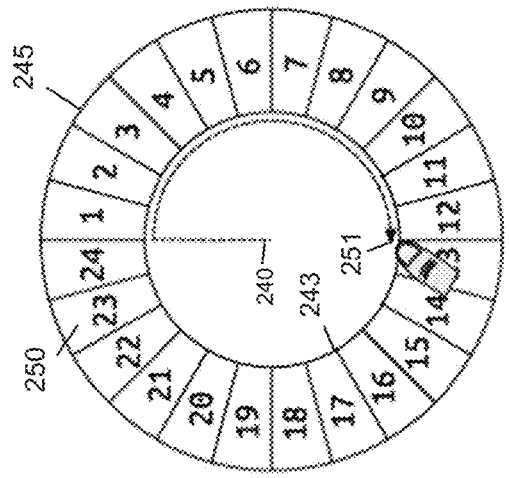
FIGS. 36-38 illustrate an example of an angular drag gesture at the inner boundary of a control disc UI.
Figure 37:
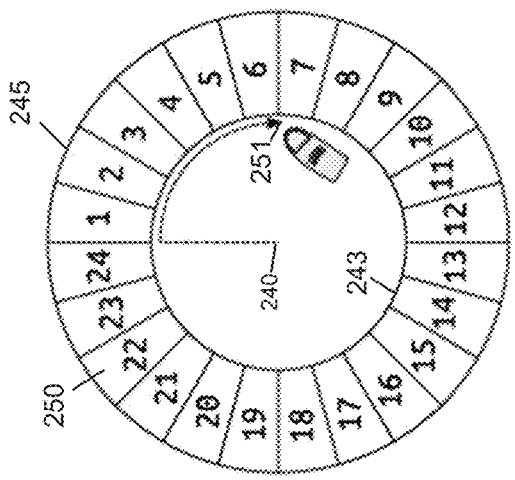
Figure 36:
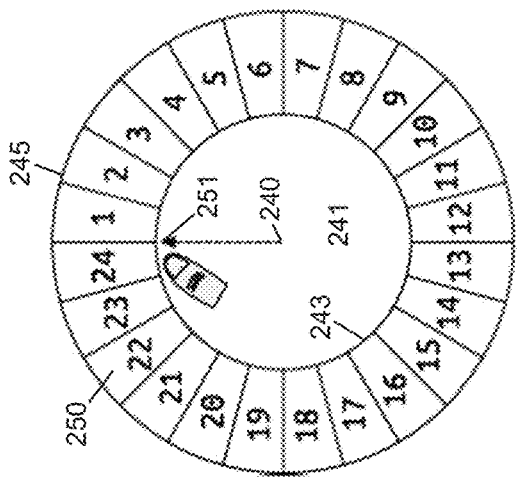

The RSA can operate on the control disc mechanic so that no angular drag should be applied in the neutral zone of the unit circle defined by the outer boundary 245 circle as shown in FIG. 36. With reference to FIGS. 36-38, at the inner boundary, an Angular Drag gesture can be applied continuously starting at origin control point 240 in the neutral zone 241 and swiping the control point to a point within the inner boundary 243 which can be the inner diameter of the scroll selector 250 as shown in FIG. 36. In FIG. 37 the user swipes the control point clockwise along the inner diameter 243 and the scroll selector 250 does not rotate. As shown in FIG. 38, the clockwise swipe can continue in rotation progressing to 180 degrees from the start at the top of the inner boundary 243 to the bottom of the inner boundary 243 of the scroll selector. Again, because the control point swipe is within the inner boundary 243 the scroll selector 250 does not rotate.

Figure 41:
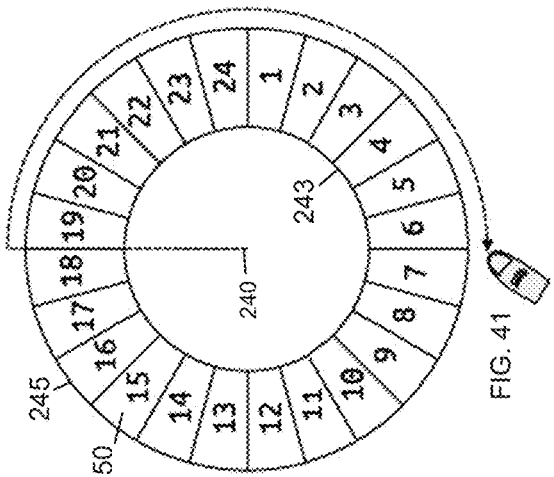
FIGS. 39-41 illustrate an example of an angular drag gesture at the outer boundary of a control disc UI.
Figure 40:
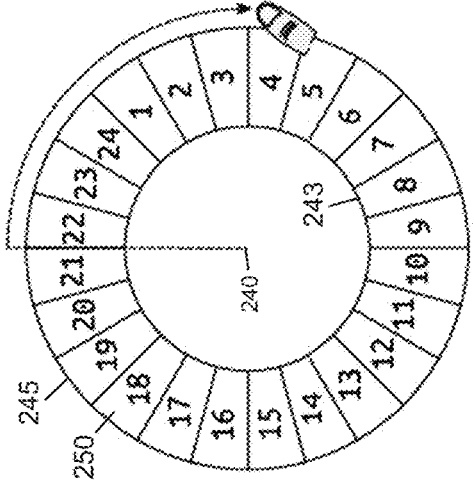
Figure 39:
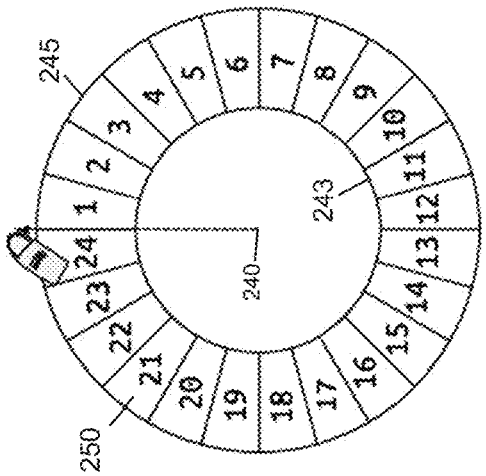

In contrast, with reference to FIGS. 39-41, the user begins a gesture with a control point at the origin control point 240 and swipes outward to the outer boundary 245 of the scroll selector as shown in FIG. 39. The user can then swipe clockwise as shown in FIG. 40 and the scroll selector 250 can also rotate clockwise with the control point so that the control point moves through exactly n regions in a revolution, with n being a sensitivity setting. In this example, the control point 251 has moved through $\pi/2$ radians and the scroll selector 250 has rotated clockwise 3 selections which can be $\pi/4$ radians. The user can continue to swipe the control point 251 180 degrees clockwise as shown in FIG. 41. The maximum RSA adjustment can occur along the outer boundary 245. In the illustrated example, a gesture subtending 7C radians moves through six selections.

Combining Mechanics

The various mechanics and visualizations described herein can be combined to create a concrete input mechanic. This typically manifests as rules for preprocessing control points before they are given to the primary mechanic, rules describing how to obtain a back point from a control point if a back mechanic is present, and rules for determining the visible selections and the data associated with them (e.g., circle coordinates or sector boundary pairs).

Combined Mechanic Example

Figure 72:
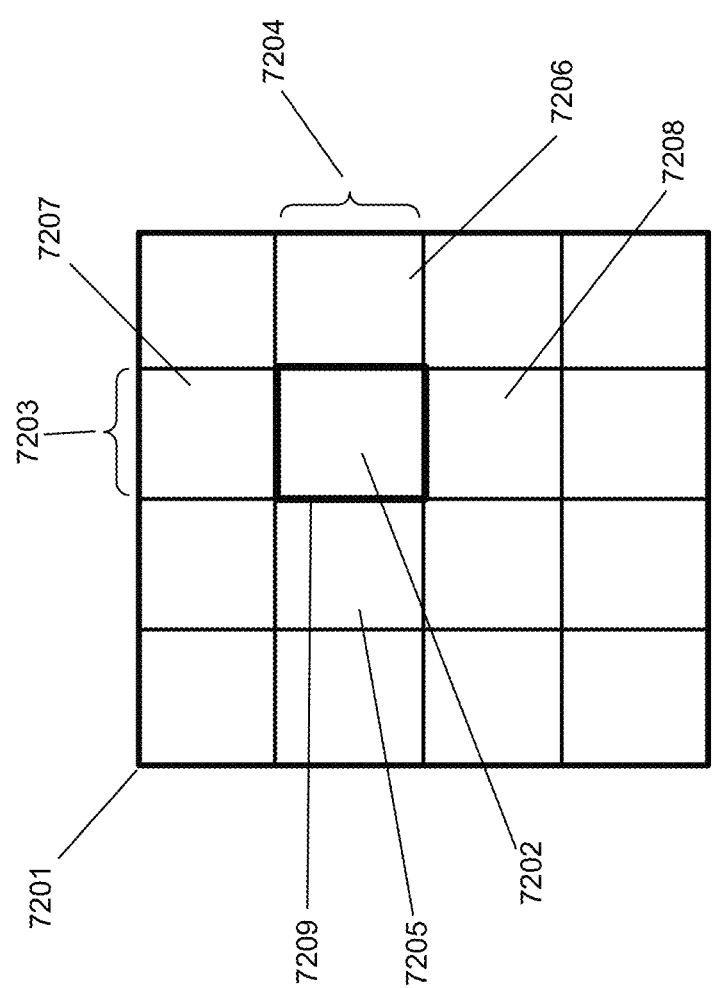
FIG. 72 illustrates an embodiment of a static layout of a listing of data blocks with respect to a display of a computing device.

One embodiment combines the satellite circle primary mechanic with a back mechanic. With reference to FIG. 72, an array of satellite circles 811 is arranged inside a unit disc 810 surrounding a central circle 812. No satellite circles are arranged on the left side of the unit disc in order to make room for a back mechanic. The scroll disc in FIGS. 18-20 can be used to drive a satellite circle mechanic using the scroll point and a back mechanic using the back point. Releasing in the scroll selector can perform a selection, and releasing in the back selector can perform a back action.

Context Menus

An input mechanic can use a special gesture input to trigger a contextual visualization, which can be a menu. This gesture resembles the gestures used for other input mechanic embodiments, except for the way it starts, which may use a "gesture prefix" which can be a predefined UI input. For example, a gesture prefix could be defined as a double tap on the touchpad sensor. Once the gesture prefix is detected, the UI can recognize this input and initiate context menu controls and the UI control point can drive a visualization associated with the context menu. If nothing is selected during a context menu interaction, the control point animates back to zero which makes the context menu of the UI go back to a default rest state, and the context menu can be deactivated. Future gestures without the requisite prefix will associate their control points as they did before the context menu was invoked.

Page Zoom Visualizations

Figure 42A:
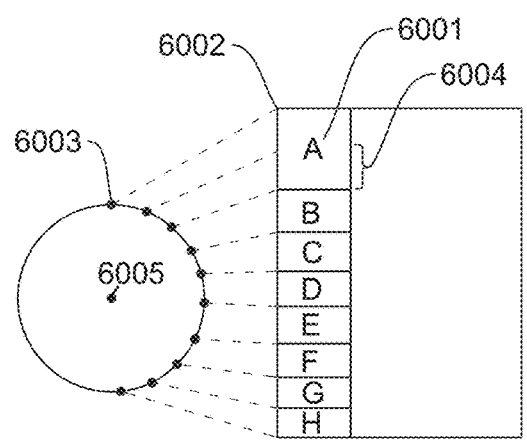
FIGS. 42A and 42B illustrate an example of a page zoom UI gesture.
Figure 42B:
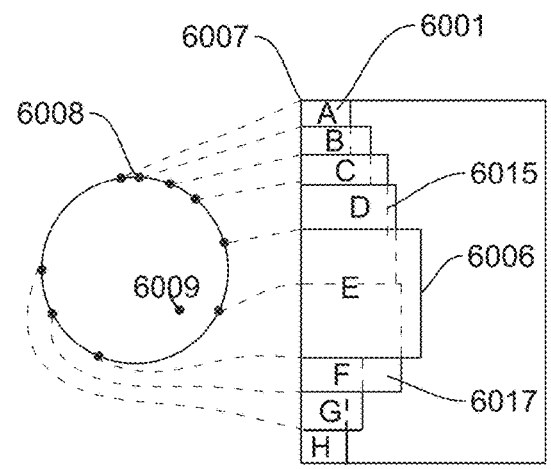

With reference to FIGS. 42A and 42B, the inventive UI system can be used as a page selector that allows the user to efficiently select where in the document they want to start, no matter how long the document is using the described scrolling methods. The further the user zooms out, the smaller the page will appear on the visual display and conversely, the further the user zooms in, the larger the page will appear on the visual display.

With reference to FIGS. 42A and 42B, page zoom allows for zooming in on a large amount of information such as a large document to select a region of the large document in which the user wants to work. The UI can be configured through a user setting with a predefined "page size" and the displayed document can be divided up into a plurality of pages 6001 of overlapping content based upon the page size. In an embodiment, the first half of a second page 6004 might contain the same content as the second half of the first page. The half page overlap is arbitrary and could be any interval. This overlap of pages allows users to choose a page that does not end in the middle of the content of interest and two different pages will generally contain the same content of interest. Thus, if there were no overlap, a user might need to focus in an area that is located at a split between adjacent two pages, which is not ideal.

In FIG. 42A, points 6002 representing heights on the display are mapped to points 6003 on the boundary of the unit disc, and each of the selections 6001 are associated with interleaved pairs of points 6003. In FIG. 42B, a transformation can be applied on the boundary of the unit disc based on the movement of the swiping of the control point 6005 to control point 6009, resulting in the redistribution of points 6008 on the boundary of the unit disc. These points 6008 can then be transformed back to the points 6007 based on their angular distribution. Pages are sorted such that 6006 appears on top, its neighbors are underneath it, their neighbors are underneath them, etc. For example, the pages can be sorted from top to bottom, E 6006, F 6017, D 6015, G, D, C, B, A . . . . This UI configuration ensures that there will be no discontinuity when a new page gains focus because the overlapping content that is shared between the new page and the page that is losing focus as the UI transitions to the new page is identical. One drawback to this configuration is that some content can be obscured behind other content when it is not in focus.

Figure 44A:
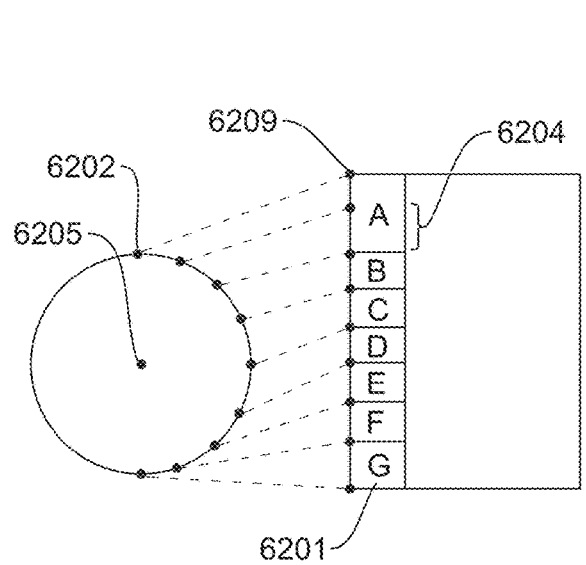
FIGS. 44A and 44B illustrate an example of a page zoom UI gesture.
Figure 44B:
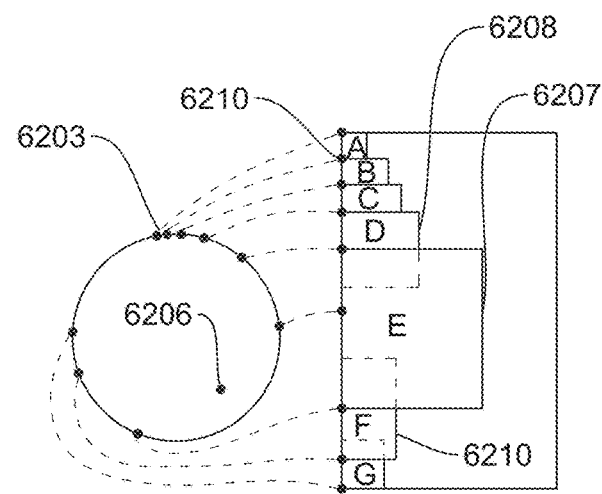

With reference to FIGS. 44A and 44B, an embodiment of a page zoom UI system is illustrated. The UI system can display data in a plurality of individual pages which make up a document that is being displayed. The pages can be displayed at a "page size" which can be a predefined size and/or can be configurable through a user setting and can be based upon the screen size of the computing device. The document can be displayed in a configuration divided up into pages of overlapping content. In the illustrated example, the first half of a second page 6204 might contain the same content as the second half of the first page. The page overlap can be arbitrary and/or set by a user through UI preference controls. This displayed page overlap helps users choose a page displayed that does not end in the middle of the content of interest. In other words, if there were no displayed page overlap, a user might need to focus in an area that is split between two pages, which is not ideal.

The points 6209 can initially be evenly distributed along the height of the screen and mapped as points 6202 which can be uniformly distributed on the boundary of the unit disc. Each of the selections 6201 around the unit disc can be associated with interleaved pairs of points 6209 at the top and bottom of the left edge of the selections 6201. A transformation of the page displays can be applied on the boundary based on the control point 6205 swiping to 6206 in FIG. 44B resulting in the distribution of points 6203 on the boundary of the unit disc. These points 6203 can then be transformed back to the points 6210 based on their angular distribution. The most focused page 6207 is displayed with the associated points 6210 bounding it above and below, and the other pages are displayed such that the interior point 6210 and its closest neighbor 6210 bound half of the page. Pages are sorted such that page "E" 6207 appears as though it is on top, its neighbor pages "F" 6210 and "D" 6208 are underneath it, their neighbor pages C and G are underneath them, etc. The obscured half pages represented by dashed lines that are underneath the adjacent pages should not be shown. For example, in this illustration, page E 6207 obscures the lower portion of page D 6208 and the upper portion of page F 6210. Note that this strategy ensures that there will be no discontinuity when a new page gains focus because at that instant the overlapping content that is shared between it and the page that is losing focus is identical. More specifically, the upper half of page E 6207 can have the same content as the lower half of page D 6208 and the lower half of page E 6207 can have the same content as the upper half of page F 6210, so the obscured content is actually displayed in page E 6207 and no information is not visible. This ensures that all of the content is always visible regardless of overlapping pages.

Figure 45A:
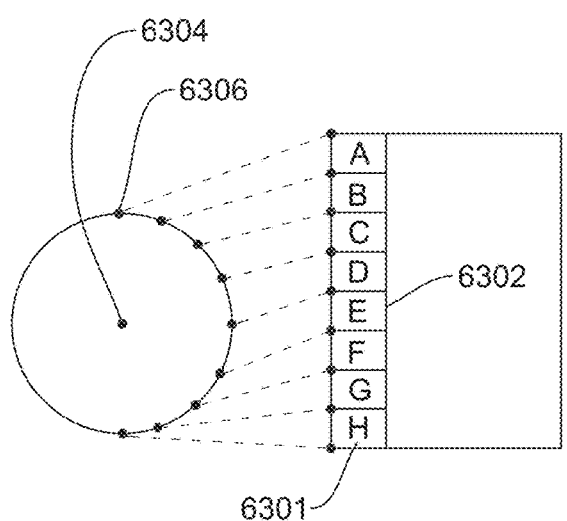
FIGS. 45A and 45B illustrate an example of a page zoom UI gesture.
Figure 45B:
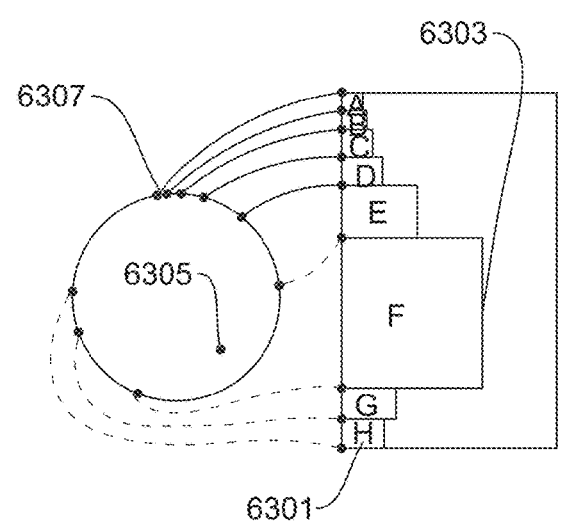

With reference to FIGS. 45A and 45B, points are assigned surrounding each half page vertically and mapped to points 6306 on the boundary of the unit disc. The swiping from the control point 6304 in FIG. 45A to a control point 6305 shown in FIG. 45B results in the UI performing the zooming transformation. In this example, the text data F 6303 is most enlarged with the neighbor page E above and page G below displayed in a less enlarged format. The text data D is then displayed above page E and text data H is displayed under the text data G in a smaller format. The described zooming based on the swiping of a control point can be used in combination with a highlight effect based on the same mapping.

In some embodiments of the page zoom, the UI can snap the current control point to a new control point in between pages, either immediately or via an animation. This snap feature effectively zooms both half-pages equally resulting in the UI displaying the full page in a uniform manner.

Figure 55:
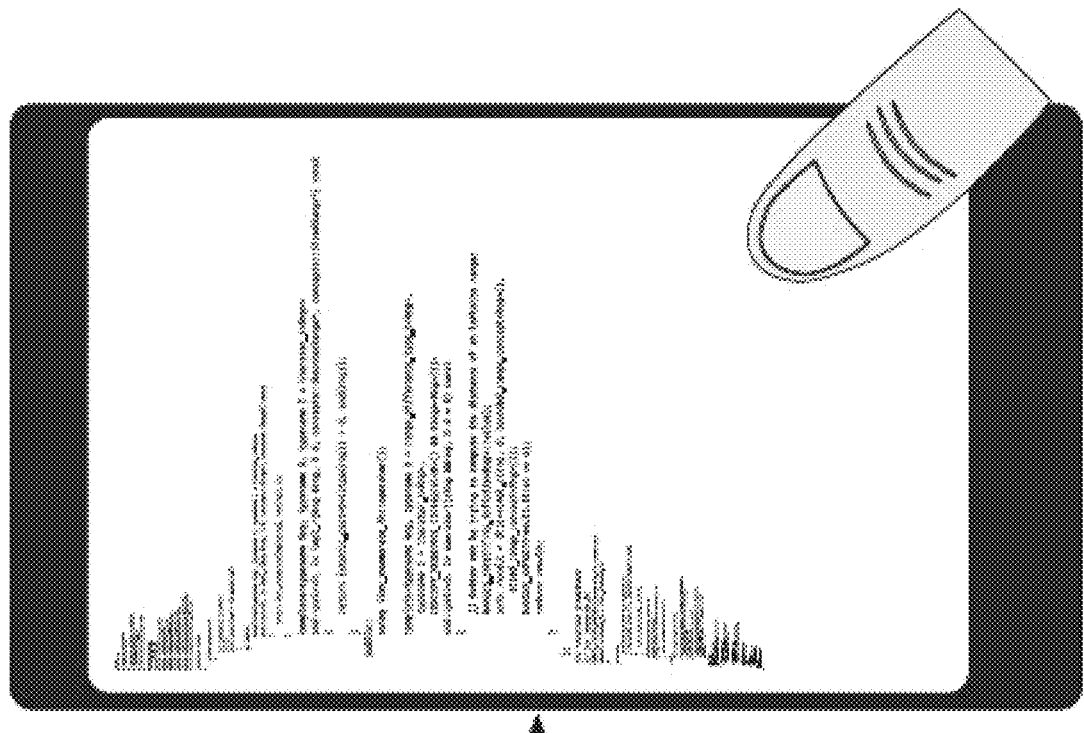
FIGS. 54 and 55 illustrate an embodiment of a page zoom UI gesture.
Figure 54:
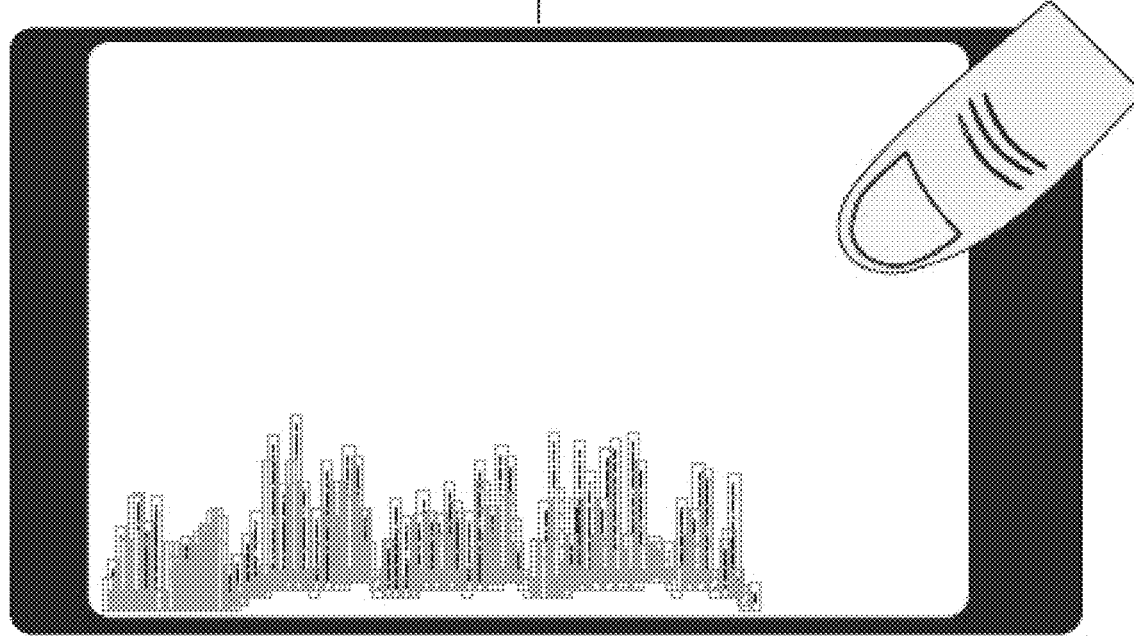

FIGS. 54 and 55 illustrate a section zooming function that is similar to the zooming feature described above with reference to FIGS. 44A, 44B, 45A, and 45B. FIG. 54 illustrates a listing of text data which has a very small text size. The inventive UI can be used to scroll through the listed data and used to zoom in on the desired text to a text size that can be easily read and possibly edited. The selected text shown in FIG. 54 in a fixed text display window that can be traversed by the described scrolling process where the control point is moved angularly. The zooming of the selected text can be achieved by radial outward movement of the control point as shown in FIG. 55. In an embodiment, FIG. 54 can be similar to the page data UIs illustrated in FIGS. 42A, 44A, and 45A in an unzoomed format and FIG. 55 can be similar to the UIs illustrated in FIGS. 42B, 44B, and 45B where the page data of interest to the user is selected and zoomed through the inventive UI.

Figure 43A:
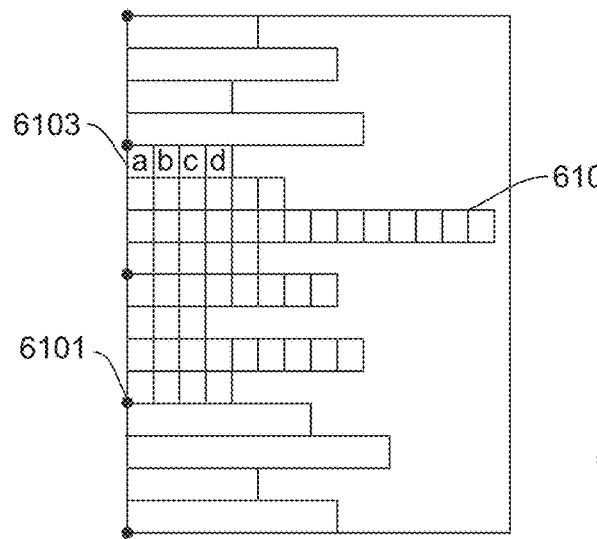
FIGS. 43A and 43B illustrate an embodiment of a UI text display.
Figure 43B:
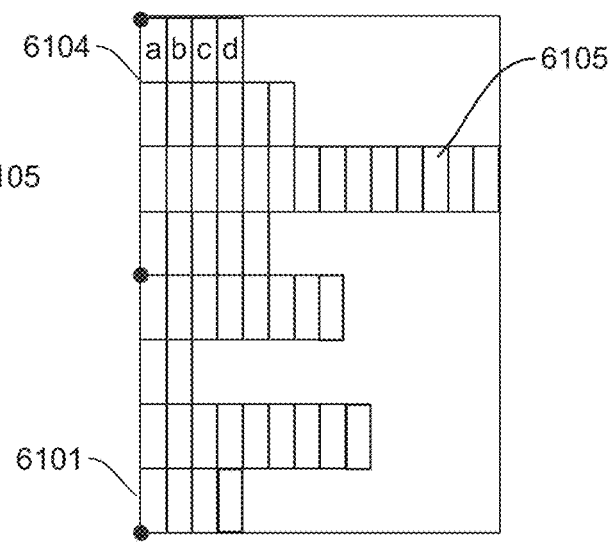

FIGS. 43A and 43B illustrate an embodiment of a listing zoom graphical transformation. When page zoom is applied to text and long lines are present that cannot be wrapped, they can be compressed horizontally as in FIG. 43B so that the longest line visible on the half-page extends the full width of the page rather than running off the page to the right. When horizontal compression is present, a similar horizontal page zoom similar to vertical page zoom can be applied using horizontal pages to arrive at a focused horizontal page. Variations on this technique exist such as starting with the first horizontal page already zoomed. Horizontal page zoom can also be interleaved with another mechanic. For example, a vertical page zoom mechanic can be used to select a page from a document, with first horizontal page zoomed by default, then a color zoom to select a line, and then, if the line extends beyond the horizontal page, a horizontal page zoom can be used to select a horizontal page.

FIG. 43A is an unzoomed full document which has four groups of data where each of the groups is four lines of data each between two marker points 6101. FIG. 43B is a zoomed page of a middle portion of the unzoomed document with two groups of four lines of data each between marker points 6101. In FIG. 43A the longest line 6105 extends almost the full width of the page and in FIG. 43B the longest line 6105 visible on the half-page extends the full width of the zoomed page. Thus, the vertical compression and the horizontal compression can be independent of each other. When horizontal compression is present, a similar horizontal page zoom can be applied using horizontal pages to arrive at a focused horizontal page. In this example, the full page shown in FIG. 43A displays sixteen rows of text data with the fifth row 6103 having four blocks of text data a, b, c, and d. In FIG. 43B shown row 6104 is the top row of text data a, b, c, and d. In an embodiment, the UI can be configured to zoom horizontally to a default where the longest row 6105 is shown extending across the entire width of the display which can therefore limit the horizontal zooming of the UI. In other embodiments, the horizontal zooming may not be limited by the longest row of data. In these embodiments, the longest row 6105 can be broken into two (or more) lines of text that can be shown in multiple rows if the longest row is substantially longer than the next longest row of data.

In FIG. 43B, the zoomed page has been enlarged to show eight rows of text data in the vertical display in two groups which are each between two marker points 6101. Horizontal page zoom can also be interleaved with another mechanic. For example, a vertical page zoom mechanic can be used to select a page from a document, with the first horizontal page zoomed by default, then a color zoom to select a line, and then, if the line extends beyond the horizontal page, a horizontal page zoom can be used to select a horizontal page.

In other embodiments, when long lines of data are displayed that cannot be wrapped, the long lines of data can be compressed horizontally so that the longest line visible on the half-page extends the full width of the page. More complex UI rules are also possible, such as compressing the displayed data according to the longest line in the two most selected half pages. When horizontal compression is present, a similar horizontal page zoom can be applied using horizontal half-pages to arrive at a focused horizontal page. Again, a user data selection UI mechanism can snap the control to a control in-between two half pages. Horizontal page zoom can also be interleaved with another UI mechanic. For example, a vertical page zoom mechanic can be used to select a page from a document, with first horizontal page zoomed by default, then a color zoom to select a line, and then, if the line extends beyond the horizontal page, a horizontal page zoom can be used to select a horizontal page.

Figures 46A, 46B, 46C:
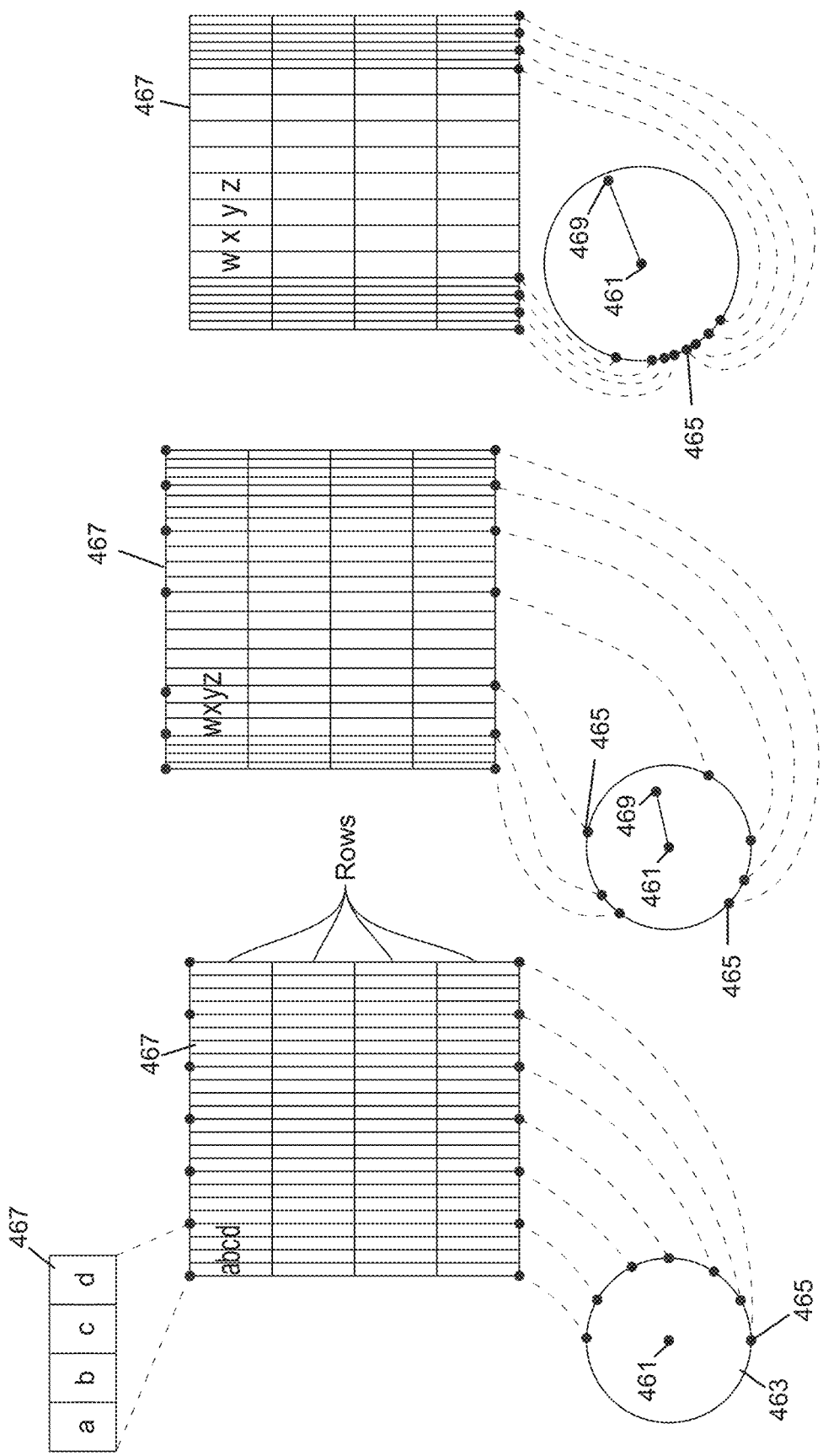
FIGS. 46A-46C illustrate an embodiment of a horizontal page zoom.

With reference to FIGS. 46A-46C, an embodiment of a horizontal page zoom feature is illustrated. In FIG. 46A the text is obscured because it is displayed with an incorrect aspect ratio where the text appears much narrower than intended by the designer. In FIGS. 46B and 46C, the UI is being used to perform a horizontal zoom so that the text in the grid can be read. A portion of the grid has been expanded 467 to show a zoomed version of the text a, b, c, and d with each letter in a horizontally adjacent grid box. A processor has detected the beginning of a gesture and computed the corresponding control point 461, and the UI has responded by computing a touch circle 463. In a method similar to that illustrated in FIG. 44B, the points 465 are associated with "horizontal pages" of text in an interleaved manner, where at rest, each horizontal page spans three of the points depicted along the top and bottom of the grid. Once zooming is applied, the most focused page is bounded on the left and right by two of the points depicted along the top and bottom of the grid, with another point in between. Similar to FIG. 44B, the other pages are displayed such that the interior point and its closest neighbor bound half of the page horizontally. The right side of the touch circle 463 has seven markers 465 which are mapped to groups of vertical lines in the grid 467. In the illustrated example, there are four columns between two adjacent markers 465. In FIG. 46B, the user has swiped outward between two of the markers 465 and the UI responds by adjusting the grid 467 to widen the columns that are mapped between the two markers 465. With reference to FIG. 46C, the user can continue the gesture outward until the control point 469 is closer to the touch circle 465 and the text in the expanded columns becomes more clearly visible on the display.

Figure 47:
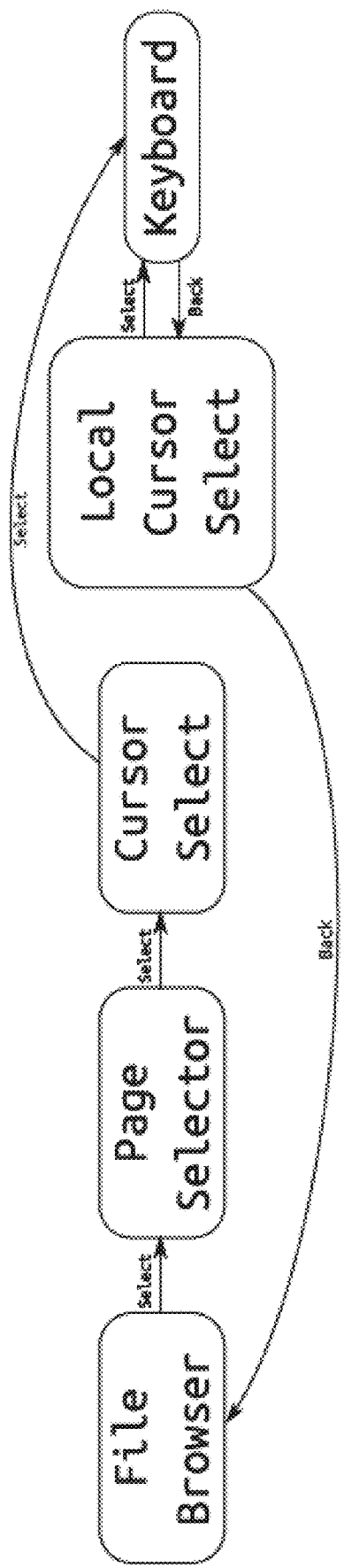
FIGS. 47 and 48 illustrate embodiments of UI flow charts.
Figure 48:
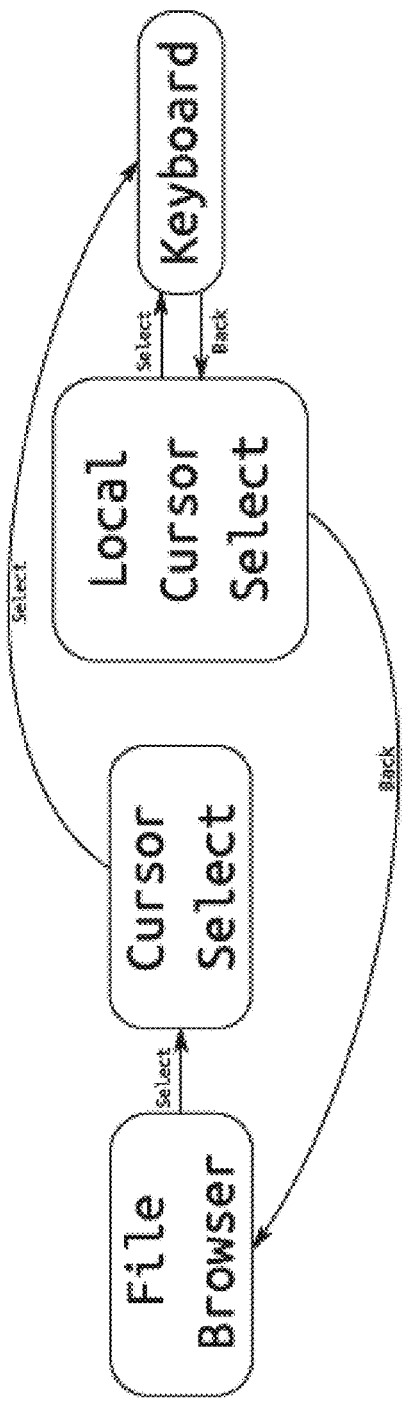

With reference to FIGS. 47 and 48, in different embodiments, the inventive UI control system can be used for a plurality of different functions including: file browsing, page selection, cursor selection, local cursor selection, and as a keyboard input for the computing device. FIGS. 47 and 48 are flowcharts showing how the different UI functions or different UI modes can be performed sequentially to accomplish the desired task. With reference to FIG. 47, a user may need to edit a document and the UI can first be used as a file browser and the UI can have an input for selecting a desired file. The UI can then be used to select a page from the file for editing and/or review and the UI can have an input for selecting a desired page. The UI can then provide a UI cursor for selecting specific parts of the page for review and/or editing. Once the desired data in the page is selected, the UI can provide a keyboard for performing editing. The user can edit the text and/or data on the page. The UI can provide toggling or switching between a local cursor select for identifying additional local text/data editing and a keyboard for performing the edits. Once the editing is completed, the UI can go back to the file browser functionality and the described process can be repeated. In some embodiments, the files may not have a large number of pages and the UI may not require a page selector function. FIG. 48 illustrates another flowchart which is very similar to that of FIG. 47 but does not include the page selector function. The UI's file browser can be used to locate the desired portion of the file and the UI can switch to the cursor select and the selected data can be edited by the local cursor select and the keyboard functions as described. Each of the file browsing, page selection, cursor selection, local cursor selection, and a keyboard input function for the computing device will be described below.

Color Zoom

A 2D-0D primary mechanic can be used to assign intensity to selections. In one embodiment, color zoom can be used to place a cursor on a page of text. At a bare minimum, the most selected selection must be tracked and ideally indicated when focused via some means such as a highlight color change.

Figures 49A, 49B, 49C:
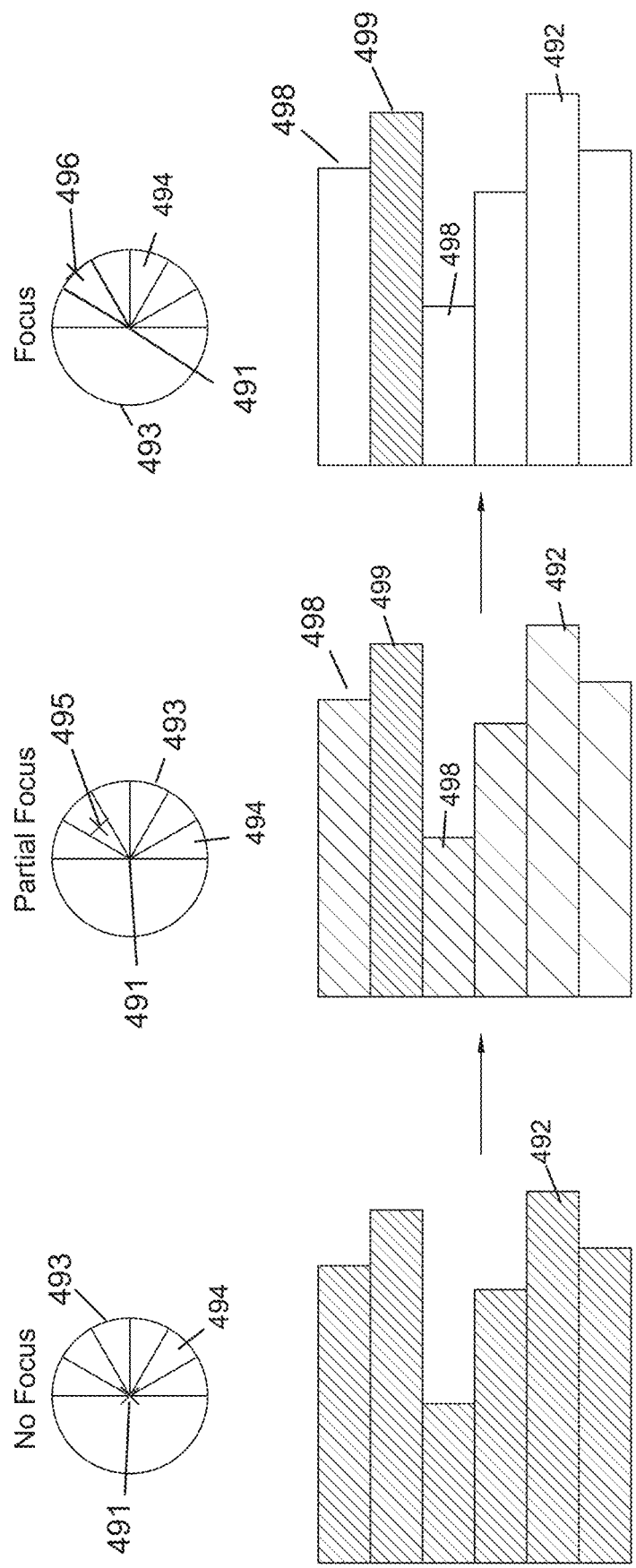
FIGS. 49A-49C illustrate an embodiment of a UI color zoom.

FIGS. 49A-49C, 50A-50C, and 51A-51D illustrate examples of a UI which can focus on areas of interest in organized data. In these embodiments, the UI can apply a zoom mechanic along with a grouping mechanic and a back mechanic. A focus highlight can be used to indicate degree of focus using opacity or text colors or other visual contrasts. With reference to FIG. 49A, a user can use the UI input to set a control point 491 and the UI can compute a touch circle 493 around the initial control point 491. The touch circle 493 can have a plurality of segments 494 which represent each line 492 of the data on a display and each of these lines can be illustrated in the same uniform manner without highlighting or emphasizing any individual line. With reference to FIG. 49B, the user swipes the control point 495 outward into one of the segments 492. In this example, the second highest line 499 is highlighted or remains in the original color or shade. The adjacent lines 498, which in this example are the highest and third highest lines, can have a lower level of highlighting and the remaining lines 492 have lower highlighting. The UI can respond by changing the highlighting levels of the data lines that are further from the segment area of the swipe control point 495 and they can be more out of focus or become less opaque. With reference to FIG. 49C, the swipe control point 496 has extended to the touch circle 493 and this can be interpreted as a user selection where only the second line 499 is highlighted. The highlighting can be done by the UI with an underlay, color, opacity, visual effects such as blinking data, etc.

In some situations, there may not be enough lines for the grouping mechanic to introduce intermediate groups, so the UI can allow the user to select a line 499 directly. With reference to FIGS. 50A-50C, the line 499 may have too many characters for a single selection using the UI, so the UI may introduce intermediate groups. In FIG. 50A, the data is arranged in a single horizontal row and the UI is in a no focus mode where all portions of the line 499 are equally highlighted. The user has begun a gesture using the UI input to create a control point 505 and a touch circle 507 has been formed with three segment areas where each segment area corresponds to three different intermediate groups 511, 512, 513 of data from line 499. The upper right segment of the touch circle 505 may correspond to the first (left) third of data 511, the middle right segment may correspond to the middle third of the data 512 and the lower right segment can correspond to the last (right) third of the data 513. With reference to FIG. 50B, the user has swiped the control point 506 down and to the right to a lower right segment and the UI is in a partial focus mode where a portion of the data line 499 is highlighted differently. The UI responds by increasing or maintaining a highlight level of the third intermediate group 513 of the data line with a lower highlight level for the second segment area 512 and a lower highlight level for the first segment 511. In FIG. 50C the UI is in a focus mode when the gesture of the control point 506 has extended to the touch circle 507 and the UI responds by selecting and highlighting or otherwise differentiating only the last third segment 503 of data.

As shown in FIGS. 50A-50C, the user has selected the third intermediate group 513, but suppose this was a user error. The user has two options: use the back mechanic to return to the prior UI control system with the entire line 499 highlighted as shown in FIG. 50A, or alternatively, the user can use the scroll mechanic to move past the artificial boundary created by the intermediate grouping. FIGS. 51A-51D illustrate a process for using a scroll mechanic to correct the error which can have similar functionality. The user has erroneously selected the third intermediate group 513 which can be highlighted. In FIG. 51A, and the user initiates a gesture on the UI input to set up a control point 521 and a touch circle is formed with six sector areas 525. The third intermediate group 513 of the line 499 is uniformly highlighted so the UI is in a no focus mode. In FIG. 51B, the user has continued the gesture, moving the control point 522 up to the first segment area 525 and the UI responds by starting to highlight the first letter in the third intermediate group 513 while the adjacent letters have lower levels of highlighting. The UI is in a partial focus mode. In FIG. 51C, the user has swiped the control point 523 to the touch circle and in this embodiment, only the first block of the third intermediate group 513 is now highlighted and the UI is in a focus mode. With reference to FIG. 51D, the user can use the scroll mechanic and swipe counterclockwise to move over by a left half disc at a time as in the half disc scroll mechanic to move the control point 524 to the left side of the touch circle which FIG. 51D illustrates with segments on the left side of the touch circle. The highlighting is moved from third intermediate group 513 to the second intermediate group 512. The UI can highlight the individual character on the right side of the second intermediate group 512, and the UI can be in the focus mode again. The user can release at the desired character to complete the selection gesture.

Menus (Horizontal/Vertical)

A menu system can be created based on a 2D-1D primary mechanic in combination with a back mechanic. Menu entries can be laid out either horizontally or vertically in the available space. Nested previews of submenus may be displayed, and multiple gestures can be performed concurrently. Entry text can be fixed or rotated to make more space for previews.

Figures 67A, 67B, 67C, 67D:
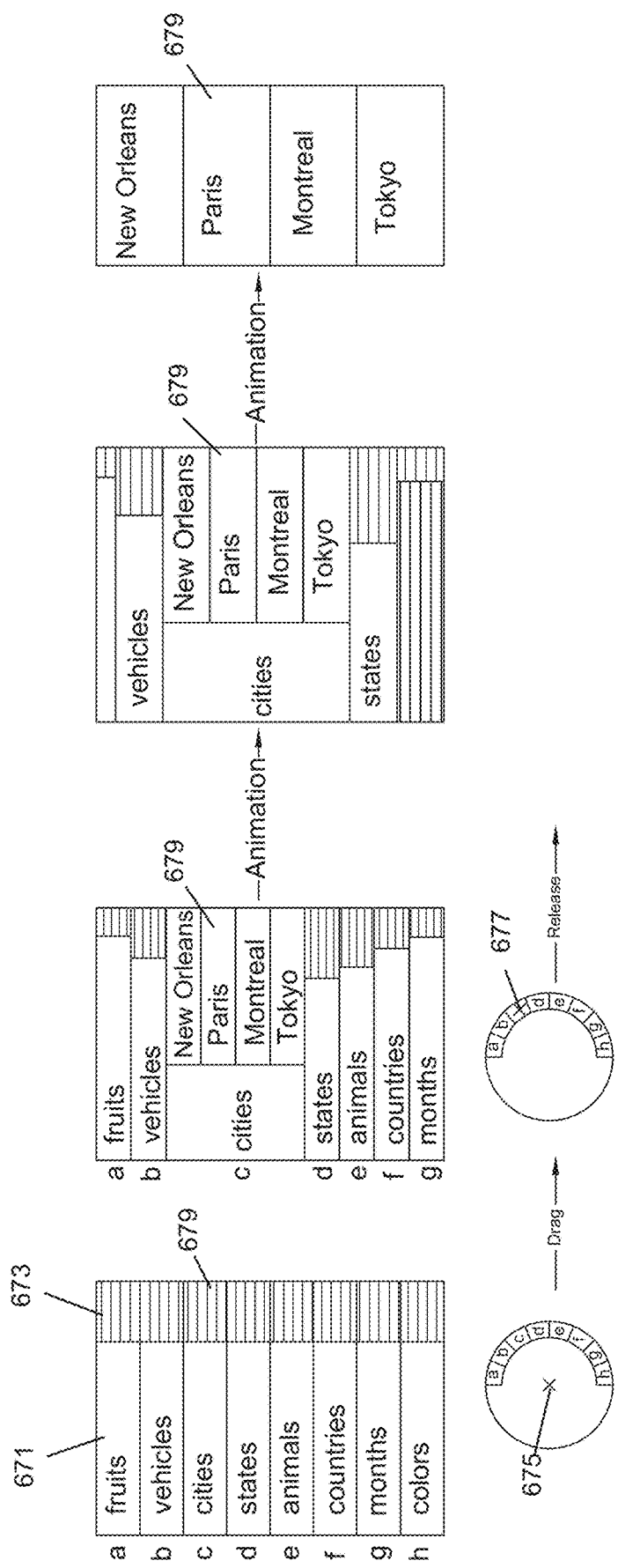
FIGS. 67A-67D illustrate an embodiment of a UI for listing focusing and zooming.

With reference to FIG. 67A-67D, an example of a UI is illustrated with both touch inputs and the visual display. In the illustrated embodiment shown in FIG. 67A, the visual display can include a listing of primary listings 671 which are in spaces a-h indicated on the left side and for each of the listings there are multiple sub-listings 673 indicated in a contrasting color or colors such as red. The UI has a 2D input, here described as a touchpad for simplicity, and the user can use the touchpad to set an initial control point 675. In FIG. 67B, the user swiped or dragged to the right outward to the scroll selector which includes spaces for a-h. In this example, the user has moved the control point 677 to the "c"

area of the scroll selector. The display can respond by enlarging or increasing the degree of focus on the "c" listing which is "cities" in this example. Because the cities listing is enlarged, the associated sub-listings are also enlarged which include the cities: New Orleans, Paris, Montreal, and Tokyo. The user can continue moving their finger or release the finger from the touch screen which can result in the UI system to cause the sublistings becoming larger and the other text becoming smaller as shown in FIG. 67C and possibly remove all information other than the sublisting data 679 which includes the cities: New Orleans, Paris, Montreal, and Tokyo in an animation process on the display of the computing device. With reference to FIG. 67D, the UI can continue to display just the sublisting data 679 cities New Orleans, Paris, Montreal, and Tokyo in a vertical alignment of blocks. The user can then select a city for an input. This described process can be repeated for further navigation through the sublistings and possibly sub-sub-listings.

With reference to FIGS. 68A-68D, another example of a UI for selecting a listing item is illustrated. The navigation through the primary listings, sublistings, and further sub-listings are illustrated on the display. With reference to FIG. 68A, the user can use the UI by initially touching the touchpad to set an initial control point 681 on the touch input area of the computing device and the UI form a touch circle 685. On the display portion of the computing device, a listing of topics 691 which are visible and legible and sublistings 693 shown as a set of illegible blocks to the right of the topics 691.

With reference to FIG. 68B, the user swipes the control point 682 down. The UI can respond by making the lower listing which in this example is "colors" larger and also enlarging the associated sublisting 693. In this example, the listing "colors" is enlarged and the sublisting colors purple, red, blue and green. The user can decide then to change the listing of interest and move the touch swipe or drag in a counterclockwise rotation which results in the focus or enlargement moving upward through the primary listings. With reference to FIG. 68C, the user has swiped in a counterclockwise direction to the control point 683 which causes the displayed listing 691 to scroll upward to the topic "animals" enlarged and the sublisting 693 is now enlarged and visible: dog, cat, rabbit, whale, turtle, bear, and frog are illustrated. With reference to FIG. 68D, the user can continue to rotate the swipe or drag in a counterclockwise direction to the control point 684. The UI can respond by changing the primary listing to move upward to "cities" and the sub-listings: New Orleans, Paris, Montreal, and Tokyo are enlarged and visibly displayed. The user can release to select "cities" and the process can be repeated to allow the user to select one of the sublistings to move forward or swipe back to go back to earlier menus.

Figures 69A, 69B, 69C, 69D:
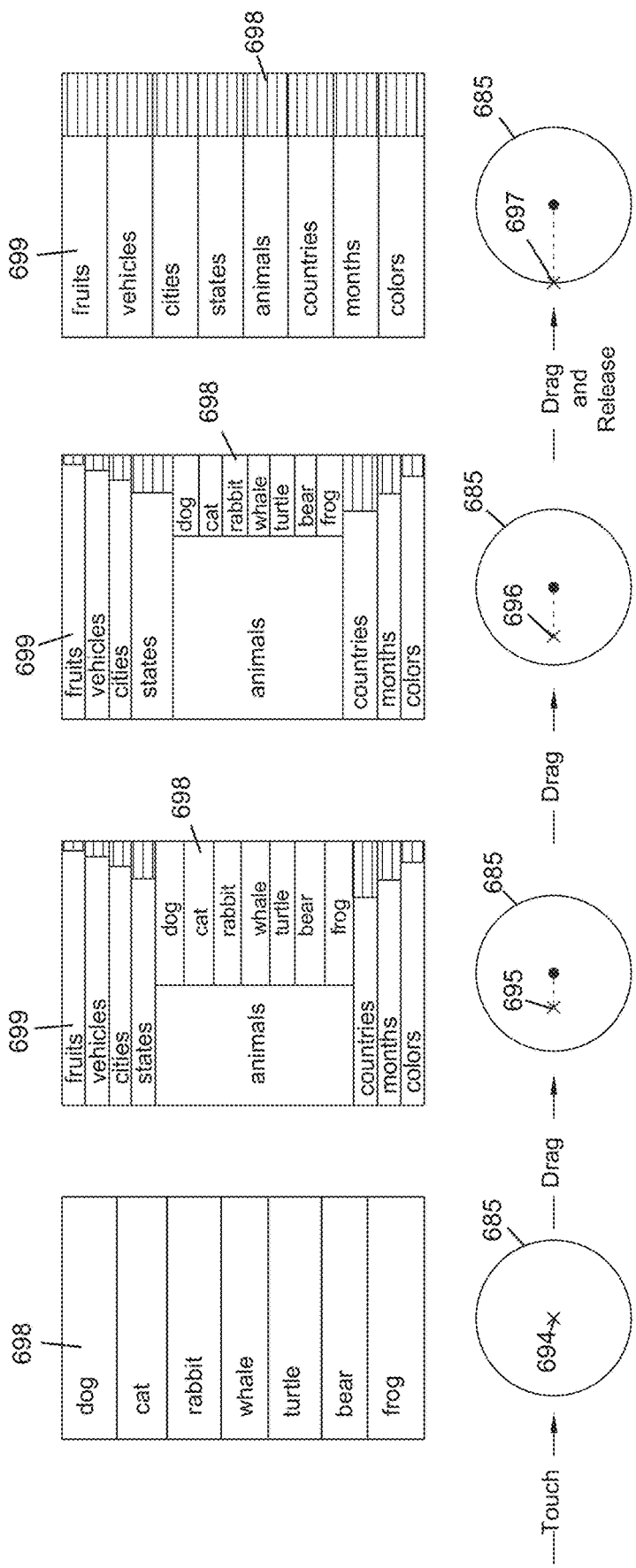
FIGS. 69A-69D illustrate an embodiment of a UI for moving backward from sublistings to the list containing their parent listing.

With reference to FIGS. 69A-69D, the UI can use a "back mechanic" to go back to prior menus during navigation. In FIG. 69A, the user has touched the touch input of the UI to set a control point 694 and the UI responds by forming a touch circle 685. The display in this example computing device shows an animal sublistings 698 at full size which includes: dog, cat, rabbit, whale, turtle, bear, and frog. With reference to FIG. 69B, the user has dragged or swiped the control point 695 to the left which results in the display showing the primary listing 699 which includes: fruits, vehicles, cities, states, animals, countries, months, and colors. The sublisting 698 for the listing "animals" is shown and legible on the visual display. Additional sublistings associated with the listings above and below the "animals" listing can be shown in a smaller less focused format. With reference to FIG. 69C, the user continues to drag or swipe the control point 696 to the left which results in smaller less focused sublisting for animals and associated sublistings. In FIG. 69D, the user continues to swipe or drag left to the touch circle 685 so that all of the primary listings 699 are displayed at equal sized text and the sublistings 698 are displayed in equal size in a much smaller text size which may not be legible. The user can then perform additional UI interactions for further navigation through the primary listings 699.

With reference to FIGS. 70A-70E examples of scrolling and a corresponding visual display are illustrated. As discussed, a listing can have a visible portion 701 that is shown on the display of the computing device and non-visible portion(s) 703 that is not displayed on the display of the computing device. The non-visible portion(s) 703 can be above and/or below the visible portion 701 and can be moved into the visible portion 703 through scrolling through the UI. In FIG. 70A, the user has touched the touch pad at the control point 704, and the UI forms a touch semi-circle, and then the user swipes right to the control point 705. The listings d-f are in the visible portion 701 with the listing "e" having the largest size or primary focus and the adjacent letters "d" and "f" being smaller in size and the next adjacent letters a-c and g-k are compressed vertically very small and can be illegible. The remaining letters 1-z are in the non-visible portion 703 virtually below the visible portion 701 and not shown on the display of the computing device.

With reference to FIG. 70B, the user has swiped clockwise to control point 706 which is adjacent to the vertical line through the touch semi-circle. The swipe to control point 706 is interpreted by the UI and causes the enlarged visible portion of 701 to move down to the letters h-k with the listing k having the largest text or primary focus while the upper letters a-g are compressed, much smaller, and possibly illegible. With reference to FIG. 70C, the user can continue to swipe clockwise and the UI can rotate the touch semi-circle counterclockwise about 90 degrees in this example. The visible listings are now m-p with the letter p being the largest or primary focus listing letter and the letters m, n, and o being smaller letters but visible. The letters f-l are above the letter m and compressed and may not be visible.

With reference to FIG. 70D the user can continue to scroll clockwise to control point 708 and the display can move to the display showing letters C-F. The focus of the visible portion 701 is F, the adjacent letters C, D, and E that can be smaller in size while the letters u-z and A-B can be compressed and not visible. In FIG. 70E, the user can stop and swipe counterclockwise to move back to control point 709 so that focus of the visible portion 701 is now B which is the largest size on the visual display, the adjacent letters A and C are in smaller text and the remaining letters v-z and D-F are compressed and may not be visible.

Flipbooks

In some embodiments the inventive UI can be used for interacting with something that requires a visual representation like a drawing program or audio editing. The UI may present the user with a static view of data that can be a visual representation 711 of the data documents (drawing, way file, etc.) illustrated on the display of the computing device 710 as shown in FIG. 71A. By selecting the area of focus and visual representation 711 with the UI mechanism, the system interpolates and transitions to a dynamic view shown in FIG. 71B which can be one of a series of images 712 of impulse curve data. For the interpolation, additional images can be displayed with the static image shown in FIG. 71A shown at the top and additional views 712 shown underneath in this embodiment.

From the sequence of images, the UI system can be used to zoom and select an image. With reference to FIG. 71C, the user can touch the UI at an initial control point and the UI can create a control circle 717. The user can then manipulate the displayed data by swiping on the touchscreen and zooming and/or scrolling. In this example, the control point 715 swipes outward towards the touch circle 717 which results in zooming. The zoom level can correspond to the spacing of points 719 on the touch circle 717. At the initial touch circle, the points can be evenly spaced so that the images are all equal in zoom level and size. As discussed, the points 719 are redistributed to be non-evenly spaced around the touch circle 717 when the user swipes outward radially. Scrolling can then be performed with angular motion of the control point 715 as described above so a user can scroll through the images 712 which results in a flipbook-like fashion display of the images. And, as with all other visualizations, there is no need to scroll linearly.

Again, radial swiping motion results in one of the images being enlarged and other images being reduced in size and rotational swiping results in scrolling. The user can select an image 712 by swiping to the touch circle. In this example, the dynamic view shown in FIG. 71C is a normal menu, but in other embodiments, the dynamic view could also work with a satellite circles style menu as well. Satellite circle visualizations can be used to make visual adjustments in a flipbook-like fashion.

Tactile Feedback

In an embodiment, the inventive UI can include a tactile feedback mechanism that can allow users to augment the information provided by visualizations. For example, vibration when the user enters the top or bottom of the input disc could help the user to orient their input when not looking at the screen, in a similar fashion to raised bumps that are placed on the and 'j' keys on many key English keyboards. Vibration patterns can also be used to notify the user as they enter a new selection area on the touch circle UI, when a selection becomes focused, etc. More specifically, the tactile feedback can be applied to the touchpad, joystick, or other device which the user can be in contact with. Different vibrations can be used to identify movement of the control point into different regions of the UI control areas. In other embodiments, the UI can emit audio signals in response to help the user identify movement into a UI control point in different regions of the UI control areas.

Previews and Nesting

Figure 66:
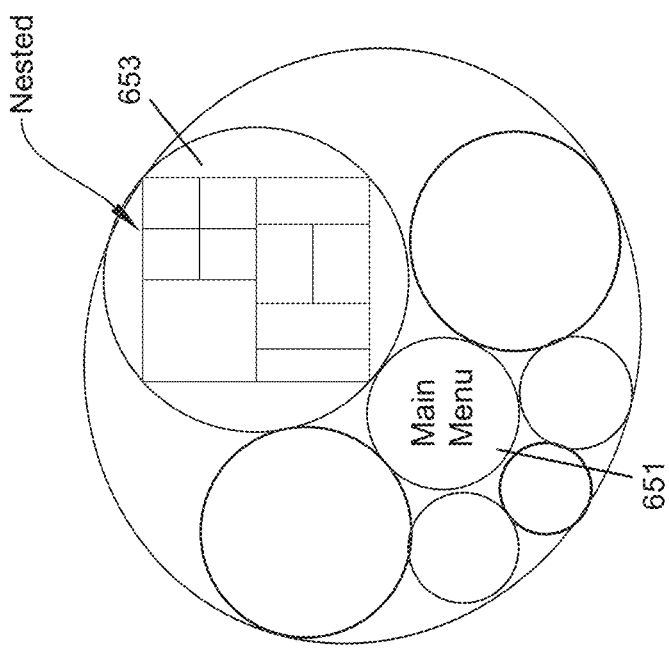
FIGS. 65 and 66 illustrate embodiments of UIs with displayed nested menus.
Figure 65:
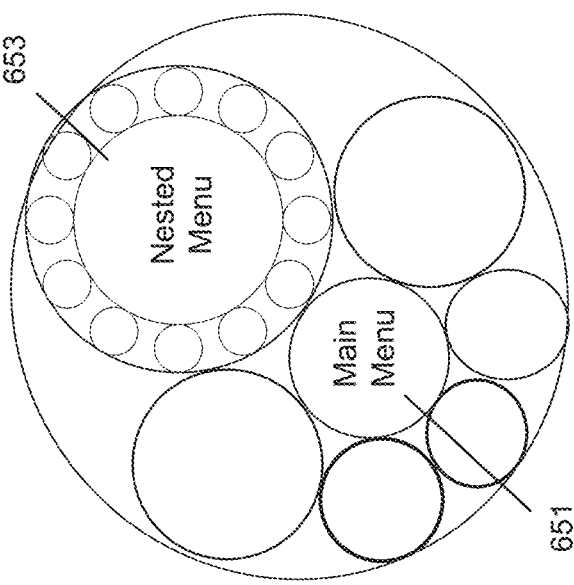

In some embodiments, the inventive UI can have nested interactions that a user can interact with in an interleaving action. For example, in a two finger embodiment, a user can use one finger to manipulate a folder while the other finger's location is used to manipulate the contents of the subfolders. With reference to FIGS. 65 and 66, examples of nested UI interfaces are illustrated. The primary UI menu 651 can be controlled by a first finger and a nested menu 653 can be controlled by a second finger. The initial contact of either finger can result in a control point and radial movement can result in zooming and resizing of the menu components while radial swiping can result in scrolling of the zooming feature through the menu listings. FIG. 65 illustrates a radial main menu 651 and a radial nested menu 653 having satellite circles. Each of these menus can be independently controlled in any of manners described. In other embodiments, different types of menus can be used. For example, FIG. 66 illustrates a radial primary menu 651 controlled by a first finger and the nested menu 653 is a rectangular configuration which can be scrolled through as described above.

Use Cases

File Browser

Figure 53:
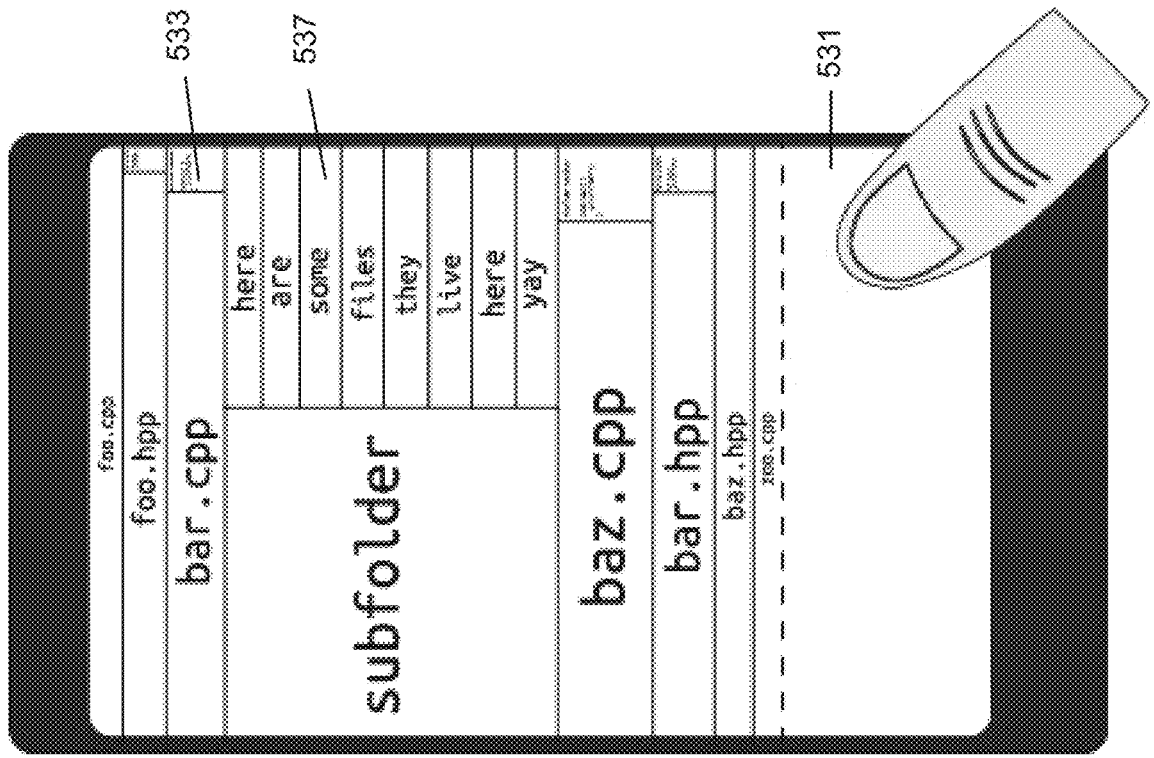
FIGS. 52 and 53 illustrate an embodiment of a UI subfolder focusing.
Figure 52:
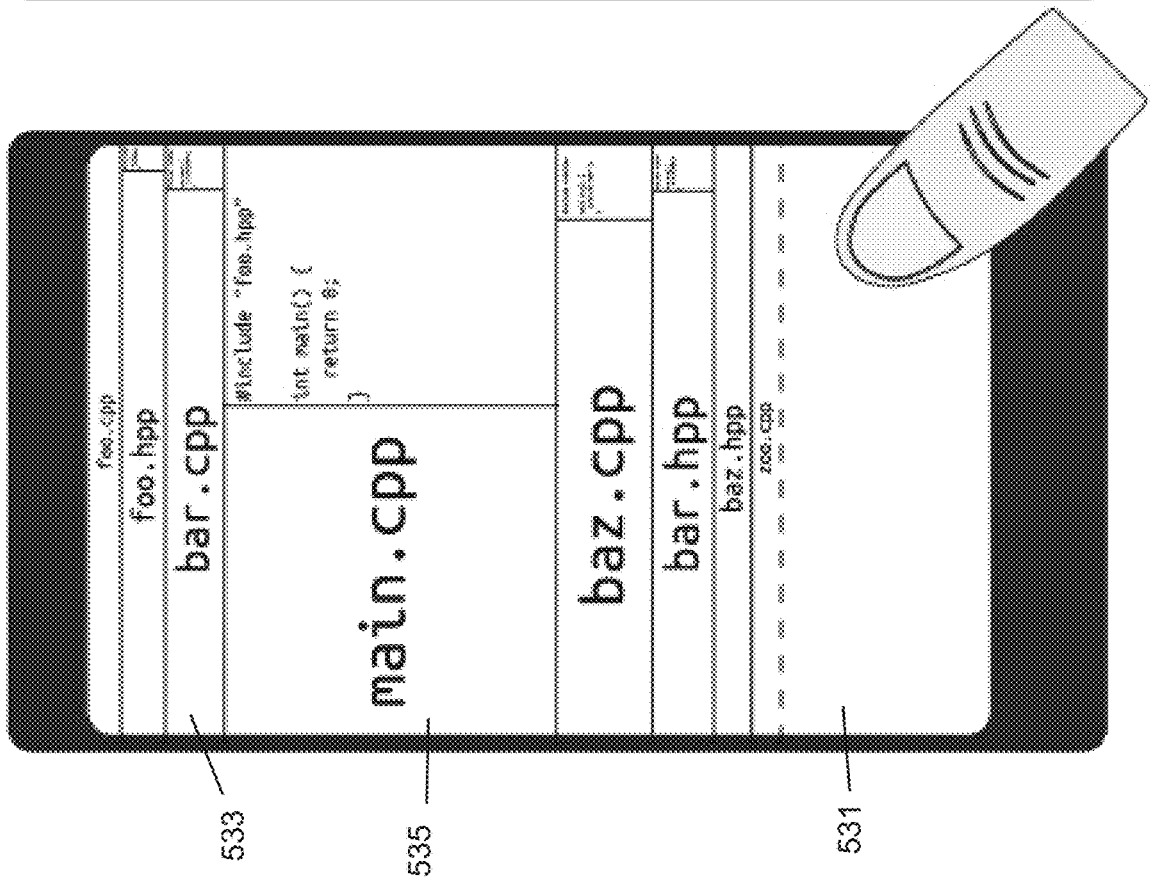

The following is a description of a file browser using the UI with the inventive Scroll Mechanic. As illustrated in FIGS. 52 and 53, a mobile computing device is illustrated with a touchscreen such as a smartphone. The screen can have an upper display portion 533 and a lower UI control area 531 unit circle. The system UI can be used as described above and the UI allows users to traverse and edit the project's directory structure, and provides scalable previews into both files and directories. The upper portion 533 of a touchscreen can display a directory and the size of the directory listings can be configured with a center listing having the largest format and listings having smaller formats the farther they are away from the center listing. In FIG. 52, the user has used the lower UI control area 531 to cause the UI to focus on the listing "main.cpp" 535 and some code associated with the main.cpp listing 535 is displayed to the right. The user can select the main.cpp listing 535 by swiping outward to the touch circle and the UI can display a subfolder of listings 537 as shown in FIG. 53. The user has used the UI to navigate to the subfolder file which is enlarged text at the center of the display and subfolder listing are shown to the right. The UI can be used to scroll through the subfolders or to go back. In this example, the subfolder of listings 537 are shown as: here, are, some, files, they, live, here, yay. The user can use the UI to select the desired subfolder listing 537.

Browser Menu

In an embodiment, the UI can be used for browsing file menus or context menus. The menu can be modal. As an example, the starting UI menu can include the options: select and new. If the select option is chosen, the file browser UI enters a select mode that allows the user to select a desired file to review and/or edit. The UI can cause the next file or directory that is selected to become active. File previews can still show during the UI selection process. Multiple files/directories can be active at the same time, and those files/directories can each be highlighted in a different color so that the user can more easily distinguish the different files/directories. After the user completes a selection, the menu can allow the user to cancel the selection via a back mechanic so that a selection error can be corrected. Going backward returns the UI to the prior UI menu and the described selection process can be repeated until the user selection has been corrected.

After at least one file/directory is selected, the UI can provide the user with a menu that can contain one or more of the following options: cancel, move here, delete, copy here, copy and rename, move, and/or rename. The move here can be selected to move the data if the directory has changed. The delete can be selected to delete the data. The copy here can be selected to copy the data to a different file if the directory has changed. The copy and rename can be used to create a copy of the data that is renamed. The move and rename can be used to move and rename the selected data if one data file is selected. After the selected function is performed, the UI menu can return to its start state and the described UI data processing can be repeated.

Rotary Keyboard

In an embodiment, the UI can be used as a keyboard. In different keyboard embodiments, the UI interaction can work with either one or two fingers. Each finger can interact with the touchscreen using a satellite circle visualization.

Two-Finger Keyboard

Figure 60:
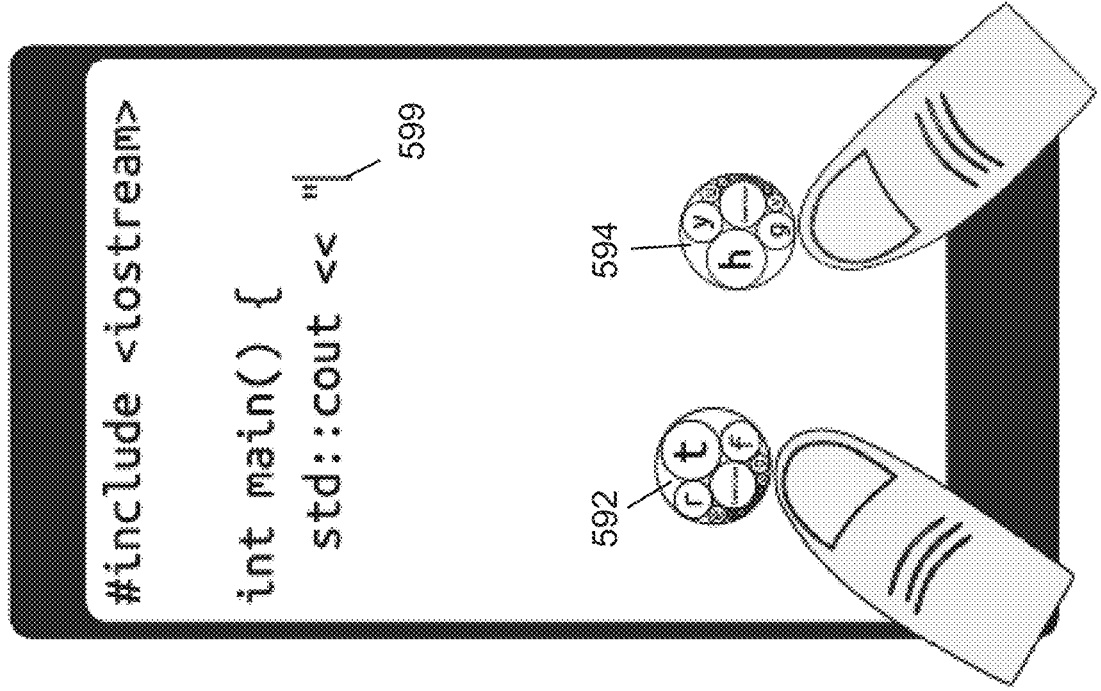
FIGS. 59 and 60 illustrate an embodiment of a two finger vertical QWERTY keyboard UI.
Figure 59:
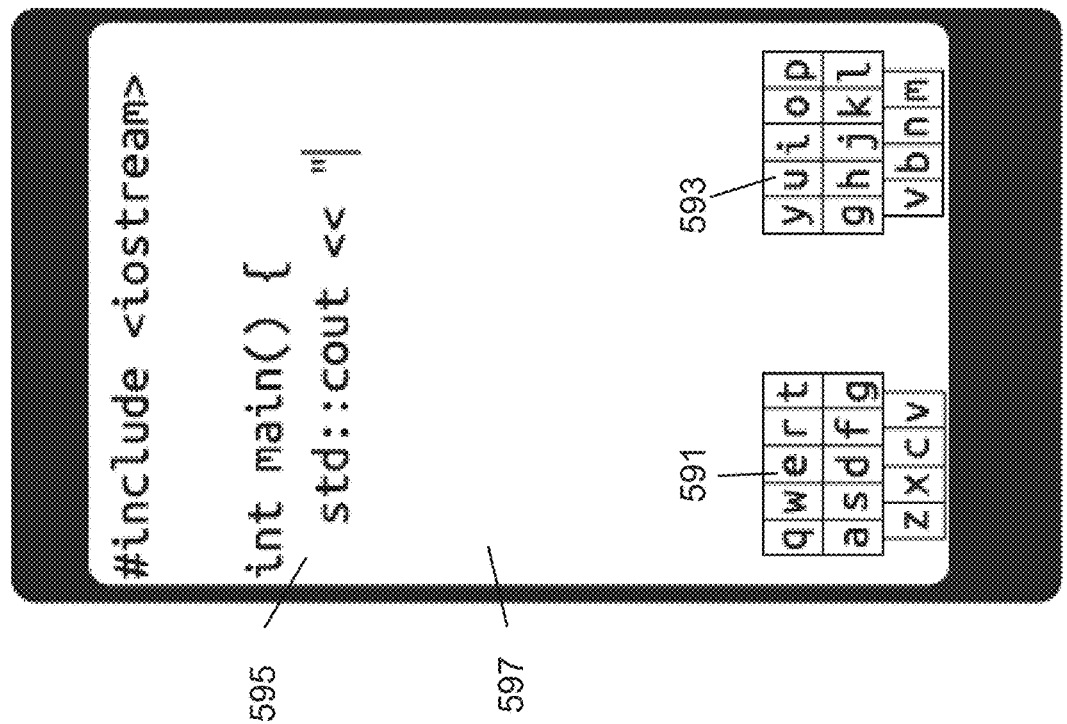

In a two-finger mode, the touchpad screen can be divided into two columns of equal width, and each column has an associated keyboard menu that is manipulated by beginning a radial gesture in that column by a left finger and a right finger. With reference to FIGS. 59 and 60, a visual display can be displayed above the touchpad keyboard input area visual content 595 in a visual display area. The keyboard menus start in a grid mode that mimics the QWERTY keyboard. The left half 591 of the QWERTY keyboard for the left finger, and the right half of the QWERTY keyboard 593 for the right finger on the lower portion of the touchscreen 597 of the computing device input. A keyboard "touch area" can be at the bottom of the screen 597 so that touch UI interactions will not obscure visual content 595. As described above, a satellite circle visualization begins with a radial gesture that starts in the touch area. With reference to FIG. 59, the user can touch the left block of letters 591 and the right block of letters 593 with a left thumb and a right thumb respectively. With reference to FIG. 60, when a finger touches the screen, the associated menu animates to a satellite circle visualization. The UI has responded to the left thumb and right thumb control points and the letters can be converted into satellite circle visualizations 592, 594 which are illustrated above the touch circles. The UI can function as described above with reference to FIGS. 33-35. In an embodiment, the user can touch the touchscreen to set a control point and swipe outward to cause the visual display to zoom on one of the letters. The user can swipe to the touch circle to select letters. The user can manipulate the UI to select and input data. In this example, the text input cursor 599 is at the end of the existing text std::cout<<"|.

Figure 61:
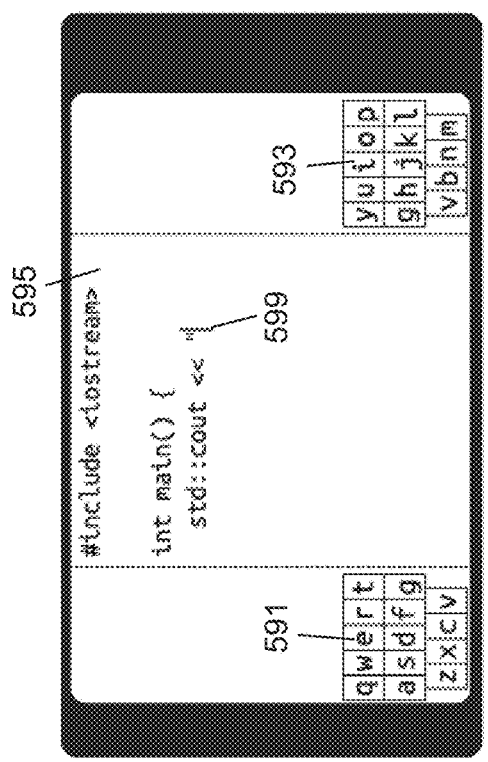
FIGS. 61 and 62 illustrate an embodiment of a two finger horizontal QWERTY keyboard UI.
Figure 62:
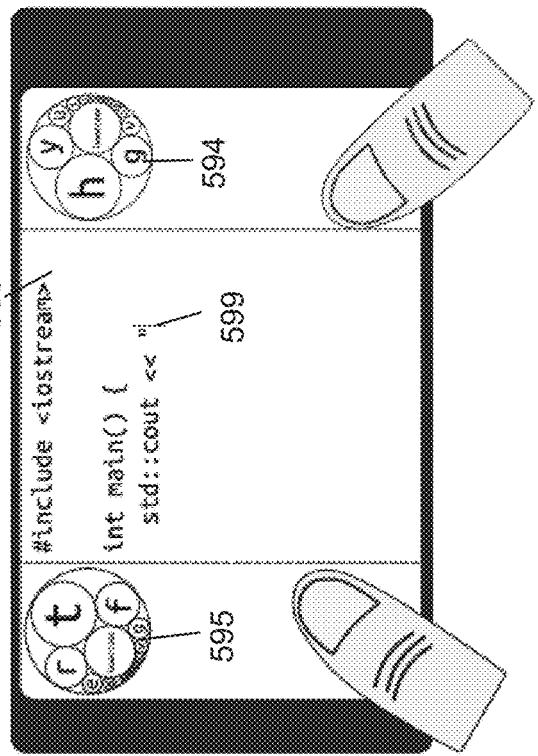

With reference to FIGS. 61 and 62, another two finger keyboard embodiment is illustrated with the computing device display in a landscape orientation. In this embodiment, the two blocks of letter menus 591, 593 are on opposite sides of the visual content 595. This keyboard can function in the same manner described above with reference to FIGS. 59 and 60. When the user touches the letter menus 591, 593, the UI can respond by displaying satellite circle visualizations 592, 594 which are illustrated above the touch circles.

Single-Finger Keyboard

Figure 64:
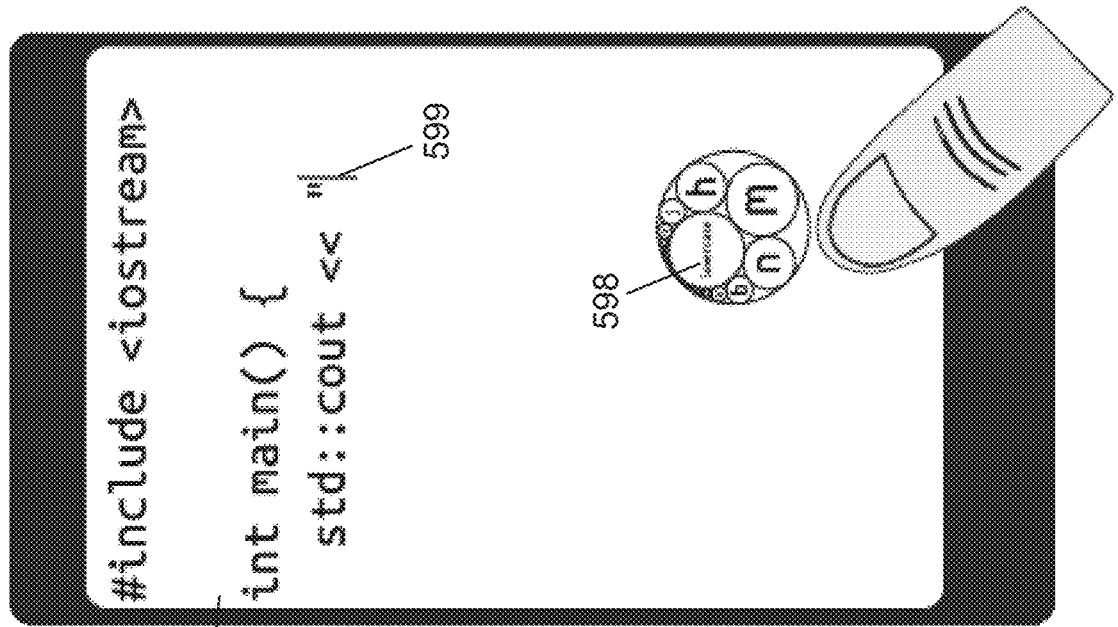
FIGS. 63 and 64 illustrate an embodiment of a single finger QWERTY keyboard UI.
Figure 63:
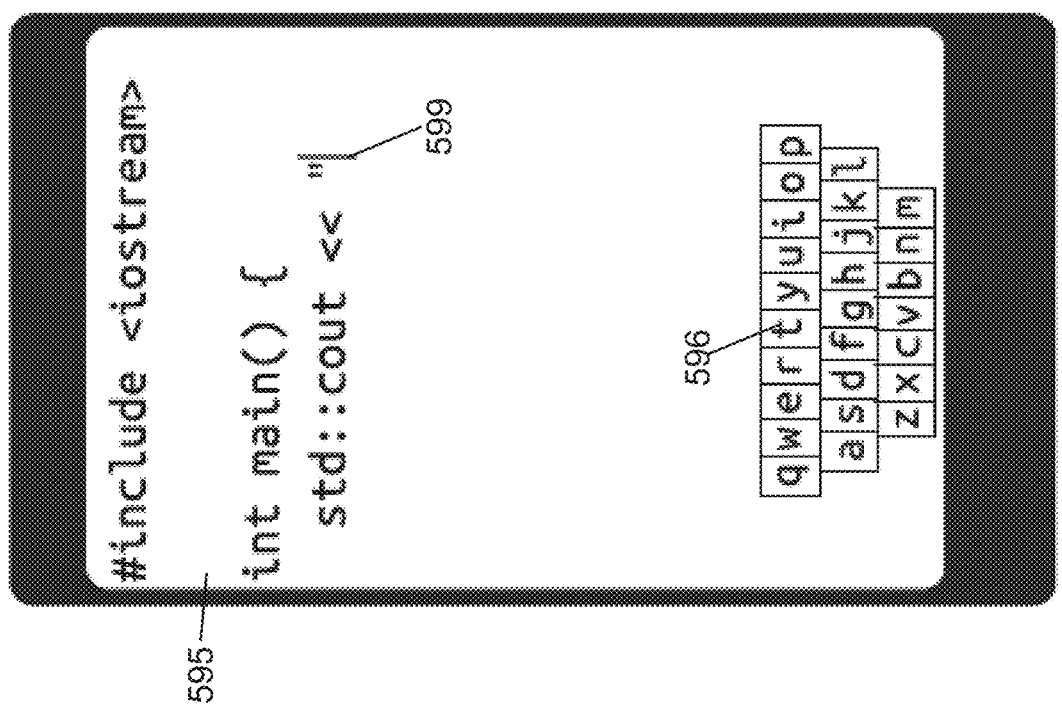

With reference to FIGS. 63 and 64, an embodiment of a single finger keyboard UI is illustrated. The user can scroll and zoom to any desired letter and then swipe out to the control circle to select the desired letter and the process can be repeated to input text.

One finger mode is similar to two-finger, but there is only one menu at a time. This UI menu will typically contain a combination of the contents of the two corresponding two-finger menus. Some selections (e.g., "punctuation" or "shift") can change the content of the menu. If the user changes from one side to the other (e.g., when switching hands), the visualization animates to the other side. FIGS. 63 and 64 illustrate an example of single finger UIs. FIG. 63 illustrates a touchscreen with a lower portion showing a single QWERTY keyboard 596 and an upper portion which is a visual display 595 where the user can add text to. The user can touch the touchscreen input 596 and the UI can respond by displaying a satellite circle visualization 598 which includes all of the QWERTY keyboard letters above the touch circle. With reference to FIG. 64, the user has touched the touchpad and the letters of the keyboard have been transformed as illustrated above in the satellite circle visualization 598 which will have all of the letters in the keyboard. The user can input text by selecting specific letters or other typed characters as described above.

For both the single and two finger keyboard inputs, some selections (e.g., "punctuation" or "shift") can change the contents of the menus. If such a selection is made by one finger, both menus immediately switch to the new static visualization (grid). Any previous interaction with the other finger is canceled.

Menu-Based Keyboard

Another keyboard embodiment is based entirely on a more standard menu system as discussed earlier with reference to FIGS. 67A-69D. Thus, typing can be mixed with arbitrary menu-based operations, such as caps-lock, completion, grouping of characters, etc. As the keyboard is just a menu, this also allows for both multitouch interaction and an extremely user-configurable typing experience. So, for example, a simple user-writable text file could define a graph structure representing a keyboard.

Cursor Placement

The UI can allow a user to place a cursor at any location on a document displayed on the computing device. The UI mechanism can utilize a vertical and horizontal control system to place the cursor at the desired location. In a single finger mode, the single finger can first perform a vertical focus and then a horizontal focus or a horizontal focus and then a vertical focus to place a cursor by the single finger. In a two finger mode, the horizontal focus and the vertical focus can be performed simultaneously by left and right fingers. One embodiment of cursor placement has been discussed previously as color zoom.

Single-Finger Mode

Figure 56A:
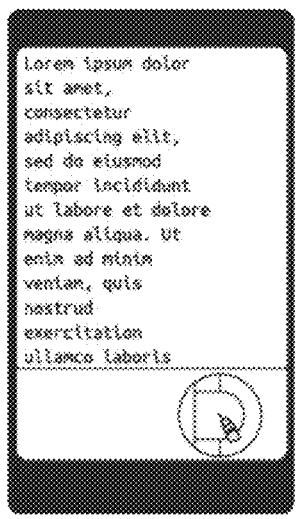
FIGS. 56A-56G illustrate an embodiment of a UI for single finger vertical and horizontal focusing.
Figure 56B:
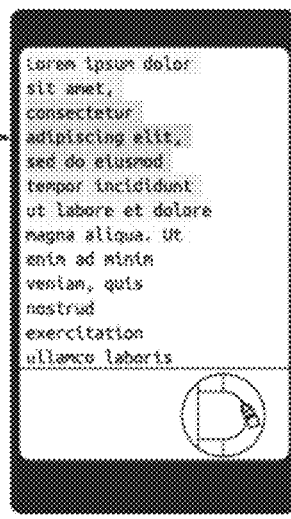
Figure 56C:
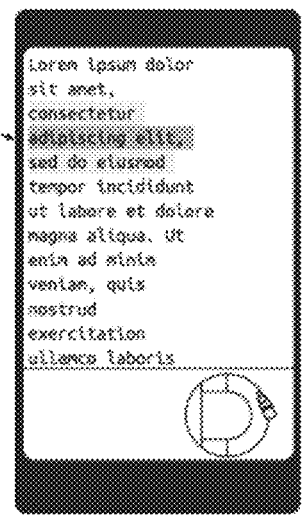
Figure 56D:
Figure 56E:
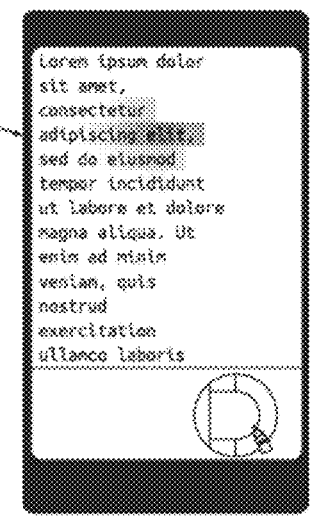
Figure 56F:
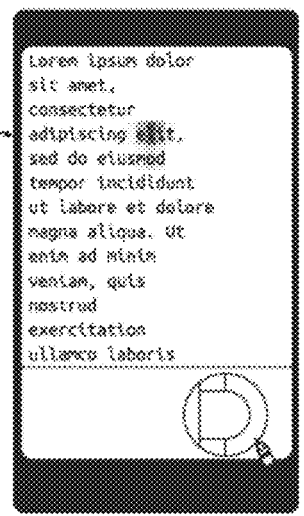
Figure 56G:

With reference to FIGS. 56A-56G, in a one-finger mode, the user can choose a row and column with two independent one-finger gestures, possibly interleaved. With reference to FIGS. 56A-56C, the UI can be used as described above and a first gesture can choose a row. In FIG. 56A the user has touched the touchpad at the touchpoint in a neutral zone. In FIG. 56B, the user has swiped outward to the upper right to the inner edge of the scroll selector zone. The upper rows of the displayed text are slightly highlighted. In FIG. 56C, the fourth row is more prominently highlighted and the user can release the finger from the touchpad to select the fourth row. If any other row is desired the user can control the UI to scroll to highlight the target row. The user can then use the UI to choose a column for selecting a specific word in the fourth row. With reference to FIG. 56D, the user has touched the touchpad at the touchpoint in a neutral zone. In FIG. 56E, the user has swiped outward to the lower right to the inner edge of the scroll selector zone. The second word in the fourth row of the displayed text is slightly highlighted. In FIG. 56F, the letter "l" in the word "elit" is more prominently highlighted and the user can release the finger from the touchpad to select the letter "l" in the word elit as shown in FIG. 56G.

Two-Finger Mode

With reference to FIGS. 57A-57D, a two finger UI input mode can be used to perform the selection of a specific letter in a displayed text on a visual display. The left finger menu can navigate a row selection, and the right finger menu can navigate a column selection. When the user selects both a row and a column, keyboard mode can be launched, with the cursor at the selected row and column. If the user selects just a row or just a column, that selection is "locked in". A locked in selection can be overridden by starting a new gesture with the associated finger. A gesture that does not make selection locks in the existing locked-in selection if there is one, or it locks in the user's existing position.

FIGS. 57A-57D illustrate a two-finger mode for performing the same cursor placement function described above with reference to FIGS. 56A-56G. In FIG. 57A, the left hand finger and the right hand finger have touched the touchscreen at two touch control points in two neutral zones. In FIG. 57B, the left finger swipes to the upper right and simultaneously the right finger swipes to the lower right to the inner edge of the inner edge of the scroll selector zone. The text is highlighted in the area around the second word of the fourth row. In FIG. 57C, the letter "1" in the word "elit" is more prominently highlighted and the user can release both fingers from the touchpad to place a cursor between the letters e and 1 in the word "elit" as shown in FIG. 57D.

If the user begins either finger swipe gesture but fails to make a UI input selection (including back), the user's existing position can be selected and the UI can move to the next step. The user can back out of a UI row selection by making a back gesture swipe selection during the column gesture.

Finger Modes

The UI control mode of the computing device can support one-finger input, and some can support two-finger input. For modes that support both one and two-finger input, the finger mode can be chosen as follows. When the user begins a gesture with one finger, one-finger mode is invoked. If at any subsequent point, the user begins a gesture with a second finger, two-finger mode is invoked. If the user doesn't interact with two fingers during an implementation-defined timeout, the mode returns to one-finger.

Some embodiments make no distinction between finger modes, and some embodiments can support unlimited concurrent gestures. In particular, an explicit mode switch may not be necessary when all UI controls begin oriented in the same fashion. Other embodiments may detect that a first input point of a gesture is contained in a particular region of the display and assign an initial orientation for UI controls based on the region containing the gesture.

Local Cursor Navigation

Figures 58A, 58B, 58C:
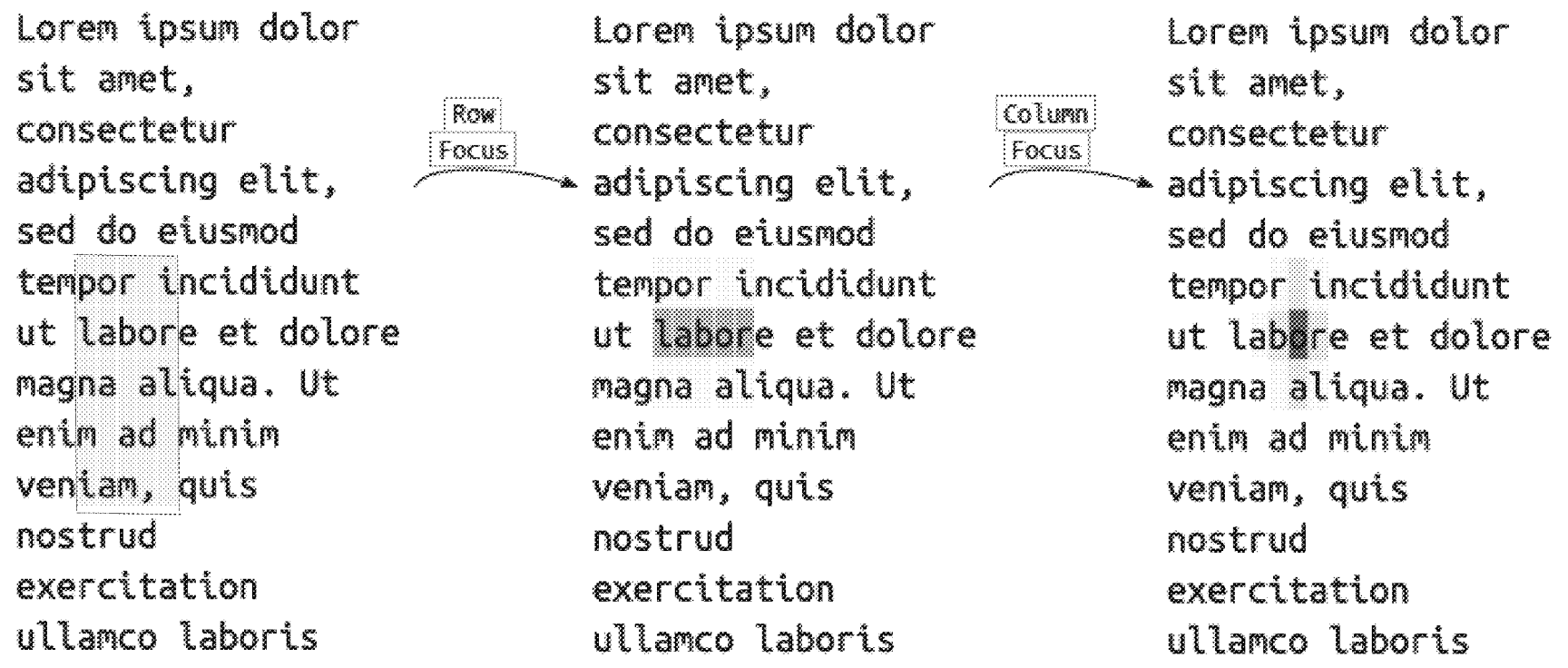

With reference to FIGS. 58A-58C, an example of the inventive UI used for Local Cursor Navigation is illustrated. FIG. 58A illustrates a block of text displayed on a visual display with a portion of the text highlighted by a rectangular marking such as color or outline. FIG. 58B, the UI allows the user to navigate with a row focus to more narrowly focus around the word "labore". In FIG. 58C the column focus can be applied within a smaller grid surrounding the current cursor location around the letter "o" in the word "labore". This grid scrolls left, right, up, and down using the normal mechanics. (i.e., when focus gets to the edge of the grid, the grid window moves in that direction using the Scroll Mechanic.) In other embodiments, the vertical row focus and column horizontal focus can be performed by a two finger embodiment of the UI invention. The UI can be used to focus on a single letter in a block of text by applying a row focus using the left finger and simultaneously a column focus can be performed with the other finger. The focusing on the text can be controlled and illustrated to a user on a screen in a highlighted format.

Floating Focus

In some embodiments, the UI system uses floating focus techniques to implement interactions such as scrolling, zooming, and placing a cursor on a visual display of a computing device. These techniques are distinct in that they allow users to fully control pagination of grouped information such as the lines of text in a document, so that, for example, users are not limited to set scrolling increments such as pages or half pages.

A boundary dimension count is the number of dimensions that must be restricted in order to form a data block boundary that encloses a data block on all sides. (Note that the edges of the visible portion of a data block listing are considered implicit boundaries.) For example, some embodiments manipulate text as a listing of text data blocks using a two-dimensional layout wherein a boundary dimension count is considered to be two, i.e., a vertical dimension and a horizontal dimension. This allows the user to progressively narrow focus by refining the boundary of a two-dimensional volume such as a rectangle, which is used to update the contents of the display. For example, a single interval in the vertical dimension can denote the top and bottom of a text data block boundary box. Without specifying any additional bounds, the left and right sides of the visible portion of the data blocks implicitly denote the left and right sides of a boundary box, so a whole row of characters is contained within the boundary box. By adding an additional bounding interval in the horizontal dimension, the box can be further restricted to a single character (further narrowing the focus).

In other embodiments, the data blocks can be configured in a three-dimensional volume such as a three dimensional box having vertical, horizontal, and depth dimensions. The inventive UI controls can be used to narrow the focus of the display on data blocks in a three-dimensional boundary box.

FIG. 72 depicts an embodiment wherein a base layout of a listing of data blocks can be visualized as a two dimensional grid 7201 that in this example has sixteen data blocks and contains a data block 7202. The data block 7202 has data block boundary 7209 with a boundary dimension count of two. The horizontal interval 7203 bounds a column of data blocks in the horizontal zoom dimension, and the vertical interval 7204 bounds a row of data blocks in the vertical zoom dimension. Together, interval 7203 and interval 7204 bound and define the boundary 7209 of the data block 7202. The data block 7205 is to the left and precedes 7202 in the horizontal dimension, and the data block 7206 is to the right and succeeds 7202 in the horizontal dimension. The data block 7207 is above and precedes 7202 in the vertical dimension, and the data block 7208 is below and succeeds 7202 in the vertical dimension. By itself, interval 7204 creates a focus that contains a row of data blocks within interval 7204 including data blocks 7205 and 7206. The combination of the vertical interval 7204 with the horizontal interval 7203 creates a focus wherein the data block 7202 is focused without any of the other data blocks in the grid 7201.

Figure 76:
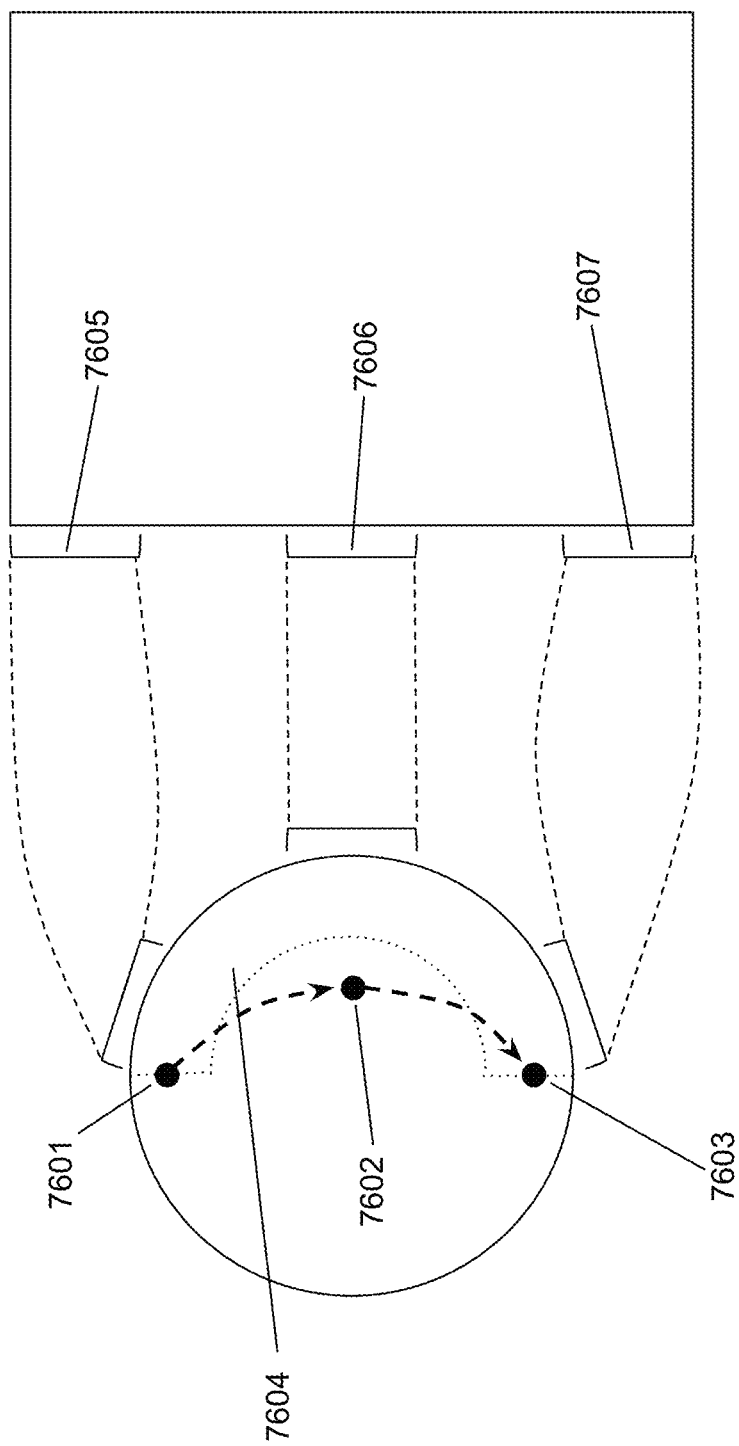
FIG. 76 illustrates an example of parameterizing a zoom interval using an input vector angle on a UI and a display of a computing device.

Some embodiments of the inventive system can assign zoom intervals that can be manipulated by an input vector that is input into the UI of the computing device and the manipulated zoom intervals are used to refine an area of focus displayed on the visual display of the computing device by changing the bounds of the area of focus in a particular dimension. FIG. 76 illustrates an embodiment where the zoom interval 7605, 7606, 7607 has a predetermined height, and the location of the zoom interval is controlled by the angle of the input vector, so when the input vector 7601 points upward, the zoom interval 7605 is at the top of a page, and when the input vector 7603 points downward, the zoom interval 7607 is at the bottom of a page. This zoom interval refines the area of focus in the vertical dimension, so that only the rows of text contained within the zoom interval 7605, 7606, 7607 are considered focused. Note that in some embodiments a zoom interval may not align with the boundaries of data blocks within the zoom interval, so that some data blocks can be only partially contained in the zoom interval.

FIG. 76 depicts an embodiment wherein a zoom interval moves according to the motion of an input vector. Part of an input gesture is depicted, wherein the UI detects input vectors 7601, 7602, and 7603 chronologically. A scroll selector 7604 on a UI is shown for reference. At input vector 7601, the zoom interval 7605 at the top of the page is assigned; at input vector 7602, the zoom interval 7606 in the middle of the page is assigned; and at input vector 7603, the zoom interval 7607 at the bottom of the page is assigned. Note that the lengths (or heights) of the zoom intervals 7605, 7606, 7607 are fixed and independent of the length of the input vector.

In some embodiments, the size/height of a zoom interval may be affected by a length of an input vector, so that when the input vector is longer, the size/height may be smaller. This can allow users to refine both the size and position of a zoom interval in a single gesture.

The UI of the inventive system can be used to change the focus of the display on the data blocks. The processor can determine a visible data block boundary that bounds the data blocks in the visible portion of the listing of the data blocks that can be controlled by a user through the UI. The user can input a gesture through the UI to change the area of focus. The processor can detect from the input gesture that a focus of the gesture intends to move outside the visible data block boundary in a scroll intent direction. The processor can then determine a revised visible portion of the listing of the data blocks that includes some of the data blocks that are outside the visible data block boundary in the scroll intent direction and the system can display a revised visible portion of the listing of data blocks.

The processor can determine that the user wishes to move outside the visible data block boundary based upon the user's input gesture. For example, if the data blocks are textual characters in a grid of text where some is off the screen to the left, right, top, and bottom, a vertical zoom interval can be used to focus the lines of text it bounds. The processor can determine that the input vector has moved past an angular boundary that triggers an upward or downward scroll in the gesture intended direction. For a horizontal movement, a horizontal zoom interval can focus columns and the processor can detect that the input vector has moved past an angular boundary that triggers a scroll to the left or right. When the vertical focus is adjacent to the visible data block boundary at either the top or the bottom of the visible portion of the textual characters, a gesture that manipulates a horizontal zoom interval can result in a vertical scroll. This can be analogous to scrolling past the first or last character in the visible portion of the characters: The processor can detect that a touch input has moved past an angular boundary associated with the first visible character, determining that the user intends to move outside the visible data block boundary in an upward direction, and the processor can respond by scrolling the visible portion of the document upward. Similarly, the processor can detect that a touch input has moved past an angular boundary associated with the last visible character, determining that the user intends to move outside the visible data block boundary in a downward direction, and the processor can respond by scrolling the visible portion of the document downward.

FIGS. 82A-82B illustrate an embodiment wherein a selection that focuses a group of data blocks through the UI is snapped and a parameterized Möbius transformation is used to create a dynamic visualization. The upper row of FIGS. 82A-82B illustrates the revised zoom interval and corresponding display; the middle row illustrates normal zoom interval and corresponding display; and the lower row illustrates the input gestures on the UI of the computing device.

In FIG. 82A, the UI input vector 8201 shown in the lower row has moved beyond the threshold 8202 which is the inner arcuate dotted line established by the inner boundary of the scroll zone 8203. This gesture controls the zoom interval 8204 which fully contains three data blocks and partially contains the data blocks 8205 and 8206.

With reference to the upper row, the revised zoom interval 8207 contains the revised data block boundaries for three data blocks and partially contains the revised data block boundaries for the data blocks 8205 and 8206. The revised data block boundaries 8208 that fall inside the revised zoom interval 8207 have the same vertical positions relative to the revised zoom interval 8207 as the data block boundaries 8209 have relative to the zoom interval 8204.

The gesture associated with the input vector 8201 has terminated in a finger release. Because 8201 extends beyond the threshold 8202 and into 8203 in FIG. 82A, the release results in the selection 8210 which is stored in the memory. In this embodiment, the selection 8210 includes the snapped input vector 8211 shown in the lower row of FIG. 82B. The snapped input vector's location is chosen so that the associated zoom interval will best align with the data blocks. The snapped input vector 8211 has maximal length and is positioned angularly so that the zoom interval 8204 now aligns with the edges of the data block boundaries 8212 shown in the middle row. Snapping the input vector on selection allows subsequent gestures to operate on properly aligned data blocks. Consequently, the revised zoom interval 8207 aligns with the edges of the revised data block boundaries 8213 with the four data blocks completely contained in the revised zoom interval 8207 shown in the top row. None of the data blocks are partially contained in the revised zoom interval 8207.

Floating Focus: History and Concurrent Gestures

In some embodiments, the UI system can perform modifications to a history of sections and a listing of concurrent gestures. This allows users to progressively narrow the focus on the data blocks on the visual display and correct errors in the history of selections and listing of concurrent gestures. These error corrections can be useful because they allow the user to change the focus associated with previous selections without revisiting those selections. For example, if a user zooms in on and focuses a region of a document and then focuses a character within that region, they can still scroll character by character through the entire document without losing the context of their current focus. This means that any single gesture can always achieve the same results that could be achieved by redoing the entire chain of selections/gestures leading up to that gesture. Alternatively, the user can still choose to undo/redo selections, which may be more useful and/or efficient depending on how far they need to move.

FIGS. 78A-78G depict a chronological sequence of gestures input to the UI and interpreted by the processor which result in modifications to a history 7801 of selections and a listing of concurrent gestures 7802. In these examples, the history 7801 and listing of concurrent gestures 7802 are graphical representations of information stored in the memory of the computing device. Each vector in a circle represents a selection stored in the history 7801 or a gesture stored in the listing of concurrent gestures 7802. In the listing of concurrent gestures 7802 there is a primary gesture on the left side which is designated by a rectangle and secondary gestures to the right of the primary gesture. Snapped input vectors derived from primary gestures that have been terminated can be moved to the history 7801 as selections. In this example, the history 7801 can store selections with the newest selection on the right side and the oldest selection on the left side of the history 7801.

Figure 78A:
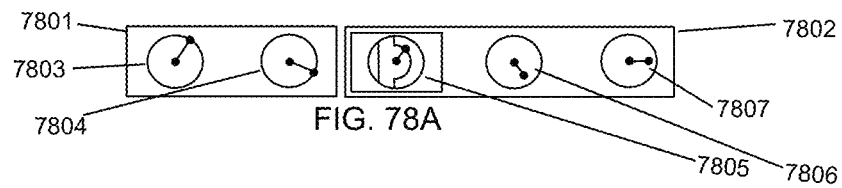
FIGS. 78A-78G illustrate an example of modifications to a history of selections and a listing of concurrent gestures on a UI.
Figure 78B:
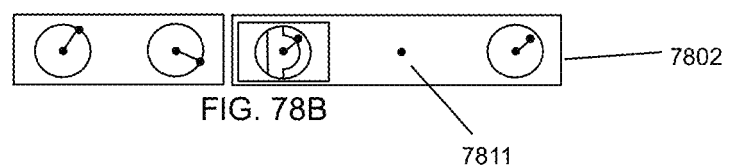
Figure 78C:
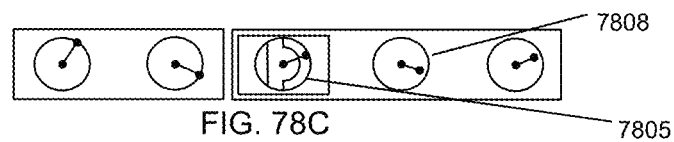

With reference to FIG. 78A, two selections 7803, 7804 are present in the history 7801. The listing of gestures 7802 contains a primary gesture 7805, and two secondary gestures 7806, 7807. In FIG. 78B, the secondary gesture 7806 (shown in FIG. 78A) has completed, resulting in a gap in the listing of gestures 7802. As a placeholder the gap is considered to house a zero input vector 7811. In FIG. 78C, the input vector of the primary gesture 7805 has increased in length in preparation for making a selection, and the new secondary gesture 7808 has been detected and added to the listing of concurrent gestures 7802.

Figure 78D:
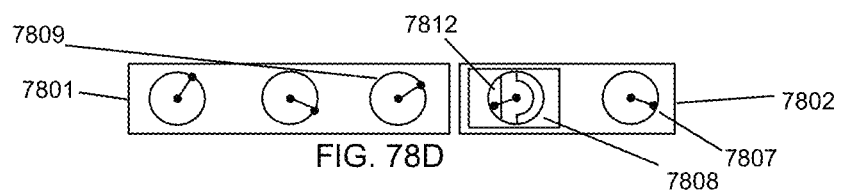

With reference to FIG. 78D, the previous primary gesture has terminated resulting in the new selection 7809 being removed from the listing of concurrent gestures 7802 and added to the history 7801. Both the primary gesture 7808 and the secondary gesture 7807 remain in the listing of gestures 7802, and gesture 7808 has been promoted from a secondary gesture to the primary gesture. The input vector of gesture 7808 has also moved to the left and into the back selector 7812 in preparation for a back selection.

Figure 78E:
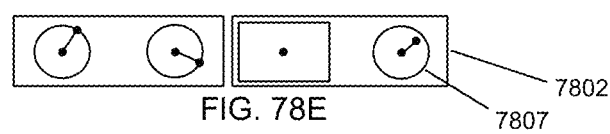

With reference to FIG. 78E, a back selection on the UI has occurred, resulting in the removal of the last selection (7809 shown in FIG. 78D) from the history 7801. The listing of gestures 7802 no longer contains a primary gesture, and instead contains a placeholder zero input vector. The secondary gesture 7807 remains in the listing of gestures 7802.

Figure 78F:
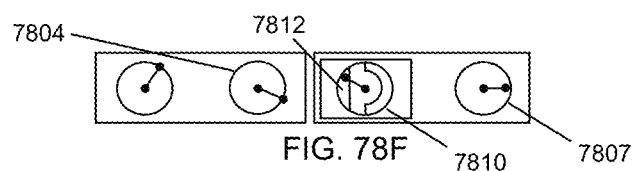

With reference to FIG. 78F, a new gesture 7810 has been detected by the computing device. The input vector of the new gesture 7810 has moved to the left into the back selector area of the UI in preparation for a back selection. The secondary gesture 7807 remains in the listing of gestures 7802.

Figure 78G:
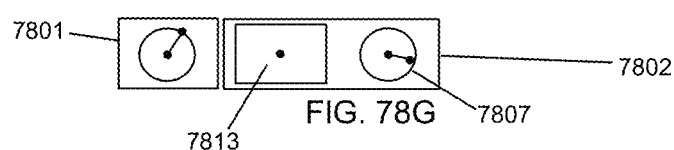

With reference to FIG. 78G, a back selection gesture has occurred and in response, the processor removed the last selection (7804 shown in FIG. 78F) from the history 7801. The listing of gestures 7802 no longer contains a primary gesture, and instead contains a placeholder zero input vector 7813. The secondary gesture 7807 remains in the listing of gestures 7802.

Floating Focus: Progressive Zooming Mechanics

The inventive system and method can allow users to manipulate large amounts of information on a small display. Some embodiments allow users to focus a region of a text document for editing via progressive zooming mechanics.

With reference to FIGS. 73A-73E, a visible portion of a document made up of text character data blocks is displayed on a visual display and manipulated via a sequence of gestures input through a UI. With reference to FIGS. 73A-73D, a vertical zoom is performed that compresses the character data blocks displayed on the visual display, affecting their legibility on the display, and with reference to FIG. 73E, a subsequent horizontal zoom recovers the original aspect ratio of the enlarged character data blocks. With reference to FIGS. 73A-73B, individual character data blocks are omitted from the illustration for clarity and instead rows of character data blocks are illustrated, and with reference to FIGS. 73C-73D, the character data blocks are only illustrated in the two largest rows of text. Note that all text data blocks in the visible portion of the listing of data blocks can be shown on the visual display with the focused rows enlarged the most and the rows above and below being compressed vertically.

With reference to FIG. 73A, no input vector is input on the UI, so the data blocks in the visible portion of the listing are displayed on the visual display unzoomed in an unmodified aspect ratio. A non-visible portion 7301 of the listing of character data blocks is not displayed on the visual display. A vertical boundary 7302 illustrates a minimum number of columns of text to be displayed on the display at a time, allowing overly long lines to overflow the width of the screen when a region of text is fully zoomed.

With reference to FIG. 73B, an input vector input on the UI is used to manipulate the visualization, resulting in a revised zoom interval 7306 that is enlarged on the visual display in a dynamic visualization. The rows 7307 in the focused group 7305 have the same aspect ratio that they had in FIG. 73A while the other rows above and below are progressively smaller in height.

With reference to FIG. 73C, the length of the input vector input on the UI has increased. The data blocks in the focused group are further enlarged, and the vertical boundary 7302 is aligned with the edge 7308 of the display. A non-visible portion of the data blocks now surrounds the screen on the top, the bottom, and the right side. Again, the rows 7307 in the focused group have the same aspect ratio that they had with reference to FIG. 73A.

With reference to FIG. 73D, the length of the input vector input on the UI has continued to increase, but in order to keep the minimum number of columns more readily accessible, the vertical boundary 7302 remains aligned with the edge 7308 of the visual display. The rows 7307 no longer have their original aspect ratio, and the revised data block boundaries 7304 appear elongated in the vertical direction as opposed to their original aspect ratio.

With reference to FIG. 73E, a subsequent gesture input to the UI has been used to recover the original aspect ratio of the revised data block boundaries 7304 by manipulating a zoom interval in the horizontal dimension to expand the widths of the focused columns. The first gesture manipulating the vertical zoom interval can be concurrent with the second gesture manipulating the horizontal zoom interval, establishing a nesting of focus so that the first gesture can be considered to be less focused than the second gesture because the second gesture's focused group of data blocks is a subset of the first gesture's focused group of data blocks.

Note that in some embodiments, a back gesture input to the UI can reverse the effects depicted in FIGS. 73A-73D so that as the length of the back gesture increases, the dynamic visualization results in FIG. 73D, then FIG. 73C, then FIG. 73B, and finally the unzoomed listing illustrated in FIG. 73A.

FIGS. 74A-74D depict an embodiment wherein a gesture input on the UI moves in a clockwise spiral motion. A dynamic visualization on a visual display is shown in the top row; an intermediate representation that is not displayed on the visual display is shown in the middle row; and the corresponding UI input is shown on the lower row. With reference to FIG. 74A, a touch detected on the UI has resulted in a zero input vector 7401 on the lowest row. The zoom interval 7402 is centered, but other embodiments may not assign a zoom interval at all, as the end result of a zero input vector results in an unchanged revised zoom interval 7403 on the top row. The dynamic visualization 7404 of the unaltered visible listing of data blocks 7405 is the same as the unaltered listing of data blocks 7405 in the middle row.

With reference to FIG. 74B, the input vector 7406 in the lowest row has a nonzero length, meaning that the input vector 7406 in the lowest row can unambiguously be assigned a zoom interval 7407 by the processor based upon the input vector angle which is upward and to the right. Due to the length of the input vector 7406, the revised zoom interval 7408 has been enlarged shown on the top row.

With reference to FIG. 74C, the input vector 7409 in the lowest row has increased in length, and the vector's angle has moved in a clockwise direction downward. A new zoom interval 7410 shown in the middle row has been derived from the angle of the input vector 7409, wherein the new zoom interval has moved downward through the unaltered visible listing of the data blocks 7405 to a middle vertical position on the display. The revised zoom interval 7411 shown in the top row is based on the zoom interval 7410 and the length of the input vector 7409.

With reference to FIG. 74D, the input vector 7412 in the lowest row has continued to increase in length, and its angle has continued to move in a clockwise direction. A new zoom interval 7413 shown in the middle row has continued to move downward through the unaltered visible portion of the listing of the data blocks 7405 to a lower vertical position on the display. The revised zoom interval 7414 on the top row is expanded based on the zoom interval 7413 and the length of the input vector 7412.

FIGS. 79A-79G depict an embodiment illustrating a sequence of process steps wherein a page of text is selected; a row of text is selected; and finally a single character is selected.

In FIG. 79A, the input vector 7901 results from a user touching a touchscreen UI, and because the input vector 7901 has no direction, a revised zoom interval 7902 is placed in the center of the page on a visual display. Some embodiments may put the revised zoom interval at other locations in this scenario or treat it as a special case where no zoom interval or revised zoom interval is necessary because the page is unchanged from its intermediate static layout. Note that the region 7904 that is above and region 7905 that is below the region 7903 contain text that is unchanged from the static layout. The regions 7904 and 7905 can have the same fully opaque background color as the region 7903 on the visual display.

In FIG. 79B, the input vector 7901 has moved down and to the right as the result of user finger motion on the UI, and as a result the revised zoom interval 7902 on the display has enlarged and the region 7903 in the lower portion of the displayed document is focused and zoomed. The regions 7904 and 7905 that are above and below the region 7903 respectively contain text that is now compressed to make space for the enlarged region 7903 on the display. The regions 7904 and 7905 can now have a less opaque background color where the decrease in opacity is based on the length of the input vector 7901, and the region 7903 still has a fully opaque background color. The less opaque background color can indicate that the regions 7904 and 7905 do not include any of the focus data blocks.

In FIG. 79C, the input vector 7901 on the UI is longer, and the region bounded by the interval 7902 takes up most of the visual display. The regions 7904 and 7905 are now smaller in area and can have a mostly transparent background color because the input vector 7901 has close to maximal length. A second, concurrent gesture has been detected by the UI, resulting in the zero input vector 7906. A zoom interval 7907 has been associated with the second gesture by the processor wherein the zoom interval 7907 is contained inside the revised zoom interval 7902, creating a nesting of focus.

Because the input vector 7906 has zero length, the regions 7908, 7909, and 7910 can all have a fully opaque background color, indicating to the user that no part of the region bounded by the interval 7902 is more focused than any other part.

In FIG. 79D, the gesture associated with the input vector 7901 has terminated in a finger release, and as a result the selection 7911 is stored as part of the history of selections 7912 in the memory of the computing device. The input vector 7906 has lengthened, and as a result the regions 7908 and 7909 can have a less opaque background color, and the region 7910 can have a fully opaque background color. The nesting of focus on the display has been maintained because a revised snapped zoom interval 7913 associated with the selection 7911 contains the zoom interval 7907.

In FIG. 79E, the input vector 7906 has lengthened further, which can make the regions 7908 and 7909 mostly transparent. The region 7910 can still have a fully opaque background color. The nesting of focus is maintained on the display.

In FIG. 79F, the gesture associated with the input vector 7906 (illustrated in FIG. 79E) has terminated in a finger release, and as a result the selection 7914 is also stored in the history 7912. The background color in the regions 7904, 7905, 7908, and 7909 on the display can all be fully transparent. A new gesture has been detected by the UI with an associated nonzero input vector 7915. Because the input vector 7915 has a length, the regions 7916 and 7917 can have a partially transparent background color, and the region 7918 can still have a fully opaque background color. A nesting of focus exists because the interval 7913 contains the interval 7907 in the vertical zoom dimension, and the interval 7919 further refines the focus in the horizontal zoom dimension. In FIG. 79F, five data blocks are illustrated in the row and the UI has focused to the single data block in region 7918.

In FIG. 79G, the input vector 7915 has lengthened, and as a result the regions 7916 and 7917 can have a mostly transparent background color, and the region 7918 can still have a fully opaque background color. The nesting of focus is maintained. In this example, the single character in region 7918 has been selected.

Floating Focus: Nested Scrolling

The inventive UI system can enable users to progressively narrow focus in order to hone in on the information that is most of interest on the display. Moreover, innovative nested scrolling techniques allow users to correct previous focus errors without needing to undo existing selections. Nested scrolling also provides an alternative mechanism for exploring the content of a listing of data blocks without leaving a particular level of magnification and/or a particular level of focus.

FIGS. 75A-75C depict an embodiment wherein a nesting of focus is violated and then restored. In order to better explain the behavior of the zoom intervals, an intermediate representation is illustrated that is not the final output on the display. Two selections have been made, and the focus of an active gesture is manipulated via an input vector. Note that any combination of selections and active gestures could be described in a similar fashion.

With reference to FIG. 75A, zoom interval 7501 and zoom interval 7502 represent snapped zoom intervals associated with two UI input selections, wherein the selection associated with the zoom interval 7501 occurred prior to the selection associated with the snapped zoom interval 7502. Zoom interval 7503 represents the zoom interval associated with an active gesture. The focus of the active gesture has moved so that after the gesture motion the start of the zoom interval 7503 comes before the starts of the two zoom intervals 7501, 7502. The zoom interval 7501 contains the zoom interval 7502, which in turn contains the zoom interval 7503, establishing a nesting of focus.

With reference to FIG. 75B, the required nesting of focus has been violated because the active zoom interval 7503 is no longer contained in the most recent zoom interval 7502. In response to this nesting of focus violation, the processor can adjust the displayed data so the start of the zoom interval 7502 is moved as indicated by the arrow so that its zoom interval start aligns with the zoom interval start of the zoom interval 7503. The new zoom interval start for the zoom interval 7502 will no longer be contained in the zoom interval 7501, so the start of the zoom interval 7501 must also be moved as indicated by the arrow so that its zoom interval start aligns with the zoom interval start of the zoom interval 7503 so that the nesting of focus can be restored.

In FIG. 75C, the processor corrected zoom intervals 7501, 7502, 7503 are illustrated with respect to a display. The zoom interval 7501 contains the snapped zoom interval 7502, which in turn contains the zoom interval 7503. So the nesting of focus has been restored.

FIGS. 77A-77B depict one embodiment where a scroll operation moves a focus 7710 of a gesture from one row 7701 of a grid 7702 to the row 7703 immediately above the line 7701.

FIGS. 77A and 77B illustrate a display in a top row and a UI in a lower row. With reference to FIG. 77A, the gesture 7704 detected by the UI includes an input vector 7705 which started at the center and is now inside the scroll selector 7706. A snapped vertical zoom interval 7707 narrows focus to three consecutive rows of data blocks on the display, with row 7701 being the uppermost of the three rows. At input vector 7705, the associated zoom interval 7708 further narrows the focus 7710 inside row 7701, and the focus can be indicated by altering a color of a focused group of data blocks consisting of two full grid cells and two partial grid cells.

With reference to FIG. 77B, the gesture 7704 has progressed from an initial input vector (7705 shown in FIG. 77A) to input vector 7709 so that input vector 7709 is detected by the processor. Because the focus of the gesture has moved beyond the start of the row 7701, the row 7703 has become focused, and the snapped vertical zoom interval 7707 has moved up by one row to preserve the nesting of focus on the display. The horizontal zoom interval 7708 now narrows the focus 7710 inside row 7703, which can again be indicated by altering a color of a focused group of data blocks consisting of two full grid cells and two partial grid cells. The scroll selector 7706 has moved to the left side of the control disc.

Floating Focus: Möbius Transformations

FIGS. 80A-80B depict an embodiment in which both horizontal and vertical zooming on a display is performed on a grid of data blocks based on two nonzero input vectors.

In FIG. 80A, the vertical zoom interval 8001 and horizontal zoom interval 8002 bound a focused group of data blocks 8003 in a static layout 8004. Each data block has a rectangular data block boundary that is uniform in size based on the bounds of the containing row and column. In this example, there are sixteen data blocks in the focused group of data blocks 8003.

FIG. 80B depicts a dynamic visualization 8005 wherein the revised vertical zoom interval 8006 and the revised horizontal zoom interval 8007 are determined via two Möbius transformations parameterized by control points based on the two input vectors input to the UI of the computing device. Revised vertical zoom interval 8006 and revised horizontal zoom interval 8007 bound a rectangle 8008 that is enlarged and evenly subdivided to find the revised data block boundaries for the focused group of sixteen data blocks. The parameterized Möbius transformations are also applied to the grid lines 8009 (in FIG. 80A) outside the focused group of data blocks in order to find the resulting grid lines 8010 which form the basis for the remaining revised data block boundaries which can be compressed horizontally and/or vertically to allow for the rectangle 8008 to be enlarged on the display. The boundaries of the data blocks 8011 of the grid are the revised data block boundaries.

FIGS. 81A-81C illustrate an embodiment of a sequence of steps wherein an input vector parameterizes a Möbius transformation that is used to revise data block boundaries for a dynamic visualization. The left circles illustrate the input gestures on the UI of the computing device and the dots on the circles correspond to the horizontal grid lines on the right grids that represent the rows of data shown on the visual display.

With reference to FIG. 81A, a nonzero input vector 8101 on the UI yields a normalized control point 8102 in the unit disc 8103 that is used in FIGS. 81B-81C to transform FIG. 81A points 8104 which are initially evenly distributed on the unit disc 8103, with the rows on the display uniform in height. The input vector 8101 results in a focus group 8114 of four rows of data blocks.

In FIG. 81B, the points 8105 and 8106 have been transformed from the original points (8113 and 8112 respectively in FIG. 82A), and the relative angles of 8105 inside the angular interval swept out to the right of the points 8106 are used to establish the revised zoom interval start 8107 and the revised zoom interval end 8108 on the visual display. The transformed horizontal boundaries 8109 are evenly spaced between the revised zoom interval start 8107 and the revised zoom interval end 8108.

In FIG. 81C, the points 8110 are the result of transforming the remaining points 8104 (in FIG. 81A) via the parameterized Möbius transformation. Their relative angles inside the angular interval swept out to the right of 8106 on the UI are used to establish the remaining transformed horizontal boundaries 8111 on the display. The neighboring pairs of transformed horizontal boundaries make up the revised data block boundaries. The rows of data blocks above and below the focus are increasingly compressed vertically.

Hardware

Figure 83:
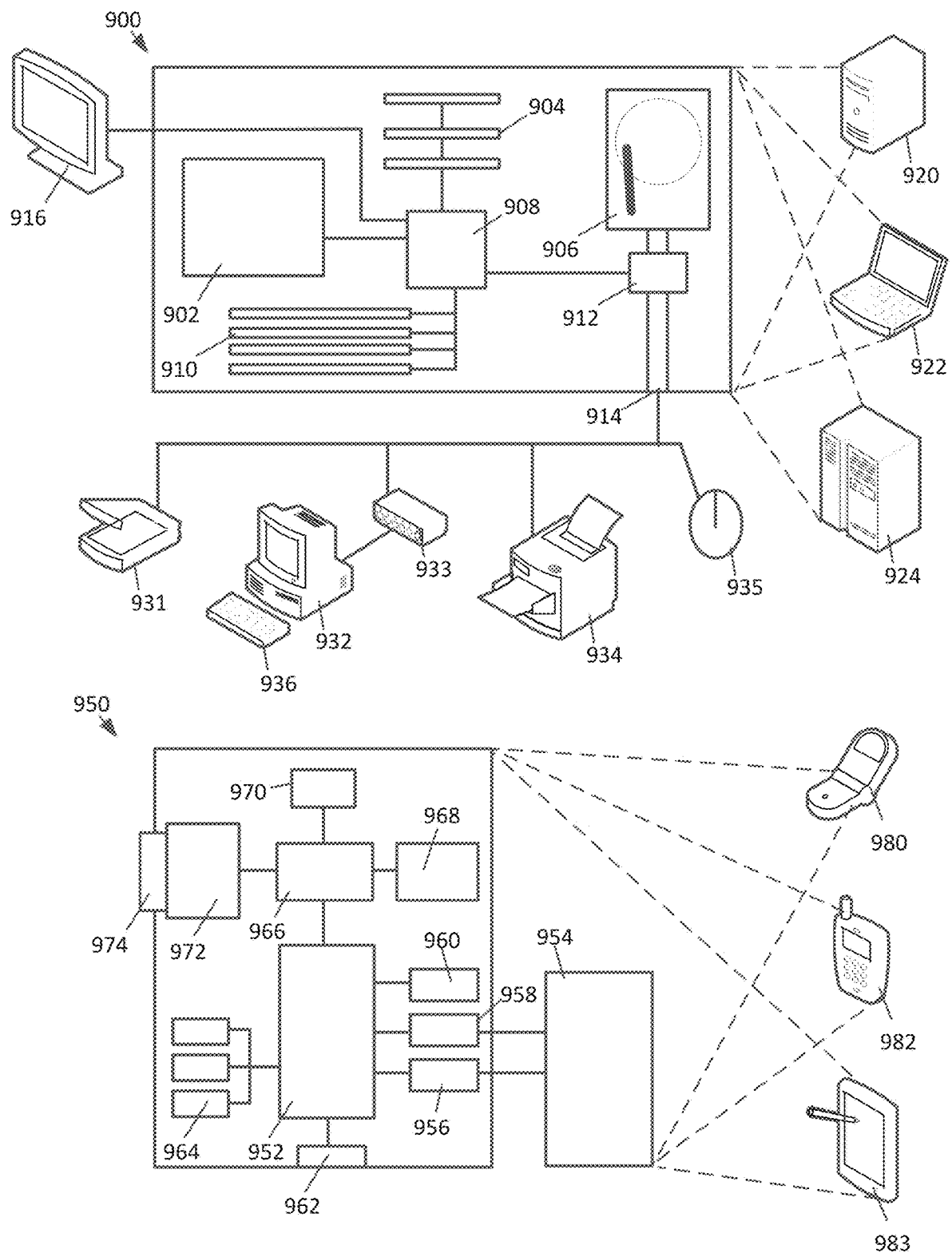
FIG. 83 illustrates an embodiment of a computer system which can be used with the inventive UI systems.

FIG. 83 shows an example of a generic computer device 900 and a generic mobile computer device 950, which may be used to implement the processes described herein, including the mobile-side and server-side processes for installing a computer program from a mobile device to a computer. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components processor 902, memory 904, storage device 906, high-speed interface 908, high-speed expansion ports 910, and low speed interface 912 are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple busses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port 914, which may include various communication ports (e.g., USB, Bluetooth, Ethernet, wireless Ethernet), may be coupled to one or more input/output devices, such as a keyboard 936 in communication with a computer 932, a pointing device 935, a scanner 931, or a networking device 933 such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing devices 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a Microdrive, solid state memory or other device, to provide additional storage. Each of the components computing device 950, processor 952, memory 964, display 954, communication interface 966, and transceiver 968 are interconnected using various busses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provided in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provided as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, memory on processor 952, or a propagated signal that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, Wi-Fi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, a tablet computer 983 or other similar mobile computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein.

Aspects of the methods, processes, and systems described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Method and process steps may be executed by server or client side components that are processor-based components, programmed digital circuits, programmed arrays, and so on. Method steps may also be embodied as executable program code executed in a processor based system, such as a server computer or client computer coupled in a network. The terms, "component," "module," "procedure," "unit," may all refer to a circuit that executes program code to perform a function implemented in software.

It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media).

In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Embodiments are directed to a processing component in or associated with a server computer used by a software developer to implement an application-specific action and/or persistence interface, develop a small configuration file that directs the workflow engine, and provide a file that contains the formal API definition. This is a data-centric model that frees developers from implementing specific and customized code to handle how to get data to and from an API. Built-in support is provided for authentication, list processing, data paging, data transformations and multi-threading.

Glossary

Boundary Dimension Count: The number of dimensions that must be restricted in order to bound a data block on all sides.

Containment Relationship: A relationship between focus boundaries, wherein a first focus boundary contains a second focus boundary on all sides.

Data Block Boundary: A boundary that contains a data block on all sides.

Dynamic Visualization: A visualization of data blocks on a display that can be continuously manipulated in response to an input gesture.

Focus Boundary: A boundary that contains or partially contains a group of data blocks that is considered focused.

History of Selections: A collection of selections stored in chronological order.

Listing of Gestures: A collection of concurrent gestures detected by the processor.

Snapped Input Vector: An input vector that has been adjusted in response to a selection in order to visually align a focus and ensure consistency of focus.

Nondynamic Visualization: A visualization that can be displayed when the user is not interacting that can form the basis for a dynamic visualization.

Reverse Visualization: A dynamic visualization that can transform a dynamic visualization into an associated non-dynamic visualization based on a length of an input vector in a back direction.

Visible Data Block Boundary: A boundary such as the edges of a screen or indo that contains the data blocks in the visible portion of the listing.

Visualization: A graphical representation of the listing of data blocks on the display.

Zoom Dimension: A one-dimensional axis that can contain zoom intervals (e.g., the vertical or horizontal dimension).

Zoom Interval: A region of a zoom dimension that can be used to bound focus in the single dimension denoted by the zoom dimension.

What is claimed is:

1. A method for operating a computing device, the method comprising:
    providing a computing device having a user interface, a visual display coupled to a processor, and a memory for storing a listing of data blocks;
    detecting by the user interface, a first input point and a second input point of a gesture;
    determining by the processor, an input vector based on the first input point and the second input point of the gesture;
    determining by the processor, a visible portion of a listing of the data blocks that is displayed on the visual display and a non-visible portion of the listing of the data blocks that is not visible on the visual display wherein the visible portion of the listing of the data blocks is manipulated by the gesture;
    assigning by the processor, a zoom interval of the visible portion of the listing that is contained in a zoom dimension wherein the zoom interval is based on an angle of the input vector; and
    displaying on the visual display, the visible portion of the listing of the data blocks in a dynamic visualization based upon the zoom interval and the input vector wherein the visible portion of the listing contained in the zoom interval has a different appearance than the visible portion of the listing not in the zoom interval.

2. The method of claim 1 further comprising:
    assigning by the processor, a data block boundary for each of the data blocks in the visible portion of the listing wherein each data block boundary has a boundary dimension count that is a predetermined number;
    assigning by the processor, a revised zoom interval based on the input vector and the zoom interval;
    determining by the processor, a revised data block boundary for each of the data blocks in the visible portion of the listing based on the revised zoom interval and the input vector; and
    displaying on the visual display, the visible portion of the listing of the data blocks in the dynamic visualization based upon the revised zoom interval, the input vector, and the revised data block boundary for each of the data blocks in the visible portion of the listing of the data blocks.

3. The method of claim 1 further comprising:
    assigning by the processor, an intensity of a color or an opacity based on the length of the input vector; and
    displaying on the visual display, the visible portion of the listing in the dynamic visualization which alters the color or the opacity of the visible portion of the listing that is inside the zoom interval so that the visible portion of the listing that is inside the zoom interval appears visually distinct compared to the visible portion of the listing that is outside the zoom interval.

4. The method of claim 1 further comprising:

determining by the processor, a visible data block boundary wherein the visible data block boundary bounds the data blocks in the visible portion of the listing of the data blocks;

detecting by the processor, that a focus of the gesture intends to move outside the visible data block boundary in a scroll intent direction;

determining by the processor, a revised visible portion of the listing of the data blocks that includes some of the data blocks that are outside the visible data block boundary in the scroll intent direction; and displaying on the visual display, the revised visible portion of the listing.

5. The method of claim 1 further comprising:

detecting by the user interface, a final input point in the gesture;

detecting by the processor, a final input vector based on the first input point of the gesture and the final input point of the gesture;

detecting by the processor, that a length of the final input vector is greater than a predetermined selection threshold length;

determining by the processor, a focused group of data blocks wherein associated data block boundaries are at least partially contained in the zoom interval with respect to the zoom dimension;

detecting by the user interface, a snapped input vector, wherein the processor causes the zoom interval associated with the snapped input vector to be aligned with the data block boundaries associated with the focused group of data blocks;

determining by the processor, a snapped zoom interval based on the zoom interval associated with the snapped input vector;

determining by the user interface, a selected group of data blocks based on the focused group of data blocks; and storing in the memory, a selection from which the snapped input vector, the snapped zoom interval, and the selected group of data blocks can be retrieved or derived.

6. The method of claim 5 further comprising:

determining by the processor, that the selected group of data blocks associated with the selection only contains a selected one of the data blocks; and executing by the processor, an action associated with the selected one of the data blocks wherein the action is stored in the memory.

7. The method of claim 5 further comprising:

storing by the processor in the memory, a history of selections, wherein first focus boundaries are associated with each stored selection in the history of selections so that each of the first focus boundaries is contained within the first focus boundary associated with a preceding selection in the history of selections;

maintaining by the processor in the memory, a listing of gestures, wherein second focus boundaries are associated with each stored gesture in the listing of gestures so that each of the second focus boundaries is contained within the focus boundary associated with a preceding gesture in the listing of gestures, and a first of the second focus boundaries associated with the first listing in the listing of gestures is contained within a last focus boundary of the first focus boundaries associated with a last selection in the history of selections; and displaying on the visual display, the visible portion of the listing of the data blocks in the dynamic visualization based upon the history of selections and the listing of gestures.

8. The method of claim 5 further comprising:

detecting by the processor, a back gesture; and displaying on the visual display, a reverse visualization based on the back gesture, wherein the reverse visualization reverses a visual effect of the selection stored in the memory.

9. The method of claim 5 further comprising:

storing by the processor in the memory, a history of selections, wherein first focus boundaries are associated with each stored selection in the history of selections so that each of the first focus boundaries is contained within the first focus boundary associated with a preceding selection in the history of selections;

maintaining by the processor in the memory, a listing of gestures, wherein second focus boundaries are associated with each stored gesture in the listing of gestures so that each of the second focus boundaries is contained within the focus boundary associated with a preceding gesture in the listing of gestures, and a first of the second focus boundaries associated with the first listing in the listing of gestures is contained within a last focus boundary of the first focus boundaries associated with a last selection in the history of selections;

displaying on the visual display, the visible portion of the listing of the data blocks in the dynamic visualization based upon the history of selections and the listing of gestures;

detecting by the user interface, a back selection; and removing by the processor, the last selection stored in the memory.

10. The method of claim 5 further comprising:

storing by the processor in the memory, a history of selections, wherein first focus boundaries are associated with each stored selection in the history of selections so that each of the first focus boundaries is contained within the first focus boundary associated with a preceding selection in the history of selections;

maintaining by the processor in the memory, a listing of gestures, wherein second focus boundaries are associated with each stored gesture in the listing of gestures so that each of the second focus boundaries is contained within the focus boundary associated with a preceding gesture in the listing of gestures, and a first of the second focus boundaries associated with the first listing in the listing of gestures is contained within a last focus boundary of the first focus boundaries associated with a last selection in the history of selections;

displaying on the visual display, the visible portion of the listing of the data blocks in the dynamic visualization based upon the history of selections and the listing of gestures;

detecting by the processor, that a violating gesture in the listing of gestures intends to move outside a preceding focus boundary;

detecting by the processor, a boundary violation direction in which the violating gesture intends to move outside the preceding focus boundary; and altering by the processor, the zoom interval, the history of selections stored in the memory, and the listing of gestures stored in the memory so that a focus of the gesture moves in the boundary violation direction and containment relationships between focus boundaries are maintained.

11. The method of claim 1 further comprising:
assigning by the user interface, a data block boundary for each of the data blocks in the visible portion of the listing wherein each data block boundary has a boundary dimension count that is a predetermined number;
assigning by the processor, a revised zoom interval based on the input vector and the zoom interval;
determining by the processor, a revised data block boundary for each of the data blocks in the visible portion of the listing based on the revised zoom interval and the input vector;
displaying on the visual display, the visible portion of the listing of the data blocks in the dynamic visualization based upon the revised zoom interval, the input vector, and the revised data block boundary for each of the data blocks in the visible portion of the listing of the data blocks;
determining by the processor, a control point based on the input vector;
determining by the processor, a parameterized Möbius transformation, wherein the parameterized Möbius transformation is a complex-valued function chosen from a family of complex-valued functions based on the control point and each of the family of complex-valued functions map a boundary of a unit disc to the boundary of the unit disc;
using the parameterized Möbius transformation to determine the revised zoom interval and the revised data block boundaries; and
displaying on the visual display, the visible portion of the listing of the data blocks in the dynamic visualization based upon the revised zoom interval, the input vector, and the revised data block boundary for each of the data blocks in the visible portion of the listing of the data blocks.

12. A method for operating a computing device, the method comprising:
providing a computing device having a user interface, a visual display coupled to a processor, and a memory for storing a listing of data blocks;
detecting by the user interface, a first input point and a second input point of a gesture;
determining by the processor, an input vector based on the first input point and the second input point of the gesture;
determining by the processor, a listing of the data blocks that is manipulated by the gesture;
assigning by the processor, a zoom interval of the listing that is contained in a zoom dimension wherein the zoom interval is based on an angle of the input vector; and
displaying on the visual display, the listing of the data blocks in a dynamic visualization based upon the zoom interval and the input vector.

13. The method of claim 12 further comprising:
assigning by the processor, a data block boundary for each of the data blocks in the listing wherein each data block boundary has a boundary dimension count that is a predetermined number;
assigning by the processor, a revised zoom interval based on the input vector and the zoom interval;
determining by the processor, a revised data block boundary for each of the data blocks in the listing based on the revised zoom interval and the input vector; and
displaying on the visual display, the listing of the data blocks in the dynamic visualization based upon the revised zoom interval, the input vector, and the revised data block boundary for each of the data blocks in the listing of the data blocks.

14. The method of claim 12 further comprising:
assigning by the processor, an intensity of a color or an opacity based on the length of the input vector; and
displaying on the visual display, the listing in the dynamic visualization which alters the color or the opacity of the listing that is inside the zoom interval so that the listing that is inside the zoom interval appears visually distinct compared to the listing that is outside the zoom interval.

15. The method of claim 12 further comprising:
determining by the processor, a visible data block boundary wherein the visible data block boundary bounds the data blocks in the listing of the data blocks;
detecting by the processor, that a focus of the gesture intends to move outside the visible data block boundary in a scroll intent direction;
determining by the processor, a revised listing of the data blocks that includes some of the data blocks that are outside the visible data block boundary in the scroll intent direction; and
displaying on the visual display, the revised listing of the data blocks.

16. The method of claim 12 further comprising:
detecting by the user interface, a final input point in the gesture;
detecting by the processor, a final input vector based on the first input point of the gesture and the final input point of the gesture;
detecting by the processor, that a length of the final input vector is greater than a predetermined selection threshold length;
determining by the processor, a focused group of data blocks wherein associated data block boundaries are at least partially contained in the zoom interval with respect to the zoom dimension;
detecting by the user interface, a snapped input vector, wherein the processor causes the zoom interval associated with the snapped input vector to be aligned with the data block boundaries associated with the focused group of data blocks;
determining by the processor, a snapped zoom interval based on the zoom interval associated with the snapped input vector;
determining by the user interface, a selected group of data blocks based on the focused group of data blocks; and
storing in the memory, a selection from which the snapped input vector, the snapped zoom interval, and the selected group of data blocks can be retrieved or derived.

17. The method of claim 16 further comprising:
determining by the processor, that the selected group of data blocks associated with the selection only contains a selected one of the data blocks; and
executing by the processor, an action associated with the selected one of the data blocks wherein the action is stored in the memory.

18. The method of claim 16 further comprising:
storing by the processor in the memory, a history of selections, wherein first focus boundaries are associated with each stored selection in the history of selections so that each of the first focus boundaries is contained within the first focus boundary associated with a preceding selection in the history of selections;

maintaining by the processor in the memory, a listing of gestures, wherein second focus boundaries are associated with each stored gesture in the listing of gestures so that each of the second focus boundaries is contained within the focus boundary associated with a preceding gesture in the listing of gestures, and a first of the second focus boundaries associated with the first listing in the listing of gestures is contained within a last focus boundary of the first focus boundaries associated with a last selection in the history of selections; and displaying on the visual display, the listing of the data blocks in the dynamic visualization based upon the history of selections and the listing of gestures.

19. The method of claim 16 further comprising:

detecting by the processor, a back gesture; and displaying on the visual display, a reverse visualization based on the back gesture, wherein the reverse visualization reverses a visual effect of the selection stored in the memory.

20. The method of claim 16 further comprising:

storing by the processor in the memory, a history of selections, wherein first focus boundaries are associated with each stored selection in the history of selections so that each of the first focus boundaries is contained within the first focus boundary associated with a preceding selection in the history of selections;

maintaining by the processor in the memory, a listing of gestures, wherein second focus boundaries are associated with each stored gesture in the listing of gestures so that each of the second focus boundaries is contained within the focus boundary associated with a preceding gesture in the listing of gestures, and a first of the second focus boundaries associated with the first listing in the listing of gestures is contained within a last focus boundary of the first focus boundaries associated with a last selection in the history of selections;

displaying on the visual display, the listing of the data blocks in the dynamic visualization based upon the history of selections and the listing of gestures;

detecting by the user interface, a back selection; and removing by the processor, the last selection stored in the memory.

\* \* \* \* \*